United States Patent

Ono et al.

[11] Patent Number: 6,038,001
[45] Date of Patent: Mar. 14, 2000

[54] BISTABLE NEMATIC LIQUID CRYSTAL WHICH REMAINS TILTED IN FIRST AND SECOND STATES AND WHICH IS TILTED ACCORDING TO DRIVING VOLTAGE

[75] Inventors: Toshiomi Ono, Machida; Tetsushi Yoshida, Kanagawa-ken; Toshihiro Mannoji, Hachioji, all of Japan

[73] Assignee: Casio Computer Co., Ltd., Tokyo, Japan

[21] Appl. No.: 08/909,540

[22] Filed: Aug. 12, 1997

[30] Foreign Application Priority Data

| Aug. 13, 1996 | [JP] | Japan | 8-213869 |
| Aug. 13, 1996 | [JP] | Japan | 8-213870 |
| Aug. 13, 1996 | [JP] | Japan | 8-213871 |
| Aug. 13, 1996 | [JP] | Japan | 8-213872 |
| Dec. 26, 1996 | [JP] | Japan | 8-348916 |
| Jul. 8, 1997 | [JP] | Japan | 9-182463 |
| Jul. 8, 1997 | [JP] | Japan | 9-182464 |

[51] Int. Cl.$^7$ .................................................. G02F 1/133
[52] U.S. Cl. .............................. 349/33; 349/85; 349/177; 345/95; 345/89; 345/96
[58] Field of Search .............................. 349/33, 85, 177, 349/34; 345/95, 89, 87, 96

[56] References Cited

U.S. PATENT DOCUMENTS

| 4,505,548 | 3/1985 | Berreman et al. | 349/179 |
| 4,529,271 | 7/1985 | Berreman et al. | 349/175 |
| 4,664,483 | 5/1987 | Van Sprang et al. | 349/34 |
| 5,900,852 | 5/1999 | Tanaka et al. | 349/128 |

*Primary Examiner*—Kenneth Parker
*Attorney, Agent, or Firm*—Frishauf, Holtz, Goodman, Langer & Chick, P.C.

[57] ABSTRACT

A liquid crystal display device comprises a pair of substrates opposing each other, each having an electrode and an aligning film on an inner surface, a layer of bistable nematic liquid crystal sealed in a space between substrate, and two polarizing plates. A reset pulse voltage high enough to align the molecules almost vertically to the substrates is applied to the layer of liquid crystal. Then, a first state-selecting pulse voltage lower than the reset pulse voltage is applied between the electrodes, whereby the molecules of the liquid crystal assume a first metastable aligned state. Alternatively, a second state-selecting pulse voltage lower than the reset pulse voltage is applied between the electrodes, whereby the molecules of the liquid crystal assume a second metastable aligned state. The liquid crystal molecules are tilted at an angle to the substrates in accordance with the effective value of the first state-selecting pulse voltage while remaining in the first metastable aligned state, and are tilted at a different angle to the substrates in accordance with the effective value of the second state-selecting pulse voltage while remaining in the second metastable aligned state.

37 Claims, 35 Drawing Sheets

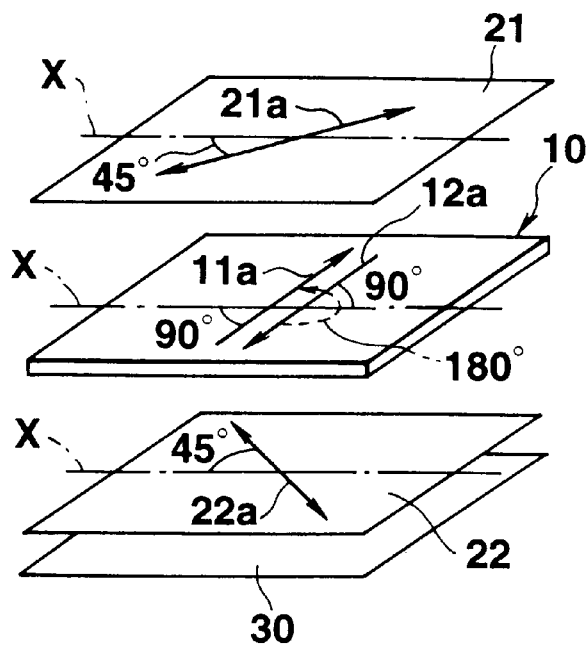
FIG.7A
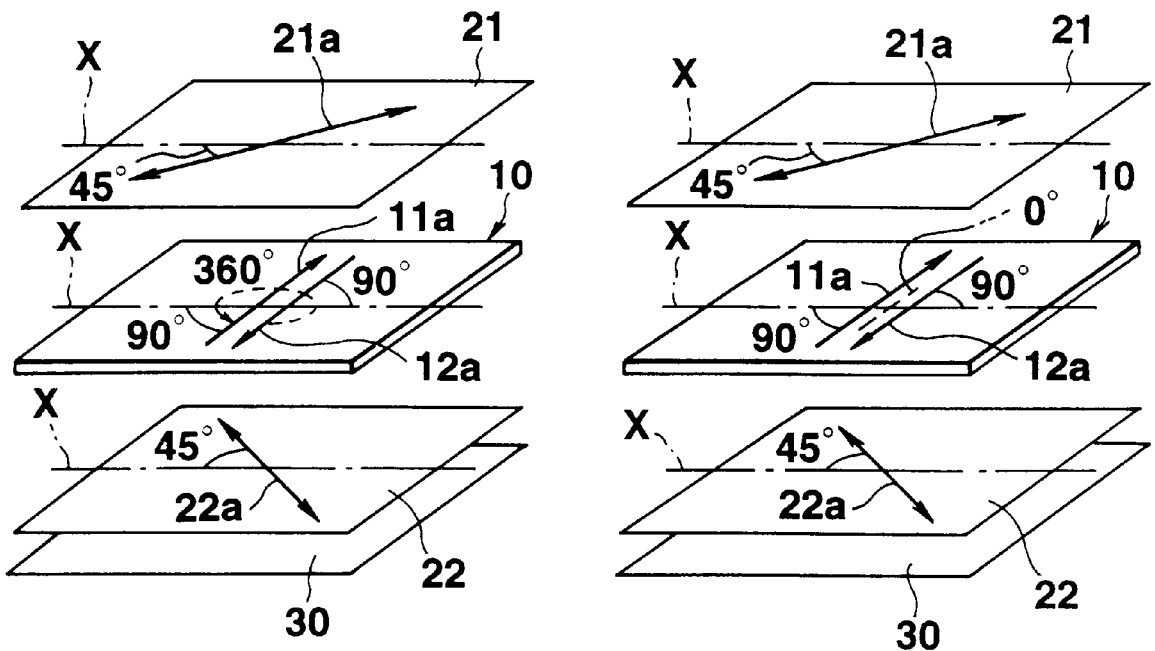
FIG.7B  FIG.7C

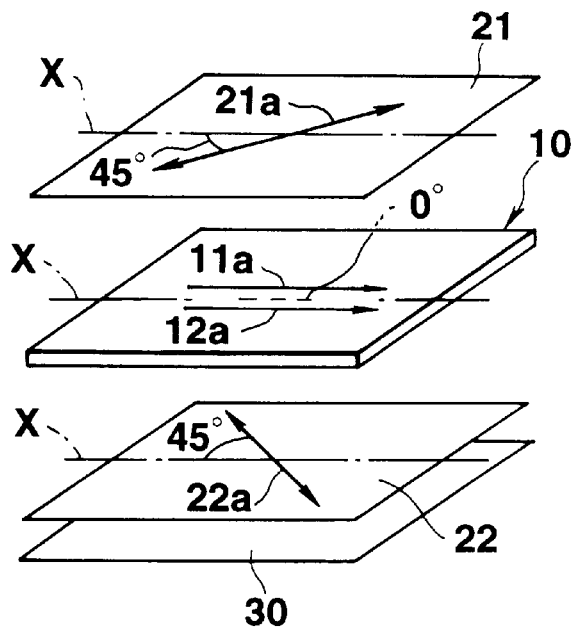
FIG.11A
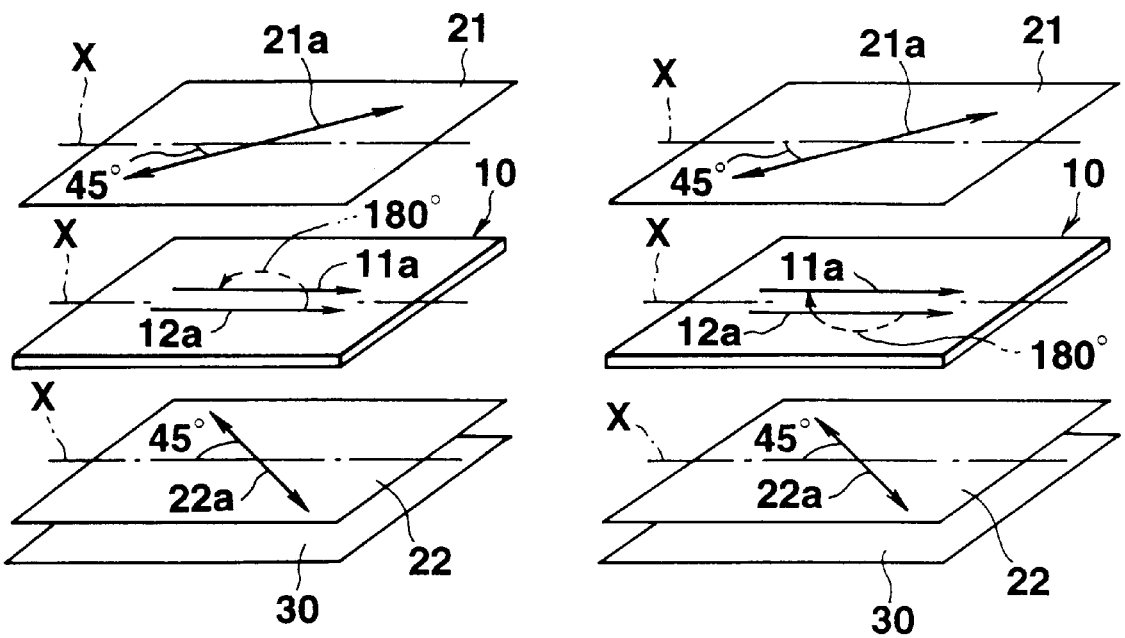
FIG.11B  FIG.11C

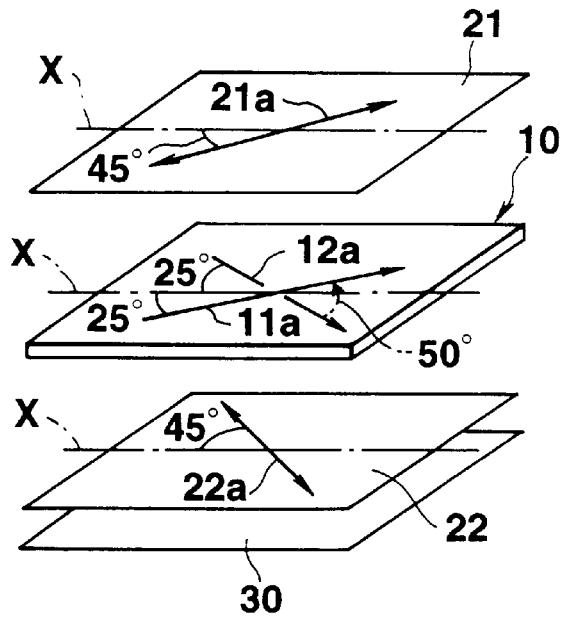
FIG.22A
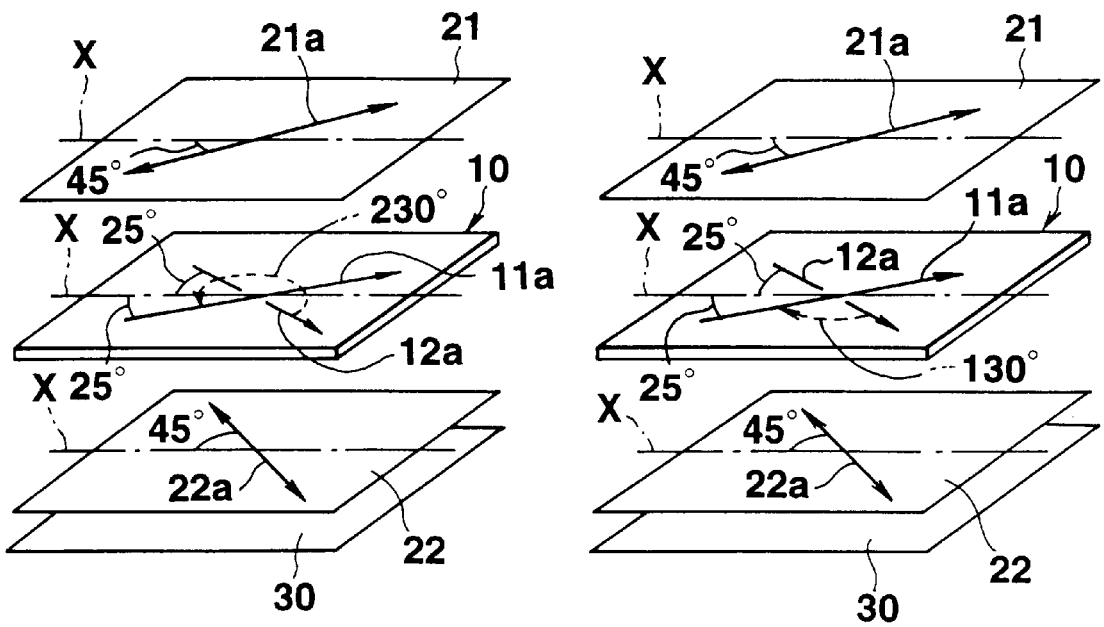
FIG.22B  FIG.22C

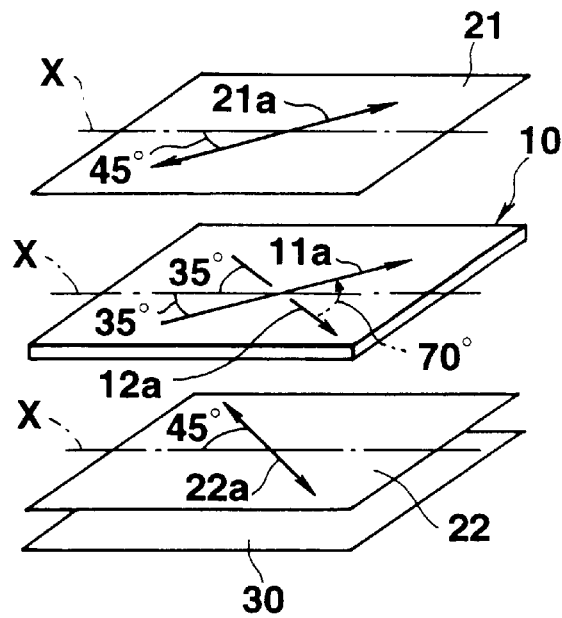
FIG.26A
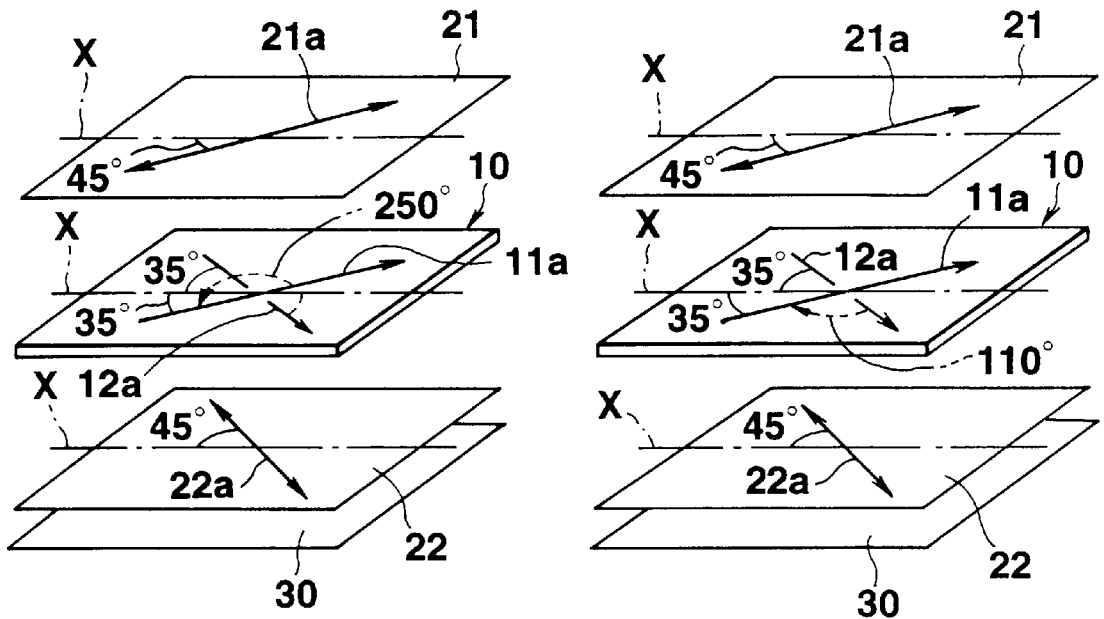
FIG.26B  FIG.26C

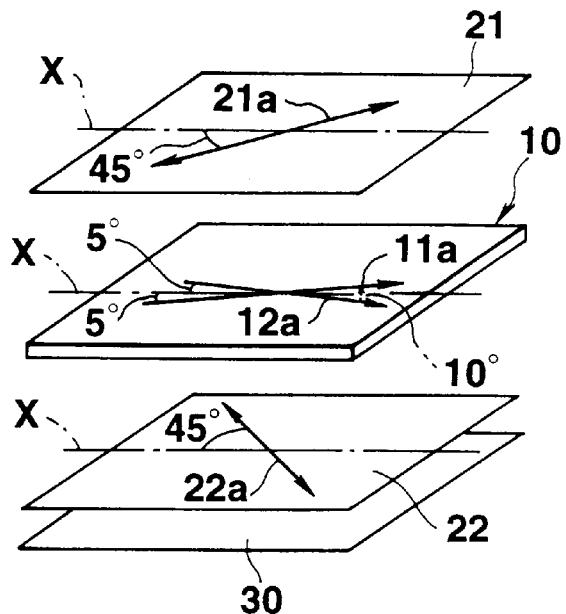
FIG.30A
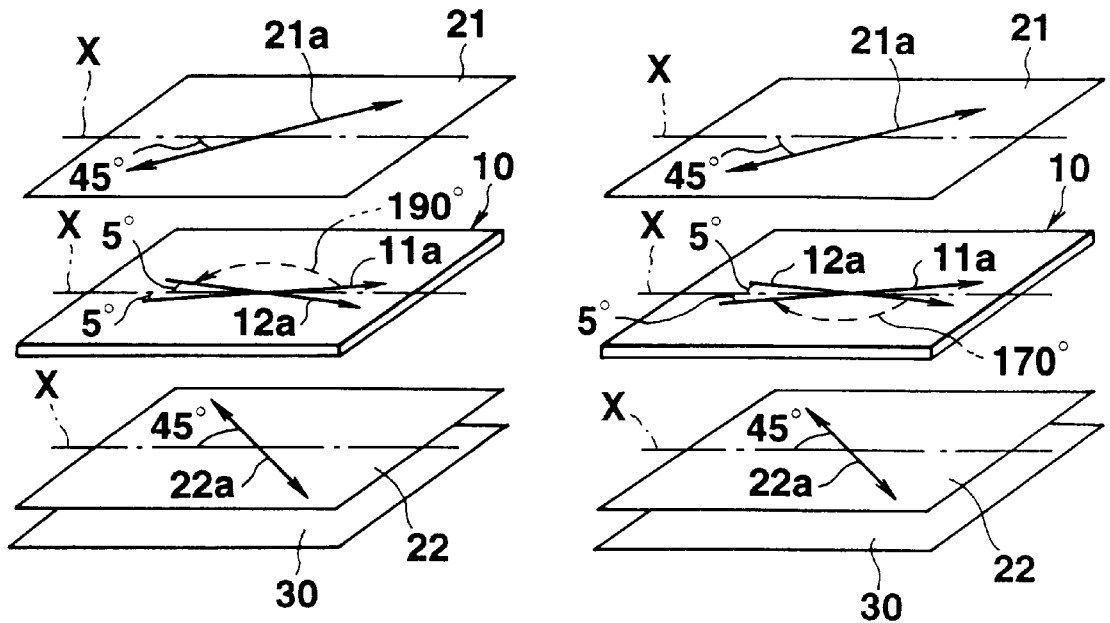
FIG.30B  FIG.30C

BISTABLE NEMATIC LIQUID CRYSTAL WHICH REMAINS TILTED IN FIRST AND SECOND STATES AND WHICH IS TILTED ACCORDING TO DRIVING VOLTAGE

BACKGROUND OF THE INVENTION

The present invention relates to a liquid crystal display device having bistable nematic liquid crystal and also to a method of driving the liquid crystal display device.

Liquid crystal displays are classified into two types. The first type is known as a transmissive display which uses the light emanating from a back light. The second type is known as a reflective display which utilizes external light such as natural light and light emitted from lamps on the ceiling. A liquid crystal display of either type comprises a front polarizing plate, a rear polarizing plate, and a liquid crystal cell interposed between the polarizing plates. A reflective liquid crystal display further comprises a reflective plate laid on the outer surface of the rear polarizing plate.

The liquid crystal cell comprises a pair of substrates and liquid crystal held in the gap between the substrates. Each of the substrates has a number of electrodes arranged on its inner surface and an aligning film covering the electrodes. The aligning film aligns the molecules of the liquid crystal near the substrate, in a specific aligned state (e.g., twist-aligned state).

The liquid crystal cell has a number of pixels. Each pixel comprises one electrode provided on the inner surface of the first substrate, one electrode provided on the inner surface of the second substrate, and that part of the liquid crystal which is located between these two electrodes. When a drive signal is applied between the electrodes of the pixel, the molecules of the liquid crystal are tilted to the substrates and allow the passage of light. How much light is passed through the liquid crystal depends on how much the liquid crystal molecules are tilted to the substrates.

Two types of liquid crystal cells are known. The first type is a simple matrix cell in which the electrodes provided on the inner surface of the first substrate intersect with those provided on the inner surface of the second substrate. The second type is an active matrix cell which is identical in structure to the simple matrix cell, except that one active element is connected to each electrode. The simple matrix cell is advantageous because it is more simple than the active matrix cell and can therefore made at a lower cost.

In a liquid crystal display having a simple matrix cell, the effective value of a drive signal applied between the electrodes of each pixel for a predetermined time is controlled to display an image. To display a gray-scale image, the drive signal is time-divided into segment drive signals. The segment drive signals are sequentially applied between the electrodes of the pixel, thereby changing stepwise the amount of light passing through the pixel. The more minutely the drive signal is time-divided, the smaller the difference between the effective values of any two segment signals which correspond to two adjacent gray-scale levels. In other words, when the liquid crystal cell is driven in high-duty time division, the operating voltage margin (i.e., the difference between the effective values of the segment signals) is inevitably too narrow for the display to provide clear gray-scale images.

The liquid crystal display having a simple matrix cell can hardly be driven in high-duty time division. Therefore, the display cannot have an increased number of pixels to display clear gray-scale images.

BRIEF SUMMARY OF THE INVENTION

The object of the present invention is to provide a liquid crystal display device having a simple matrix cell which can be driven in high-duty time division, which has a large number of pixels and which can display clear gray-scale images.

To achieve the object, a liquid crystal display device according to a first aspect of the invention comprises: a pair of substrates opposing each other, each having an electrode and an aligning plate on an inner surface, the aligning plate having been rubbed in a predetermined direction; a layer of bistable nematic liquid crystal sealed in a space between the substrate, the molecules of the liquid crystal assuming a first metastable aligned state when a reset pulse voltage high enough to align the molecules almost vertically to the substrates and then a first state-selecting pulse voltage lower than the reset pulse voltage are applied between the opposing electrodes, or assuming a second metastable aligned state when the reset pulse voltage and then a second state-selecting pulse voltage lower than the reset pulse voltage are applied between the opposing electrodes, being tilted at an angle to the substrates in accordance with an effective value (RMS value) of a voltage applied between the opposing electrodes while remaining in the first metastable aligned state, and being tilted at an angle to the substrates in accordance with an effective value (RMS value) of a voltage applied between the opposing electrodes while remaining in the second metastable aligned state; and at least one polarizing plate arranged at one of the substrates.

In the liquid crystal display device, the liquid crystal molecules in the cell are set in either the first metastable aligned state or the second metastable aligned state, and the molecules in either metastable aligned state are tilted the substrates at an angle in accordance with the effective value of the drive signal. While the liquid crystal molecules remain in the first metastable aligned state, the display device has a specific electrooptical characteristic. While the liquid crystal molecules remain in the second metastable aligned state, the display device has another electrooptical characteristic.

In other words, the liquid crystal display device has the electrooptical characteristics of two liquid crystal display devices which differ in the alighted state of liquid crystal molecules. The first characteristics is used to control some of the light-transmitting states of each pixel, and the second characteristics is used to control the remaining light-transmitting states of the pixel.

That is, all gray-scale levels the display device provides are divided into two sets. The gray-scale levels of the first set are provided while the liquid crystal molecules remain in the first metastable aligned state, and the gray-scale levels of the second set are provided while the liquid crystal molecules remain in the second metastable aligned state. Hence, the drive signal only needs to be time-divided far less minutely, than in the case where the molecules assume only one metastable aligned state.

As a result, the liquid crystal display device has a sufficiently broad operating voltage margin, though the liquid crystal cell is a simple matrix cell which is driven by a controlled derive signal. The cell can therefore be driven in high-duty time division. The display device according to the first aspect of the invention can display an image composed of a great number of pixels.

In the liquid crystal display device, at least one polarizing plate is so positioned that its optical axis intersects, at an angle other than an right angle, with a direction in which the liquid crystal molecules near one of the substrates are aligned. The display device can therefore operate in birefringent mode. It can display different colors and present different gradations in accordance with the effective value of the voltage applied between the electrodes of each pixel, while the liquid crystal molecules remain in the first metastable aligned state and also while the liquid crystal molecules remain in the second metastable aligned state.

The liquid crystal display device may further comprise drive means connected to the opposing electrodes, for first applying a reset pulse voltage and then first and second state-selecting pulse voltages to the layer of liquid crystal and for applying a voltage for controlling the effective values of the first and second state-selecting pulse voltages in accordance with data which is externally supplied and which is to be displayed. The reset pulse voltage is high enough to align the molecules almost vertically to the substrates. Both state-selecting pulse voltages are lower than the reset pulse voltage. The first state-selecting pulse voltage is applied to the liquid crystal layer, setting the liquid crystal molecules in the first metastable aligned state. The second state-selecting pulse voltage is applied to the liquid crystal layer, setting the liquid crystal molecules in the second metastable aligned state.

When the reset pulse voltage is applied to the liquid crystal layer, the liquid crystal molecules are twisted in a first direction by 0° to 180° and spray-strained, with their longer axes extending almost perpendicular to the substrates, thus assuming the initial aligned state. When the first state-selecting voltage pulse is applied to the liquid crystal layer, the liquid crystal molecules are further twisted by 180° in the first direction and released from the spray-strained state, thus assuming the first metastable aligned state. Alternatively, the second state-selecting voltage pulse is applied to the liquid crystal layer, the molecules are further twisted by 180° in a second direction opposite to the first direction and released from the spray-strained state, assuming the second metastable aligned state.

While remaining in the initial aligned state, the liquid crystal molecules may be twisted by 180°, 90°, 70°, 50°, 30°, 10°, 5°, or 0° (not twisted at all).

The liquid crystal used sealed in the display device is one which has viscosity of 30 cp or more, an elastic constant ratio $K_{33}/K_{11}$ of 1.5 or more, and a dielectric anisotropy value $\Delta n$ of 10 or more. The initial aligned state of this liquid crystal can be changed to either the first metastable aligned state or the second metastable aligned state, within a short period of time. In other words, the liquid crystal fast responds to the first and second state-selecting pulse voltages.

The liquid crystal display device may further comprises a reflective member arranged outside one of the substrates. Preferably, the reflective member is provided between two polarizing plates, one located outside the first substrate and the other located outside the second substrate. The polarizing plates are so positioned that their light-absorption axes intersect with each other at an angle ranging from 30° to 60°.

The liquid crystal display device may be modified into a reflective type. In this case, the liquid crystal molecules are twisted by an angle greater than 0° and less than 20°, preferably 10°, and the value $\Delta nd$ must be 200 nm to 500 nm, where $\Delta n$ is the dielectric anisotropy value of the liquid crystal and d is the thickness of the liquid crystal layer.

Furthermore, the display device may be modified into a reflective type which has a pair of polarizing plates, a reflective member and a retardation plate. The polarizing plates sandwich the substrates. The reflective member is provided outside one of the polarizing plates. The retardation plate is interposed between the polarizing plate which is closer to the reflective member than the other polarizing plate. The modified display device can display a clear multi-color image and/or a high-contrast monochrome image. It is desired that the retardation plate have phase contrast of 600 nm to 650 nm, the liquid crystal molecules be twisted by an angle greater than 0° and less than 10°, preferably 5° or 10°, while remaining in the initial aligned state, and the value $\Delta nd$ be 900 nm to 1100 nm, where $\Delta n$ is the dielectric anisotropy value of the liquid crystal and d is the thickness of the liquid crystal layer. This case, the liquid crystal molecules are twisted by an angle greater than 0° and less than 20°, preferably 10°, and the value $\Delta nd$ must be 200 nm to 500 nm, where $\Delta n$ is the dielectric anisotropy value of the liquid crystal and d is the thickness of the liquid crystal layer. In this modified display device, the retardation plate is arranged, having a phase delay axis intersecting at 50° to 70° with a bisector of the rubbed directions of the aligning films. Further, the polarizing plate arranged near the reflective member has its optical axis inclined clockwise or counterclockwise by 0° to 10° with respect to the bisector of the rubbed directions of the aligning films, and the other polarizing plate arranged near the front of the display device has its optical axis intersecting with the bisector at 130° to 150°.

In the case where the retardation plate is interposed between one of the substrates and the polarizing plate located near the front of the display device, the liquid crystal molecules are twisted by an angle greater than 0° and less than 20° while remaining in the initial aligned state, the value $\Delta nd$ ranges from 400 nm to 700 nm, where $\Delta n$ is the dielectric anisotropy value of the liquid crystal and d is the thickness of the liquid crystal layer, and the retardation plate has phase contrast of 100 nm or less. Preferably, the molecules should be twisted by an angle of 5° or 10°. The retardation plate should better be arranged with its phase delay axis intersecting at 0° to 10° with a bisector of the rubbed directions of the aligning films.

A liquid crystal display device according to a second aspect of the invention comprises: a pair of substrates opposing each other, each having an electrode and an aligning plate on an inner surface, the aligning plate having been rubbed in a predetermined direction; a layer of bistable nematic liquid crystal sealed in a space between the substrate and spray-strained, the molecules of the liquid crystal assuming a first metastable aligned state or a second metastable aligned state in accordance with a voltage applied between the opposing electrodes; at least one polarizing plate arranged at one of the substrates; and drive means connected to the opposing electrodes, for applying the reset pulse voltage high enough to align the molecules almost vertically to the substrates, then a plurality of state-selecting pulse voltages lower than the reset pulse voltage, for setting the molecules of the liquid crystal in the first and second metastable aligned states, a voltage for controlling the effective values of the state-selecting pulse voltages to change tilt angle of the molecules with respect to the substrates, in accordance with data which is externally supplied and which is to be displayed.

In this liquid crystal display device, the molecules of the liquid crystal are twisted in a first direction by 0° to 180° with respect to the rubbed direction of one of the aligning films and assume a spray-strained state while remaining in an initial aligned state, and the molecules of the liquid crystal are further twisted by 180° in the first direction and released from the spray-strained state while remaining in the first metastable aligned state, or further twisted by 180° in a second direction opposite to the first direction and released from the spray-strained state while remaining in the second metastable aligned state.

At least one polarizing plate is positioned with its optical axis intersecting, at an angle other than an right angle, with a direction in which the liquid crystal molecules near the one of the substrates are aligned. The layer of liquid crystal and the polarizing plate constitute a liquid crystal optical element whose birefringent effect is controlled. The display device can therefore display different colors and present different gradations in accordance with the effective value of the voltage applied between the electrodes of each pixel, while the liquid crystal molecules remain in the first metastable aligned state and also while the liquid crystal molecules remain in the second metastable aligned state.

The liquid crystal display device according to the second aspect of the invention has a sufficiently broad operating voltage margin, though the liquid crystal cell is a simple matrix cell which is driven by a controlled derive signal. The cell can therefore be driven in high-duty time division. The display device according to the first aspect of the invention can display an image composed of a great number of pixels.

According to a third aspect of this invention, there is provided a method of driving a liquid crystal display device comprising a pair of substrates opposing each other, each having an electrode and an aligning plate on an inner surface, the aligning plate having been rubbed in a predetermined direction; a layer of bistable nematic liquid crystal sealed in a space between the substrate and spray-strained, the molecules of the liquid crystal assuming a first metastable aligned state or a second metastable aligned state in accordance with a voltage applied between the opposing electrodes; and at least one polarizing plate arranged at one of the substrates. The method comprises the steps of: applying a reset pulse voltage high enough to align the molecules almost vertically to the substrates, to the opposing electrodes; applying a plurality of state-selecting pulse voltages lower than the reset pulse voltage, for setting the molecules of the liquid crystal in the first and second metastable aligned states; and applying a control voltage between the opposing electrodes, for controlling the effective values of the state-selecting pulse voltages to tilt the molecules to the substrates, in accordance with data which is externally supplied and which is to be displayed.

In the method, the molecules of the liquid crystal are twisted in a first direction by 0° to 180° with respect to the rubbed direction of one of the aligning films and assume a spray-strained state while remaining in an initial aligned state, and the molecules of the liquid crystal are further twisted by 180° in the first direction and released from the spray-strained state while remaining in the first metastable aligned state, or further twisted by 180° in a second direction opposite to the first direction and released from the spray-strained state while remaining in the second metastable aligned state.

In the method, the liquid crystal display device is a birefringnece-controlled display device which has at least one polarizing plate having an optical axis intersecting, at an angle other than an right angle, with a direction in which the liquid crystal molecules near the one of the substrates are aligned, and the control voltage controls the effective values of the state-selecting pulse voltages applied between the opposing electrodes, so that the display present different gradations while the liquid crystal molecules remain in the first metastable aligned state and also while the liquid crystal molecules remain in the second metastable aligned state.

With this method it is possible to a sufficiently broad operating voltage margin can be imparted to the liquid crystal display device, though the liquid crystal cell is a simple matrix cell which is driven by a controlled derive signal. The cell can therefore be driven in high-duty time division. The method enables the display device to display an image composed of a great number of pixels.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention.

FIG. 7A is an exploded view of a liquid crystal display according to a second embodiment of the invention, showing the basic structure of the display and the initial aligned state of liquid crystal molecules;

FIG. 7B is an exploded view of the second embodiment, representing the first metastable aligned state of liquid crystal molecules;

FIG. 7C is an exploded view of the second embodiment, showing the second metastable aligned state of liquid crystal molecules;

FIG. 11A is an exploded view of a liquid crystal display according to a third embodiment of the invention, showing the basic structure of the display and the initial aligned state of liquid crystal molecules;

FIG. 11B is an exploded view of the third embodiment, representing the first metastable aligned state of liquid crystal molecules;

FIG. 11C is an exploded view of the third embodiment, showing the second metastable aligned state of liquid crystal molecules;

FIG. 22A is an exploded view of a liquid crystal display according to a fifth embodiment of this invention, depicting the basic structure of the display and the initial aligned state of liquid crystal molecules;

FIG. 22B is an exploded view of the fifth embodiment, representing the first metastable aligned state of liquid crystal molecules;

FIG. 22C is an exploded view of the fifth embodiment, showing the second metastable aligned state of liquid crystal molecules;

FIG. 26A is an exploded view of a liquid crystal display according to the six embodiment of the present invention, depicting the basic structure of the display and the initial aligned state of liquid crystal molecules;

FIG. 26B is an exploded view of a sixth embodiment, showing the first metastable aligned state of liquid crystal molecules;

FIG. 26C is an exploded view of the sixth embodiment, representing the second metastable aligned state of liquid crystal molecules;

FIG. 30A is an exploded view of a liquid crystal display according to a seventh embodiment of the invention, showing the basic structure of the display and the initial aligned state of liquid crystal molecules;

FIG. 30B is an exploded view of the seventh embodiment, illustrating the first metastable aligned state of liquid crystal molecules;

FIG. 30C is an exploded view of the seventh embodiment, representing the second metastable aligned state of liquid crystal molecules;

DETAILED DESCRIPTION OF THE INVENTION

Liquid crystal display devices which are embodiments of the present invention will be described below, with reference to the accompanying drawings.

First Embodiment

Figure 1:
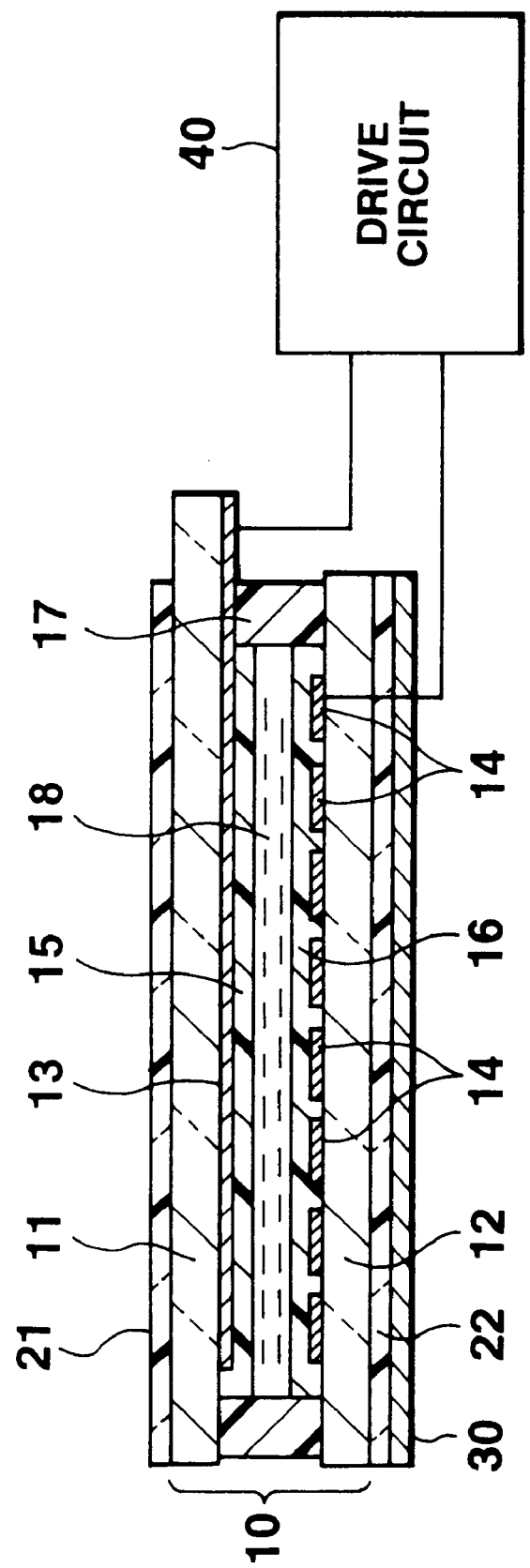
FIG. 1 is a sectional view of a liquid crystal display according to a first embodiment of the present invention.
Figure 2A:
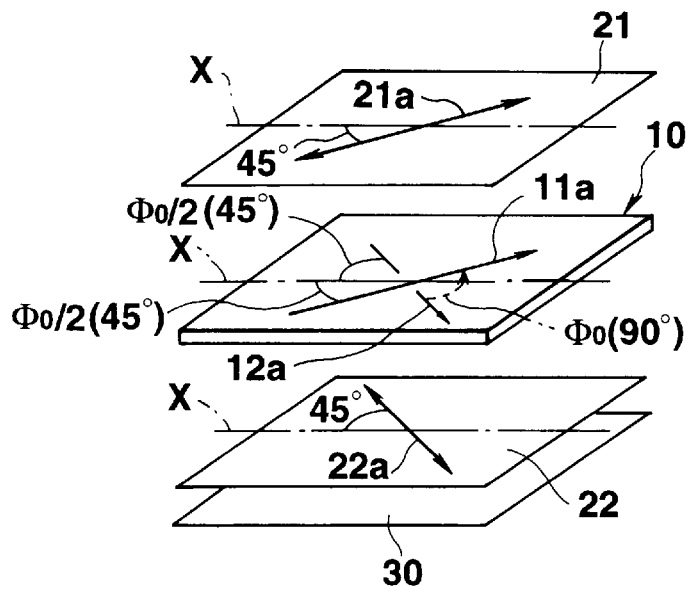
FIG. 2A is an exploded view of the first embodiment, illustrating the basic structure of the display and the initial aligned state of liquid crystal molecules.
Figure 2B:
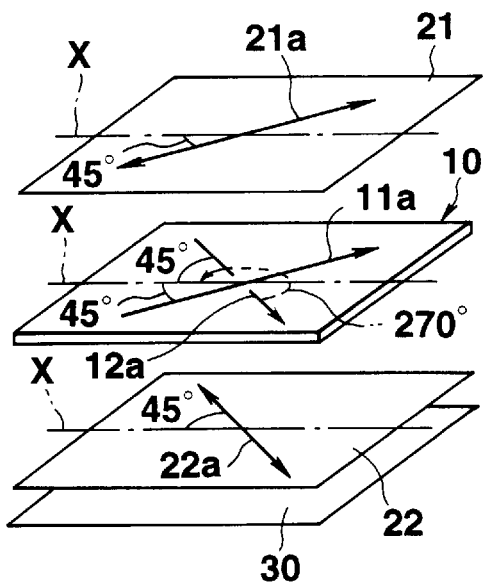
FIG. 2B is an exploded view of the first embodiment, representing the first metastable aligned state of liquid crystal molecules.
Figure 2C:
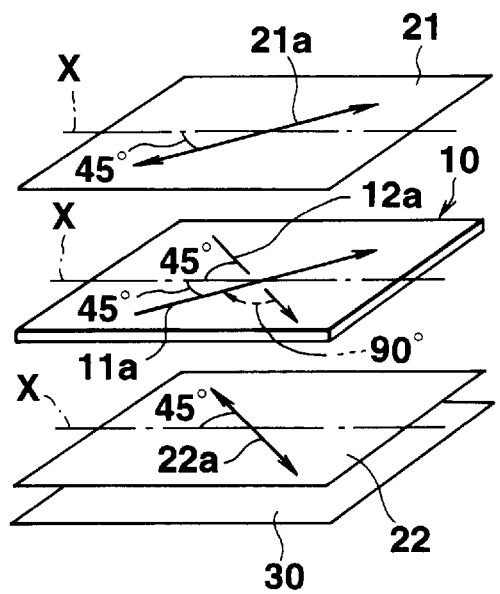
FIG. 2C is an exploded view of the first embodiment, showing the second metastable aligned state of liquid crystal molecules.

The liquid crystal display according to the first embodiment will be described, with reference to FIG. 1 to FIG. 6B. FIG. 1 is a sectional view of the liquid crystal device. FIGS. 2A to 2C are exploded views illustrating the basic structure of the liquid crystal device. More specifically, FIG. 2A shows the initial aligned state of liquid crystal molecules, FIG. 2B represents the first metastable aligned state of liquid crystal molecules, and FIG. 2C depicts the second metastable aligned state of liquid crystal molecules.

As shown in FIGS. 1, 2A, 2B and 2C, the liquid crystal display comprises a liquid crystal cell 10, polarizing plates 21 and 22, a reflective plate 30, and a drive circuit 40. The liquid crystal cell 10 is sandwiched between the polarizing plates 21 and 22. The reflective plate 30 is mounted on the outer surface of the second polarizing plate 22. The drive circuit 40 is connected to the liquid crystal cell 10.

As FIG. 1 shows, the liquid crystal cell 10 comprises two transparent substrates 11 and 12, two transparent electrodes 13 and 14, two aligning films 15 and 16, a frame-shaped sealing member 17, and liquid crystal 18. The substrates 11 and 12 are positioned parallel, one above the other, and oppose each other. The first electrode 13 is mounted on the inner surface of the first substrate 11, and the second electrode 14 on the inner surface of the second substrate 12. The first aligning film 15 is mounted on the inner surface of the first electrode 13, and the second aligning film 16 on the inner surface of the second electrode 14. The frame-shaped sealing member 17 is interposed between the transparent substrates 11 and 12, providing a closed space between the aligning films 15 and 16. Sealed in the closed space is the liquid crystal 18. The aligning films 15 and 16 are horizontal aligning films made of polyimide or the like. Having their surfaces rubbed in predetermined directions, the films 15 and 16 can align the molecules of the liquid crystal 18 in those directions, respectively.

The liquid crystal cell 10 is a simple matrix cell. The first transparent electrode 13 mounted on the inner surface of the first substrate 11 comprises a plurality of parallel scanning electrodes which extend in a direction (horizontal direction in FIG. 1). The second transparent electrode 14 mounted on the inner surface of the second substrate 12 comprises a plurality of parallel signal electrodes which intersect with the scanning electrodes at about right angles.

The liquid crystal 18 is nematic liquid crystal which contains chiral agent and which is therefore twisted nematic liquid crystal. In the initial aligned state, the molecules of the liquid crystal 18 are twisted by a twist angle $\Phi_0$ (positive angle) of about 90° with respect to the rubbed direction of one of the aligning films 15 and 16. In other words, the liquid crystal molecules assume so-called "spray-aligned state."

The drive circuit 40 drives the liquid crystal cell 10. First, the circuit 40 applies a reset pulse to the layer of liquid crystal 18. The voltage of the reset pulse is high enough to cause the liquid crystal molecules to stand almost perpendicular to the substrates 11 and 12. Then, the circuit 40 applies a first selection pulse to the layer of liquid crystal 18, the first selection pulse having a voltage lower than that of the reset pulse. The liquid crystal molecules are thereby twisted by a twist angle of about 270° (=$\Phi_0$+180°) with respect to the rubbed direction of one of the aligning films 15 and 16. Thus twisted, the liquid crystal molecules assume the state known as "first metastable aligned state." Alternatively, the circuit 40 applies a second selection pulse to the layer of liquid crystal 18, the second selection pulse having a voltage lower than that of the reset pulse. In this case, the liquid crystal molecules are twisted in the inverse direction (negative direction), or by a twist angle about −90° (=$\Phi_0$−180°) with respect to the rubbed direction of one of the aligning films 15 and 16. Thus twisted, the liquid crystal molecules assume the state known as "second metastable aligned state."

As seen from FIGS. 2A to 2C, the aligning films 15 and 16 have been rubbed in directions 11a and 12b, respectively. More precisely, the first aligning film 15 has been rubbed along a line inclined counterclockwise as viewed from the screen of the display, or inclined at an angle of about 45° to the horizontal axis X of the screen, from the lower-left corner to of the screen to the upper-right corner thereof. The second aligning film 16 has been rubbed along a line inclined clockwise as viewed from the screen, or inclined at an angle of about −45° to the axis X, from the upper-left corner to of the screen to the lower-right corner thereof. Namely, the directions 11a and 12a are indicated by two lines which intersect at about right angles.

As mentioned above, the liquid crystal 18 is nematic liquid crystal which contains chiral agent. The chiral agent rotates the molecules of the liquid crystal 18 counterclockwise as viewed from the screen of the display. Hence, the liquid crystal molecules are spray-strained and twisted counterclockwise in the initial aligned state, by an angle of about 90°.

In the initial aligned state, the liquid crystal molecules are aligned near the substrates 11 and 12 in the directions 11a and 12a, respectively, assuming a spray-aligned state. They are twisted by about 90° counterclockwise due to the chiral agent, as shown by the broken-line arrow in FIG. 2A, from the arrow indicating the direction 12a in which the aligning film 16 has been rubbed.

The liquid crystal cell 10 does not serve to display images while the molecules of the liquid crystal 18 remain in the initial aligned state. The liquid crystal cell 10 displays an image when the liquid crystal molecules assume either the first metastable aligned state or the second metastable aligned state.

To assume the first metastable state, the liquid crystal molecules in the initial aligned state are twisted by about 180°, counterclockwise as viewed from the screen (namely, in the direction defined by the chiral agent). As a result, the liquid crystal molecules are released from the spray-strained state. To assume the second metastable state, the liquid crystal molecules in the initial aligned state are twisted by about −180°, that is, clockwise as viewed from the screen (namely, in the direction inverse to the direction defined by the chiral agent). Also in this case, the liquid crystal molecules are released from the spray-strained state.

The initial aligned state is switched to the first or second metastable aligned state, in two steps of operation. First, a reset pulse is applied between the scanning electrode 13 and signal electrode 14 of each pixel of the liquid crystal cell 10, causing the liquid crystal molecules to stand almost perpendicular to the substrates 11 and 12. In other words, the molecules are released from the spray-strained state. Next, a first selection pulse is applied between the electrodes 13 and 14 of the pixel, setting the molecules in the first metastable aligned state. Alternatively, a second selection pulse is applied between the electrodes 13 and 14 of the pixel, thereby setting the molecules in the second metastable aligned state.

More specifically, after applying a reset pulse, aligning the liquid crystal molecules almost perpendicular to the substrates 11 and 12, a pulse (hereinafter called "first metastable state" selecting pulse) may be applied between the scanning electrode 13 and signal electrode 14 of the pixel. The first metastable state selecting pulse has an absolute voltage value Vs1 less than the reset pulse. The liquid crystal molecules in the initial aligned state are twisted by 180°. As a result, the molecules are twisted by 270° (=90°+180°) from the arrow indicating the direction 12a in which the aligning film 16 has been rubbed. The liquid crystal molecules are released from the spray-strained state. They assume the first metastable aligned state.

In the first metastable aligned state, the liquid crystal molecules near the substrate 11 are aligned in the direction 11a, whereas the liquid crystal molecules near the substrate 12 are aligned in the direction 12a. Furthermore, the liquid crystal molecules are twisted by about 270°, counterclockwise due to the chiral agent, as shown by the broken-line arrow in FIG. 2B, from the arrow representing the direction 12a in which the aligning film 16 has been rubbed.

After applying a reset pulse, aligning the liquid crystal molecules almost perpendicular to the substrates 11 and 12, a pulse (hereinafter called "second metastable state" selecting pulse) may be applied between the electrodes 13 and 14 of the pixel. The second metastable state selecting pulse has an absolute voltage value Vs2 lower than the reset pulse. The liquid crystal molecules in the initial aligned state are twisted by −180°. As a result, the molecules are twisted by −90° (=90°−180°) from the arrow indicating the direction 12a in which the aligning film 16 has been rubbed. The liquid crystal molecules are released from the spray-strained state. They assume the second metastable aligned state.

In the second metastable aligned state, the liquid crystal molecules near the substrate 11 are aligned in the direction 11a, whereas the liquid crystal molecules near the substrate 12 are aligned in the direction 12a. Furthermore, the liquid crystal molecules are twisted by about 90°, clockwise or in the direction inverse to the direction defined by the chiral agent, as shown by the broken-line arrow in FIG. 2C, from the arrow representing the direction 12a in which the aligning film 16 has been rubbed.

The aligned stage of the liquid crystal molecules can be switched from the first metastable aligned state to the second metastable aligned state, and vice versa. To switch the first metastable aligned state to the second semi-aligned aligned state, the reset pulse is applied between the scanning electrode 13 and signal electrode 14 of each pixel, setting the liquid crystal molecules in the initial aligned state, and the second metastable state selecting pulse is applied between the electrodes 13 and 14. Conversely, to switch the second metastable aligned state to the first semi-aligned aligned state, the reset pulse is applied between the electrodes 13 and 14 of the pixel, setting the liquid crystal molecules in the initial aligned state, and the first metastable state selecting pulse is applied between the electrodes 13 and 14.

The absolute value Vs1 of the first metastable state selecting pulse and the absolute value Vs2 of the second metastable state selecting pulse are determined by the characteristic of the liquid crystal 18 and the characteristic and amount of the chiral agent contained therein. The value Vs1 is less than the value Vs2—that is, Vs1<Vs2. The value Vs1 is substantially 0 V, and the value Vs2 is small, barely enough to tilt the liquid crystal molecules to the substrates 11 and 12 at an angle which is equal or similar to a pre-tilt angle.

Figure 3:
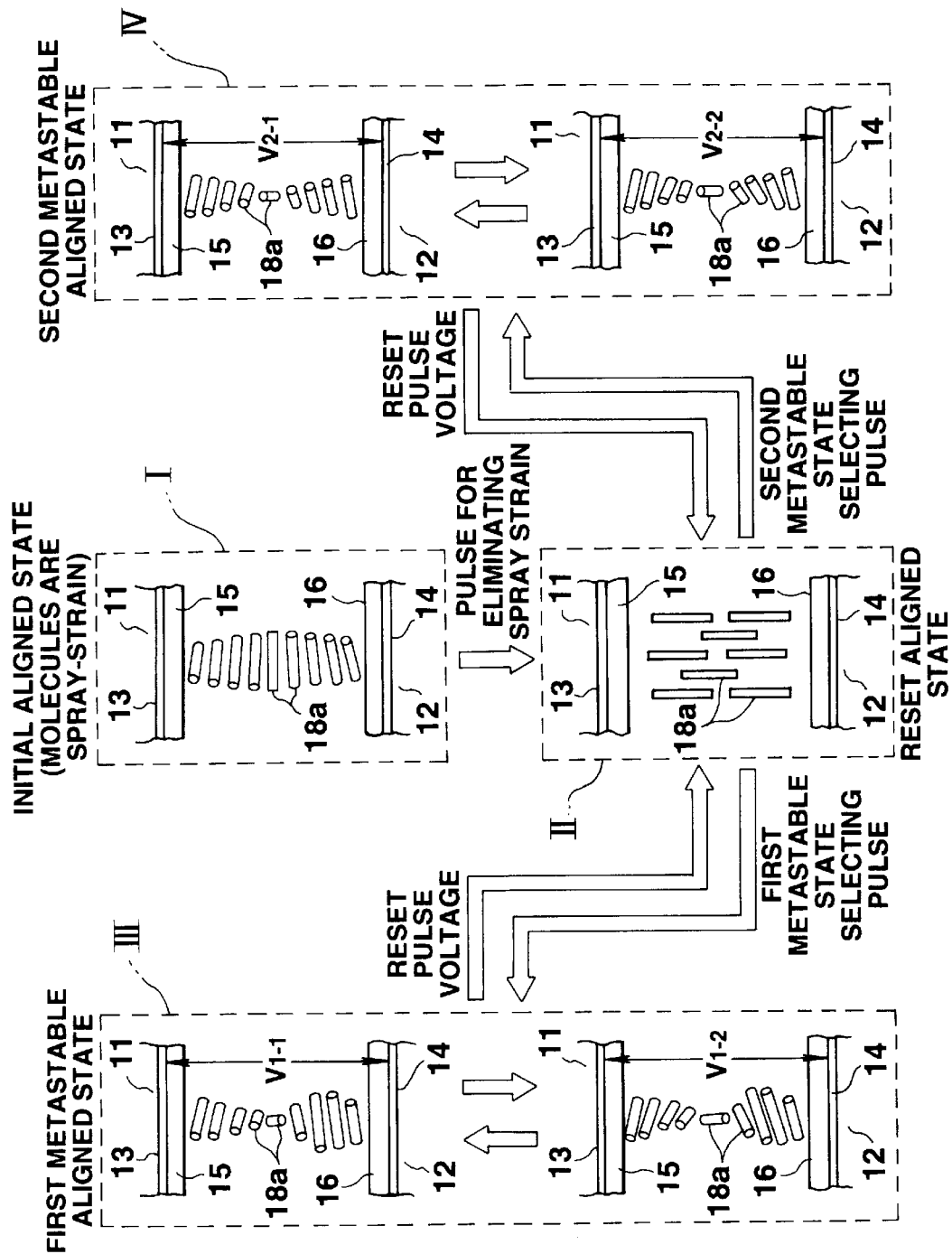
FIG. 3 is a diagram showing the initial aligned state, reset aligned state, first metastable aligned state and second metastable aligned state which the liquid crystal molecules may assume in the first embodiment.

FIG. 3 is a diagram showing how the molecules 18a of the liquid crystal 18 are aligned and twisted as viewed from the lower side of the liquid crystal cell 10, or in the direction perpendicular to the horizontal axis X of the screen, in the initial aligned state I, reset aligned state II, first metastable aligned state III and second metastable aligned state IV.

In the initial aligned state I, the liquid crystal molecules 18a near the substrates 11 and 12 are twisted counterclockwise by a twist angle $\Phi_0$ of 90° as viewed from the screen, from the arrow representing the direction 12a in which the aligning film 16 has been rubbed. They are tilted toward the substrates 11 and 12, respectively, by a tilt angle of several degrees. Were these molecules 18a are not twisted and have their major axes in the same plane, they would be pre-tilted in the opposite directions. Thus, the farther away liquid crystal molecules 18a are from the substrate 11 or 12, the smaller their pre-tilt angles. Any molecule 18a located above the midpoint between the substrates 11 and 12 is tilted in the opposite direction to the direction in which any other molecule 18a located below said midpoint is tilted. In short, the liquid crystal molecules are twisted and spray-strained in the initial aligned state I.

In the reset aligned state II, the liquid crystal molecules 18a near the substrates 11 and 12 are tilted by a several degrees toward the substrates 11 and 12, respectively, as in the initial aligned state I. Most of the other molecules 18a remote from the substrates 11 and 12 stand almost perpendicular to the substrates 11 and 12.

In the first metastable aligned state III, the liquid crystal molecules 18a are twisted in one direction by a twist angle $\Phi_0$ of 270°. Also in the first metastable aligned state III, the molecules near the substrates 11 and 12 are tilted by a several degrees toward the substrates 11 and 12, respectively, as in the initial aligned state I. The molecule 18a at the midpoint between the substrates 11 and 12 is further twisted by about 180°; it is therefore twisted by about angle $\Phi_1$ of 270° (=$\Phi_0$+180°). In the first metastable aligned state III, the liquid crystal molecules 18a are twisted by 270° and not spray-strained.

In the second metastable aligned state IV, the liquid crystal molecules 18a are twisted by an angle $\Phi_2$ of −90°— that is, by 90° in the direction opposite to the direction in which they are twisted in the first metastable aligned state III. Also in the second metastable aligned state IV, the molecules near the substrates 11 and 12 are tilted by a several degrees toward the substrates 11 and 12, respectively, as in the initial aligned state I. The molecules 18a are twisted by 180° in the direction in the direction opposite to the direction in which they are twisted in the first metastable aligned state III. Were the molecules 18a are not twisted and have their major axes in the same plane, they would be tilted in the same direction. That is, the liquid crystal molecules 18a in the second metastable aligned state are twisted and not spray-strained.

In both metastable aligned states, the liquid crystal molecules 18a remain twisted and tilted to the substrates 11 and 12. The angle by which the molecules 18a are tilted depends on an effective value of a voltage applied between the opposing electrodes 13 and 14 (i.e., the effective value (RMS value) denotes root-mean-square of a voltage applied between the opposing electrodes 13 and 14) of each pixel during an inter-frame period.

Of the diagrams representing the first metastable aligned state, the upper half shows the aligned state the molecules 18a assume when the first metastable state selecting pulse has a relatively small absolute value $V_{1-1}$, and the lower half illustrates the aligned state the molecules 18a assume when the first metastable state selecting pulse has a relatively large absolute value $V_{1-2}$. Similarly, of the diagrams representing the second metastable aligned state, the upper half shows the aligned state the molecules 18a assume when the second metastable state selecting pulse has a relatively small absolute value $V_{2-1}$, and the lower half illustrates the aligned state the molecules 18a assume when the second metastable state selecting pulse has a relatively large absolute value $V_{2-2}$. In whichever state shown in FIG. 3, the liquid crystal molecules 18a are tilted in accordance with the absolute value of the state selecting pulse, while assuming a twisted state specific to the metastable aligned state which is specific to the metastable aligned state.

The liquid crystal molecules 18a remain in the first metastable aligned state or the second metastable aligned state until the reset pulse is applied between the electrodes 13 and 14 of the pixel to set the molecules 18a into the initial aligned state.

As seen from FIG. 2A, the first polarizing plate 21 is positioned with its light-transmitting axis 21a extending substantially in parallel to the arrow indicating the direction 11a in which the aligning film 15 has been rubbed. Alternatively, the plate 21 may be so positioned that its light-transmitting axis 21a intersecting with the arrow indicating the direction 11a, substantially at right angles. On the other hand, the second polarizing plate 22 is positioned with its light-transmitting axis 22a intersecting with the arrow indicating the direction 12a in which the aligning film 16 has been rubbed, substantially at right angles.

The drive circuit 40 supplies scanning signals to the scanning electrodes 13 of the liquid crystal cell 10, one after another. The circuit 40 also supplies data signals to the signal electrodes 14 of the cell 10, one after another. Each data signal is supplied to one signal electrode 14, exactly at the same time a scanning signal is supplied to one scanning electrode 13. As a result, a voltage, i.e., the potential difference between the scanning signal and the data signal, is applied between the electrodes 13 and 14 of the pixel. After applying a reset pulse between the electrodes 13 and 14 of the pixel, the drive circuit 40 applies the first or second metastable state selecting pulse between the electrodes 13 and 14 and then supplies to the pixel a drive signal whose effective voltage is far lower than the reset pulse.

The liquid crystal display shown in FIG. 1 is a reflective display which utilizes external light such as natural light and light emitted from lamps on the ceiling. The reflective plate 30 reflects the light applied to the front of the display. Before the display is driven, the liquid crystal molecules of the cell 10 remain in the initial aligned state (they are aligned and spray-strained). When the reset pulse is applied between the electrodes 13 and 14 of each pixel, the liquid crystal molecules 18a stand almost perpendicular to the substrates 11 and 12. A metastable state selecting voltage is then applied between the electrodes 13 and 14. The liquid crystal molecules 18a are therefore set into either the first metastable aligned state or the second metastable aligned state in accordance with the value of the voltage applied.

The drive circuit 40 may applies the reset pulse between the electrodes 13 and 14 of every pixel when the power switch of the liquid crystal display is turned on, and may then apply either the first or second metastable state selecting pulse between the electrodes 13 and 14 of every pixel. Then, the liquid crystal molecules 18a of all pixels are set into either the first metastable aligned state or the second metastable aligned state. The liquid crystal display can therefore display images.

In the liquid crystal display described above which comprises a liquid crystal cell 10 and two polarizing plates 21 and 22, the liquid crystal molecules 18a of the cell 10 assume either the first metastable aligned state or the second metastable aligned state. When set in the first metastable aligned state, the molecules 18a are twisted in one direction by a twist angle of about 270°, from the line indicating the direction in which one of the aligning films 15 and 16 has been rubbed. When set in the second metastable aligned state, the molecules 18a are twisted in the opposite direction by a twist angle of about 90°, from the line indicating the direction in which one of the aligning films 15 and 16 has been rubbed.

In other words, the liquid crystal display has the electrooptical characteristics of two liquid crystal displays which are different in terms of the alighted state of the liquid crystal molecules. The electrooptical characteristics of both displays are used to control the transmittance of each pixel, thereby to control the gray-scale level of the pixel.

In the first embodiment described above, the light-transmitting axes 21a of the first polarizing plate 21 extends substantially in parallel or substantially at right angles to the arrow indicating the direction 11a in which the aligning film 15 has been rubbed, and the light-transmitting axis 22a of the second polarizing plate 22 intersects with the light-transmitting axis 21a of the first polarizing plate 21 substantially at right angles. Hence, the first embodiment can display images in twisted nematic mode (hereinafter referred to as "TN mode") of normally white type, by setting the liquid crystal molecules 18a in the first metastable aligned state. No matter whether the molecules 18a assume the first or second metastable aligned state, the linearly polarized light beam emitted from the polarizing plate 21 is rotated due to the twisted liquid crystal molecules as it passes through the liquid crystal cell 10, by virtue of the birefringent action of the layer of the liquid crystal 18. The light beam thus rotated is applied to the second polarizing plate 22. The second polarizing plate 22 controls the passage of the light beam. The reflective plate 30 reflects the light beam emitted from the second polarizing plate 22. The light beam thus reflected passes through the second polarizing plate 22, the liquid crystal cell 10 and the first polarizing plate 21.

While set in the first metastable aligned state, the liquid crystal molecules 18a remain much twisted by about 270°. As long as the molecules 18a are so twisted, the rays of different wavelengths pass through the second polarizing plate 22, each in a different transmittance because the layer of liquid crystal 18 exhibits different optical rotatory powers to these rays, respectively. The light applied from the second polarizing plate 22 to the reflective plate 30 has color defined by the intensity ratio among the rays of different wavelengths, which compose the light.

When the liquid crystal molecules 18a assume the first metastable aligned state while the display operates in TN mode, the display presents a color image. The color of the image depends upon the effective value of the drive signal applied between the electrodes 13 and 14 of each pixel.

The molecules 18a are tilted in accordance with the effective value of the drive signal while remaining in the first metastable aligned state. As the molecules 18a are thus tilted, the birefringent property of the layer of liquid crystal 18 changes. That is, the optical rotatory powers the liquid crystal layer exhibits to the incident rays change. Hence, each pixel can present different colors by changing the effective value of the drive signal applied between the electrodes 13 and 14.

A color image can be displayed by virtue of the birefringent action which the liquid crystal layer of the liquid crystal cell 10 performs and the polarization which the polarizing plates 21 and 22 accomplish. The light applied is less absorbed in the display than in a color liquid display which has color filters to display color images. Although the display is a reflective display, it emits the light at high transmittance, displaying a bright color image.

On the other hand, when the liquid crystal molecules 18a assume the second metastable aligned state while the display operates in TN mode, they are twisted by a twist angle of almost 90°. In this case, the color liquid crystal display works, basically in the same way as a TN-type, monochrome liquid crystal display. As described above, the polarizing plates 21 and 22 are positioned with their light-transmitting axes 21a and 22a intersecting at almost right angles. Each pixel therefore looks white when the liquid crystal molecules 18a are tilted by an angle close to the pre-tilt angle. As the tilt angle of the molecules 18a increases, the transmittance of the pixel decreases. Finally, the pixel appears black. While staying in the second metastable aligned state, the liquid crystal molecules 18a of each pixel are tilted in accordance with the effective value of the drive signal applied between the electrodes 13 and 14 of the pixel, and the birefringent property of the liquid crystal layer changes. Each pixel can appear white, black and any gray scale when the effective value of the drive signal applied to it is changed. The display can therefore display gray-scale images.

When the liquid crystal molecules 18a assume the initial aligned state, they are twisted by almost 90° and spray-strained. Thus, the color liquid crystal display can work, basically in the same way as a TN-type, monochrome liquid crystal display, to display a black-and-white image. In practice, however, the initial aligned state of the molecules 18a is not utilized to display images.

Figure 4A:
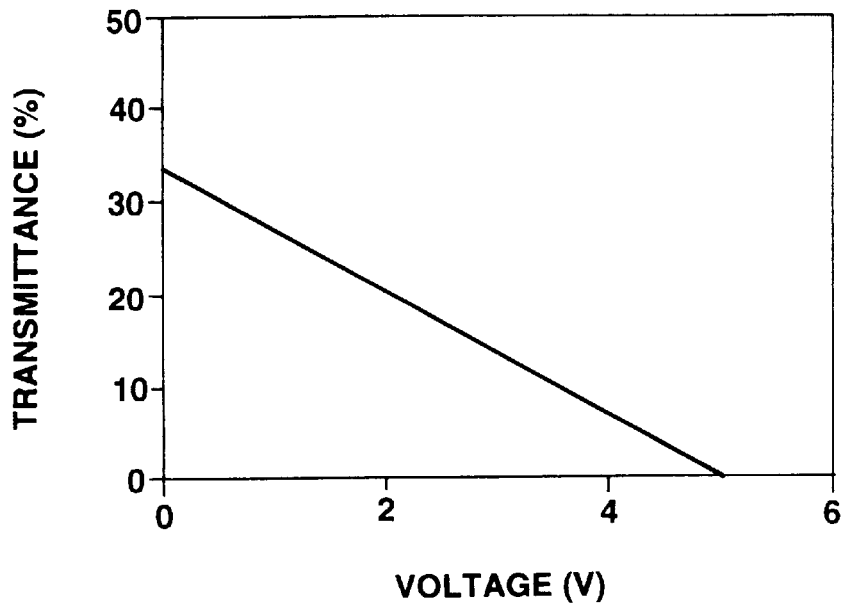
FIG. 4A is a graph representing the voltage-transmittance characteristic which the first embodiment exhibits when the liquid crystal molecules assume the initial aligned state.
Figure 4B:
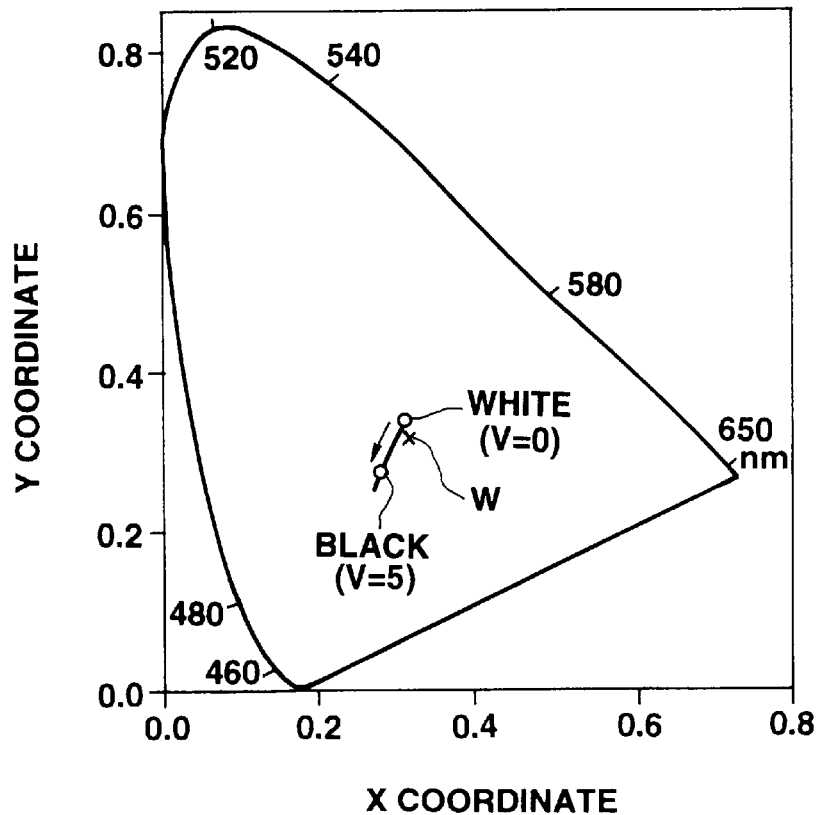
FIG. 4B is a diagram of the CIE choromaticity which each pixel of the first embodiment presents when the liquid crystal molecules assume the initial aligned state.
Figure 5A:
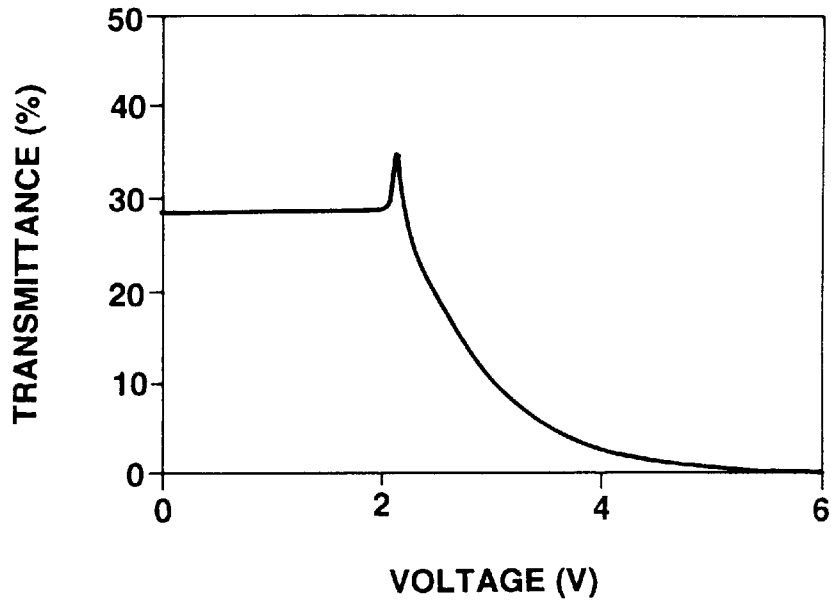
FIG. 5A is a graph representing the voltage-transmittance characteristic which the first embodiment has when the liquid crystal molecules assume the first metastable aligned state.
Figure 5B:
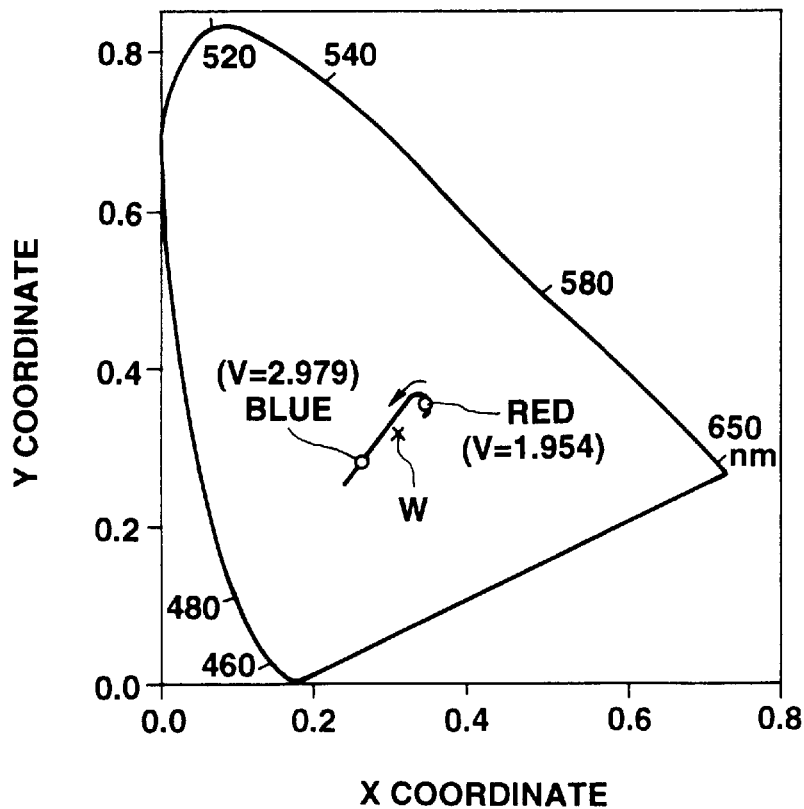
FIG. 5B is a diagram of the CIE choromaticity which each pixel of the first embodiment presents when the liquid crystal molecules assume the first metastable aligned state.
Figure 6A:
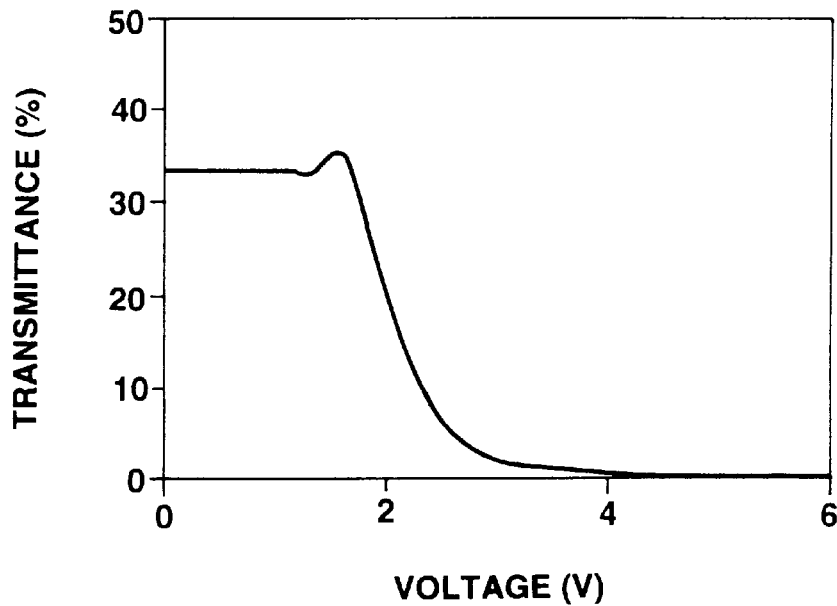
FIG. 6A is a graph illustrating the voltage-transmittance characteristic which the first embodiment presents when the liquid crystal molecules assume the second metastable aligned state.
Figure 6B:
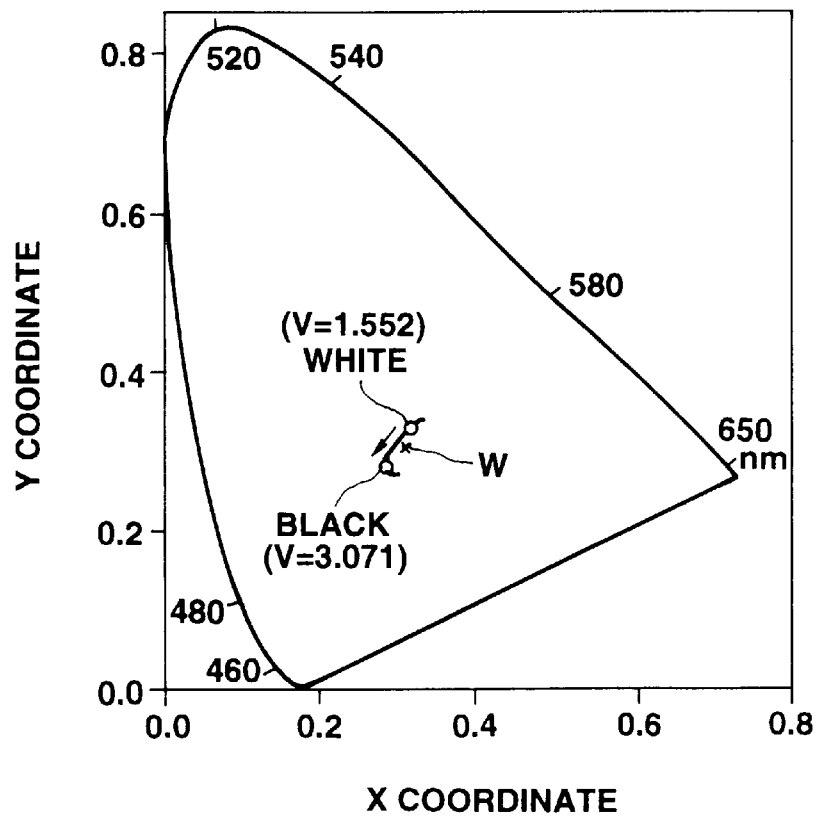
FIG. 6B is a diagram of the CIE choromaticity which each pixel of the first embodiment presents when the liquid crystal molecules assume the second metastable aligned state.

FIGS. 4A to 6B show how the transmittance of the liquid crystal layer and the color of each pixel change with the voltage applied to the pixel (i.e., a voltage denotes root-mean-square of the drive signal) when the value $\Delta$nd (i.e., the product of the optical anisotropy $\Delta$n of liquid crystal 18 and the thickness d of the liquid crystal layer) is about 1000 nm in the liquid crystal display illustrated in FIG. 2A. More specifically, FIG. 4A represents the voltage-transmittance characteristic which the display shown in FIG. 2A exhibits when the liquid crystal molecules assume the initial aligned state. FIG. 4B is a diagram of the CIE choromaticity which each pixel of the display presents when the liquid crystal molecules assume the initial aligned state. FIG. 5A shows the voltage-transmittance characteristic which the display (FIG. 2A) has when the liquid crystal molecules assume the first metastable aligned state. FIG. 5B is a diagram of the CIE choromaticity which each pixel presents when the liquid crystal molecules assume the first metastable aligned state. FIG. 6A shows the voltage-transmittance characteristic which the first embodiment presents when the liquid crystal molecules assume the second metastable aligned state. FIG. 6B is a diagram representing the CIE choromaticity which each pixel presents when the liquid crystal molecules assume the second metastable aligned state.

As seen from FIG. 4A, the transmittance of each pixel changes substantially in proportion to the voltage applied to the pixel when the liquid crystal molecules assume the initial aligned state. As FIG. 4B shows, the pixel appears white when no voltage (0 V) is applied to it. The pixel appears black when applied with a voltage (e.g., 5 V) which is high enough to cause the molecules 18$a$ to stand almost perpendicular to the substrates 11 and 12.

As FIG. 5A shows, the transmittance of the liquid crystal layer remains high and almost unchanged when the voltage applied ranges from 0 V to about 2 V, and abruptly decreases when the voltage rises above 2 V, as long as the liquid crystal molecules 18$a$ assume the first metastable aligned state. As clearly seen from FIG. 5B, the pixel appears red when applied with a voltage of 1.954 V, and blue when applied with a voltage of 2.979 V, while the liquid crystal molecules remain in the first metastable aligned state. X- and Y-coordinate values of the red are 0.353 and 0.350, respectively (x=0.353, y=0.350). Y value (i.e., brightness) of the red is 28.54. X- and Y-coordinate values of the blue are 0.274 and 0.296, respectively (x=0.274, y=0.296). Y value (i.e., brightness) of the red is 11.64.

As FIG. 6A shows, the transmittance of the liquid crystal layer remains high and almost unchanged when the voltage applied ranges from 0 V to about 1.5 V, and sharply decreases when the voltage rises above 1.5 V, as long as the liquid crystal molecules 18$a$ assume the second metastable aligned state. As can be understood from FIG. 6B, the pixel appears white when applied with a voltage of 1.552 V, and black when applied with a voltage of 3.071 V, while the liquid crystal molecules remain in the second metastable aligned state. X- and Y-coordinate values of the white are 0.317 and 0.341, respectively (x=0.317, y=0.341). Y value of the white is 34.41. X- and Y-coordinate values of the black are 0.271 and 0.290, respectively (x=0.271, y=0.290). Y value (i.e., brightness) of the black is 1.83.

As indicated above, each pixel of the first embodiment appears either red or blue while the liquid crystal molecules 18$a$ remain in the first metastable aligned state, and appears either white or black while the molecules 18$a$ remain in the second metastable aligned state. The first embodiment can therefore display not only black-and-white images but also red-and-blue images. The molecules 18$a$ are aligned almost vertically and the pixel presents most intensely black, when the drive circuit 40 supplies the reset pulse to the pixel. However, the pixel does not appear black to human eyes since the reset pulse is applied to the pixel for an extremely short time.

When the power switch of the drive circuit 40 is turned off, the liquid crystal molecules 18$a$ in the first or second metastable aligned state come to assume the initial aligned state within a few seconds to a few minutes due to natural discharging. (The time within which the molecules 18$a$ assume the initial aligned state depends upon the characteristic of the liquid crystal 18 and the characteristic and amount of the chiral agent contained therein.) The screen of the display therefore entirely appears white as in the case where no voltage is applied to the pixels while the crystal molecules 18$a$ remain in the initial aligned state.

As described above, the first embodiment has the electrooptical characteristics of two liquid crystal displays which differ in the alighted state of liquid crystal molecules. The characteristics of one display are used to control some of the gray-scale levels of each pixel or some of color tones of the pixel, and the characteristics of the other display are used to control the remaining gray-scale levels of the pixel or the remaining color tones of the pixel. To be more specific, the liquid crystal molecules 18$a$ are set in the first metastable aligned state and the transmittance of each pixel is controlled, whereby the pixel presents one of the gray-scale level or color tones of the first set, and the molecules 18$a$ are set in the second metastable aligned state and the transmittance of each pixel is controlled, whereby the pixel presents one of the gray-scale level or color tones of the second set.

Hence, the drive signal only needs to be time-divided far less minutely, providing fewer segment signals for driving the pixels while the molecules 18$a$ remain in the first or metastable aligned state, than in the case where each pixel is driven to present one of the gay-scale level or color tones of both sets while the molecules 18$a$ remain in a single metastable aligned state. As a result, any adjacent two of the segment signals corresponding to the adjacent gray-scale levels or color tones of the first set have a great difference in terms of their effective values, and so do any adjacent two of the segment signals corresponding to the adjacent gray-scale levels or color tones of the second set. The difference in effective value between any two adjacent segment signals, i.e., the operating voltage margin, is broad enough for the display to provide a clear gray-scale image or a clear color image.

In order to display a red-and-blue image, it suffices to supply a segment signal of 1.954 V to some pixels and a segment signal of 2.979 V to some other pixels while the liquid crystal molecules 18$a$ remain in the first metastable aligned state. The difference in effective value between the segment signals, i.e., the operating voltage margin, is 1.025 V (=2.979 V−1.954 V) which is sufficiently broad. To display a black-and-white image, it suffices to supply a segment signal of 1.552 V to some pixels and a segment signal of 3.071 V to some other pixels while the liquid crystal molecules remain in the second metastable aligned state. In this case, too, the operating voltage margin, is 1.519 V (=3.071 V−1.552 V) which is sufficiently broad.

Hence, the operating voltage margin can be broad, making it possible to drive the liquid crystal cell 10 in high-duty time division, though the cell 10 is a simple matrix cell which is driven by a controlled derive signal. The liquid crystal display according to the first embodiment can therefore display an image composed of a great number of pixels.

While the liquid crystal molecules 18$a$ remain in the first metastable aligned state, each pixel can appear either red or blue. It presents red when Δnd of the cell 10 is set at a certain value, and blue when Δnd of the cell 10 is set at another value.

The liquid crystal 18 sealed in the cell 10 is one which exhibits viscosity of 30 cp (centimeter-poise) or more (preferably, 30 to 45 cp) and elastic constant ratio $K_{33}/K_{11}$ of 1.5 or more (preferably, 1.5 to 2.2). The liquid crystal molecules 18a are therefore stable in the first metastable aligned state and the second metastable aligned state. Stable in whichever metastable aligned state, the molecules 18a can be reliably aligned in various ways in accordance with the effective value of the voltage applied to each pixel. The liquid crystal cell 10 can therefore serve to display high-quality images.

Four liquid crystals were prepared which had different physical properties shown in Table 1 presented below. Four liquid crystal displays were made which contained the four liquid crystals, respectively, each having 64 rows of pixels which form eight groups. These displays were driven. In each display, eight groups of pixels are driven one after another, eight or nine times (forming 8 or 9 frames), thereby displaying one image. The reliability with which each display operated was evaluated. The results were as is shown in Table 1. The values for the optical anisotropy Δn, viscosity and elastic constant ratio $K_{33}/K_{11}$, all shown in Table 1, are those measured at room temperature.

TABLE 1

| Physical property | Crystal A | Crystal B | Crystal C | Crystal D |
|---|---|---|---|---|
| N-I (°C.) | 81 | 88 | 109 | 103 |
| C-N (°C.) | −25 | −25 | −25 | −25 |
| Δn | 0.22 | 0.22 | 0.22 | 0.22 |
| Viscosity (cp) | 24 | 39 | 42 | 36 |
| $K_{33}/K_{11}$ | 2.0 | 1.2 | 2.0 | 1.6 |
| Evaluation | X | X | ○ | ○ |

The display containing the liquid crystal A and the display containing the liquid crystal B displayed images with flicker. This is because the liquid crystal A exhibited a large elastic constant ratio (2.0) but insufficient viscosity of 24 cp, and the liquid crystal B exhibited high viscosity of 39 but an insufficient elastic constant ratio of 1.2. In these displays, the liquid crystal molecules returned from the metastable aligned state toward the initial aligned state (i.e., spray-strained state), as the groups of pixels were repeatedly driven one after another thereby to display one image. Consequently, the display using the liquid crystals A and B, respectively, were found to display images with insufficient reliability as is seen form Table 1.

By contrast, the display containing the liquid crystal C and the display containing the liquid crystal D displayed images without flicker. This is because the liquid crystal C exhibited an sufficient elastic constant ratio (2.0) and a sufficient viscosity of 42 cp, and the liquid crystal D also exhibited an sufficient elastic constant ratio (1.6) and a sufficient viscosity of 36 cp. Thus, the liquid crystal molecules were stable while assuming either metastable aligned state. A long time passed until the molecules in either metastable aligned state returned to the C initial aligned state (i.e., spray-strained state) as the groups of pixels are repeatedly driven one after another, thereby to display one image.

Therefore, the liquid crystal 18 used in the first embodiment is either the liquid crystal C or the liquid crystal D. In each pixel, the liquid crystal molecules 18a are aligned in accordance with the effective value of the voltage applied to the pixel, while remaining in either the first metastable state or the second metastable aligned state. The liquid crystal display according to the first embodiment can display high-quality images.

The liquid crystals for use in the first embodiment are not limited to the liquid crystals C and D mentioned above. The liquid crystal display according to the first embodiment may have a layer of any liquid crystal liquid that exhibits viscosity of 30 cp or more and an elastic constant ratio $K_{33}/K_{11}$ of 1.5 or more at room temperature. Preferably, the liquid crystal 18 is one which exhibits viscosity of 30 to 45 cp and an elastic constant ratio $K_{33}/K_{11}$ of 1.5 to 2.2. More preferably, the liquid crystal 18 is one which exhibits viscosity of 34 to 42 cp and an elastic constant ratio $K_{33}/K_{11}$ of 1.5 to 2.0.

The liquid crystal D is more stable in either metastable aligned state than the liquid crystal C. Thus, it is more desirable than the liquid crystal C. If the liquid crystal display according to the first embodiment has a layer of the liquid crystal D or similar liquid crystal, which exhibits viscosity of 34 to 38 pc and a ratio $K_{33}/K_{11}$ of 1.5 to 1.7, it will display images of higher quality.

The liquid crystal 18 may be one which has dielectric anisotropy Δε of 10 or more. In this case, the liquid crystal molecules 18a of each pixel can be fast reset into the initial aligned state when the reset pulse is applied to the pixel, as will be understood from the results of an experiment described below.

Three liquid crystals E, F and G were prepared which had different physical properties shown in Table 2 presented below. Three liquid crystal cells were made which contained the three liquid crystals, respectively. Reset pulses were applied to these liquid crystal cells. How fast the liquid crystals E, F and G responded to the reset pulse (responsibility) was recorded in units of milliseconds (msec).

TABLE 2

| Physical property | Crystal E | Crystal F | Crystal G |
|---|---|---|---|
| N-I (°C.) | 75 | 95 | 86 |
| C-N (°C.) | −25 | −25 | −25 |
| Δn | 0.205 | 0.200 | 0.210 |
| Viscosity (cp) | 44 | 31 | 35 |
| Δε | +6.2 | +7.4 | +12.7 |
| Responsibility (msec) | 4 | 4 | 2 |

As can be seen from Table 2, the liquid crystal E whose dielectric anisotropy Δε was 6.2 and the liquid crystal F whose dielectric anisotropy Δε was 7.4 slowly responded to the reset pulse. By contrast, the liquid crystal G whose dielectric anisotropy Δε was 12.7 quickly responded to the reset pulse.

The reset response of each liquid crystal is defined as the time which elapses until the liquid crystal molecules are aligned almost vertically. The liquid crystal E exhibited a reset response of about 4 msec when the reset voltage was 50 V, and the liquid crystal F exhibited a reset response of about 4 msec when the reset voltage was 40 V. By contrast, the liquid crystal G exhibited a reset response of about 2 msec when the reset voltage was 40 V.

That is, the liquid crystal G responded to the reset pulse about twice as fast as the liquid crystals E and F. Thus, if the liquid crystal G is used in the liquid crystal display (the first embodiment), it will be suffice to apply the reset voltage to each pixel for only a short time, in order to reset the aligned state of the liquid crystal molecules. Hence, the molecules can be more quickly switched between the first and metastable aligned states, than in the case where either the liquid crystal F or the liquid crystal F is sealed in the display.

Thus, if the display contains the liquid crystal G, the liquid crystal cell 10 can be driven in high-duty time division. The liquid crystal display can therefore display a high-resolution image, i.e., an image which is composed of a great number of pixels.

Instead of the liquid crystal G which exhibits dielectric anisotropy $\Delta\epsilon$ of 12.7, liquid crystal whose dielectric anisotropy $\Delta\epsilon$ of 10 or more may be used in the first embodiment. If this is the case, the time for which the reset voltage must be applied to each pixel can be much shortened, making it possible to switch the metastable aligned state of the molecules, form one to the other.

In the first embodiment described above, each pixel can appear either red or blue while the liquid crystal molecules 18a remain in the first metastable aligned state. The pixel presents red when $\Delta nd$ of the cell 10 is set at a certain value, and blue when $\Delta nd$ of the cell 10 is set at another value.

Further, the first embodiment operates in TN mode, no matter whichever metastable aligned state the liquid crystal molecules 18a assume. When the molecules 18a assume the first metastable aligned state, the device displays a color image. When the molecules 18a assume the second metastable aligned state, the device displays a black-and-white image. The first polarizing plate 21 may be positioned with its light-transmitting axis 21a inclined to the direction 11a in which the aligning film 15 has been rubbed. In this case, the first embodiment can display color images in birefringent mode, whichever metastable aligned state the molecules 18a assume.

Second Embodiment

The liquid crystal display according to the second embodiment will be described, with reference to FIG. 7A to FIG. 10B. FIG. 7A illustrates the initial aligned state of the liquid crystal molecules. FIG. 7B represents the first metastable aligned state of liquid crystal molecules. FIG. 7C depicts the second metastable aligned state of liquid crystal molecules.

The second embodiment is identical in basic structure to the first embodiment shown in FIG. 1. The components identical to those of the liquid cell of the first embodiment are designated at the same reference numerals and will not be described in detail.

As shown in FIG. 1, the liquid crystal display according to the second embodiment comprises a liquid crystal cell 10, polarizing plates 21 and 22, a reflective plate 30, and a drive circuit 40. The liquid crystal cell 10 is sandwiched between the polarizing plates 21 and 22. The reflective plate 30 is mounted on the outer surface of the second polarizing plate 22. The drive circuit 40 is connected to the liquid crystal cell 10.

The liquid crystal cell 10 is identical in structure to its counterpart of the first embodiment, but different in the initial aligned state, first metastable aligned state and second metastable aligned which the liquid crystal molecules assume.

The molecules of the liquid crystal 18 are twisted by a twist angle $\Phi_0$ of about 180° with respect to the rubbed direction of one of the aligning films 15 and 16. In other words, the liquid crystal molecules assume so-called "spray-aligned state." The drive circuit 40 applies a reset pulse to the layer of liquid crystal 18. The voltage of the reset pulse is high enough to cause the liquid crystal molecules to stand almost perpendicular to the substrates 11 and 12. Then, the circuit 40 applies a first selection pulse to the layer of liquid crystal 18, the first selection pulse having a voltage lower than that of the reset pulse. The liquid crystal molecules are thereby twisted by a twist angle of about 360° ($=\Phi_0+180°$) with respect to the rubbed direction of one of the aligning films 15 and 16. Thus twisted, the liquid crystal molecules assume the first metastable aligned state. Alternatively, the circuit 40 applies a second selection pulse to the layer of liquid crystal 18, the second selection pulse having a voltage lower than that of the reset pulse. In this case, the liquid crystal molecules are not twisted and aligned parallel to the rubbed direction of one of the aligning films 15 and 16 and assume the second metastable aligned state.

The aligning films 15 and 16 have been rubbed in directions 11a and 12b, respectively, as illustrated in FIG. 2A. More precisely, the first aligning film 15 has been rubbed along a line inclined at about 90° to the X axis of the screen of the display, from the lower edge to upper edge of the screen. On the other hand, the second aligning film 16 has been rubbed also along a line inclined at about 90° to the X axis of the screen of the display, but from the lower edge to upper edge of the screen.

The liquid crystal 18 is one containing chiral agent which rotates the molecules of the liquid crystal 18 counterclockwise as viewed from the screen of the display. In the initial aligned state, the molecules of this liquid crystal 18 are twisted by a twist angle of about 180° counterclockwise as viewed from the screen of the display, as is indicated by the broken-line arrow in FIG. 7A.

The liquid crystal molecules of the cell 10 are further twisted by about 180° counterclockwise in the first metastable aligned state, and further by about 180° clockwise in the second metastable aligned state, as seen from the screen of the display. As a result, the molecules are twisted by about 360° counterclockwise in the first metastable aligned state and not twisted at all in the second metastable aligned state, with respect to the direction 12a in which the second aligning film 16 has been rubbed. In either metastable aligned state, the molecules are no longer spray-strained.

To be more specific, after applying a reset pulse to each pixel, thus aligning the liquid crystal molecules almost perpendicular to the substrates 11 and 12, a first metastable state selecting pulse may be applied to the pixel. The first metastable state selecting pulse has an absolute voltage value Vs1 lower than the reset pulse. The liquid crystal molecules in the initial aligned state are further twisted by about 180° counterclockwise as viewed from the display screen. As a result, the molecules are twisted by 360° in total ($=180°+180°$) from the direction 12a in which the aligning film 16 has been rubbed. Thus, the liquid crystal molecules assume the first metastable aligned state and are released from the spray-strained state.

Alternatively, a second metastable state selecting pulse may be applied to the pixel after applying a reset pulse to each pixel, thus aligning the liquid crystal molecules almost perpendicular to the substrates 11 and 12. The second metastable state selecting pulse has an absolute voltage value Vs2 lower than the reset pulse. In this case, the liquid crystal molecules in the initial aligned state are further twisted by about –180°, or by 180° clockwise as viewed from the display screen. The molecules are therefore twisted by 0° in total ($=180°-180°$) from the direction 12a in which the aligning film 16 has been rubbed. In other words, the liquid crystal molecules assume the second metastable aligned state; they are not twisted at all, released from the spray-strained state.

As seen from FIG. 7A, the liquid crystal cell 10 is sandwiched between the polarizing plates 21 and 22. The first polarizing plate 21 is positioned with its light-transmitting axis 21a inclined at about 45° to the arrow indicating the direction 11a in which the aligning film 15 has been rubbed. On the other hand, the second polarizing plate 22 is positioned with its light-transmitting axis 22a inclined at about 90° to the light-transmitting axis 21a of the first polarizing plate 21.

As described above, the first polarizing plate 21 is positioned with its light-transmitting axis 21a inclined at about 45° to the direction 11a. The liquid crystal display can therefore operate in birefringent mode, no matter whether each pixel has its transmittance controlled while the liquid crystal molecules remain in the first metastable aligned state or the second metastable aligned state.

The display according to the second embodiment can display a color image in birefringent mode. In the birefringent mode, each pixel presents a color by virtue of the birefringent action which the liquid crystal layer of the liquid crystal cell 10 performs and the polarization which the polarizing plates 21 and 22 accomplish. The light applied is less absorbed in the display than in a color liquid display which has color filters to display color images.

The second polarizing plate 22 polarizes the incident rays having different wavelengths in one way while the liquid crystal molecules remain in the first metastable aligned state and in another way while the liquid crystal molecules remain in the second metastable aligned state. Therefore, the light passing through the polarizing plate 22 represents one color while the liquid crystal molecules remain in the first metastable aligned state and another color while the liquid crystal molecules remain in the second metastable aligned state. In other words, the color the pixel represents when the liquid crystal molecules assume the first metastable aligned state differs from the color it presents when the molecules assume the second metastable aligned state.

Figure 8A:
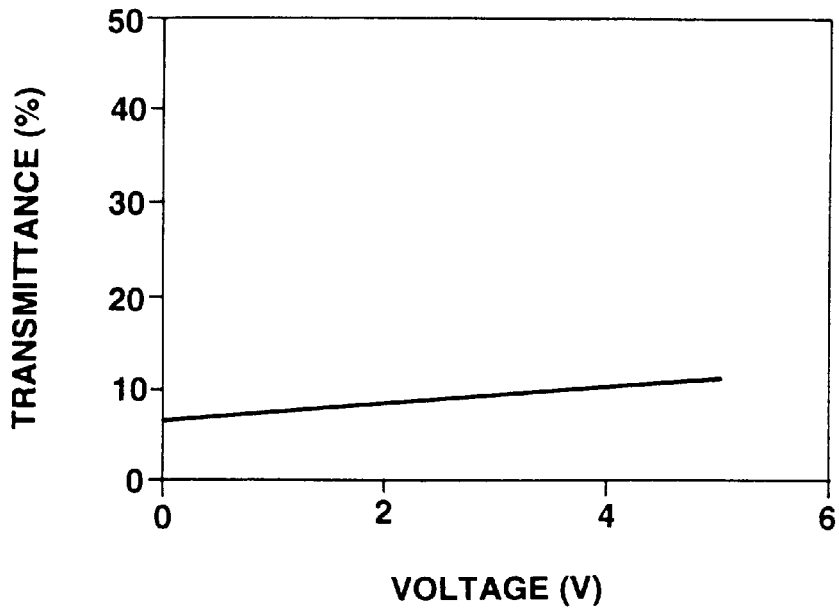
FIG. 8A is a graph representing the voltage-transmittance characteristic which the second embodiment exhibits when the liquid crystal molecules assume the initial aligned state.
Figure 8B:
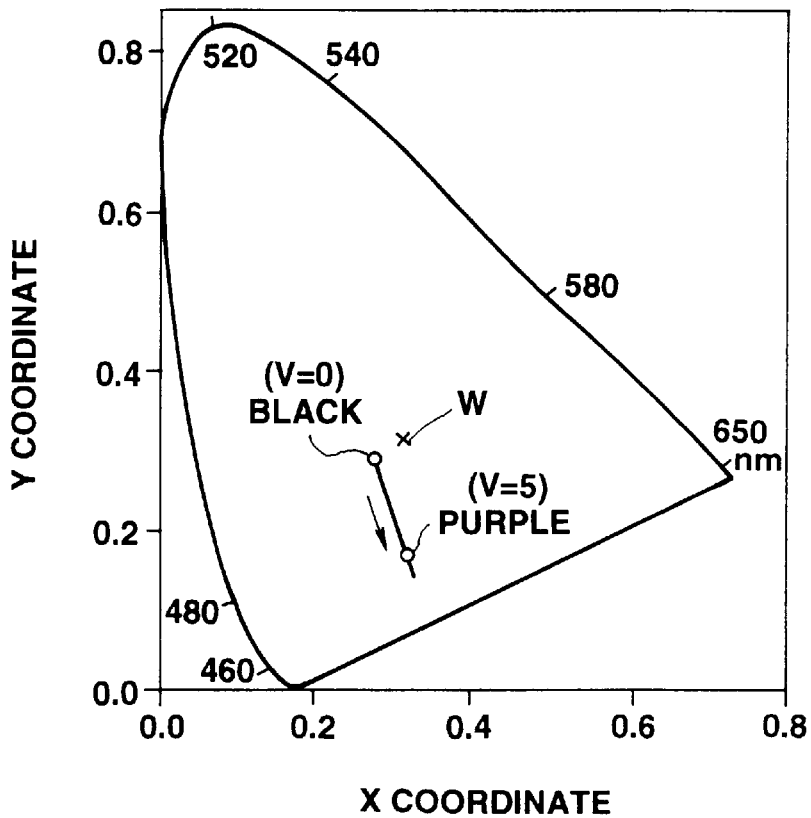
FIG. 8B is a diagram of the CIE choromaticity which each pixel of the second embodiment presents when the liquid crystal molecules assume the initial aligned state.
Figure 9A:
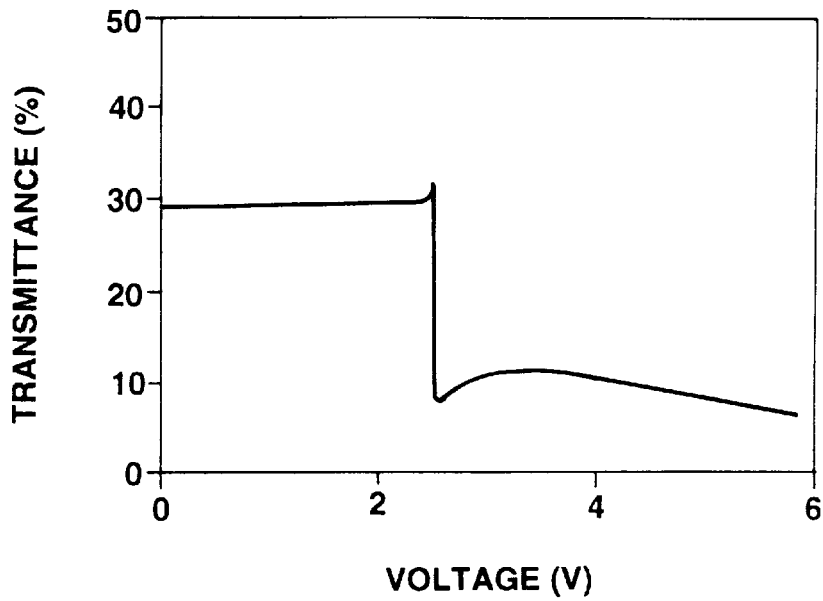
FIG. 9A is a graph representing the voltage-transmittance characteristic which the second embodiment has when the liquid crystal molecules assume the first metastable aligned state.
Figure 9B:
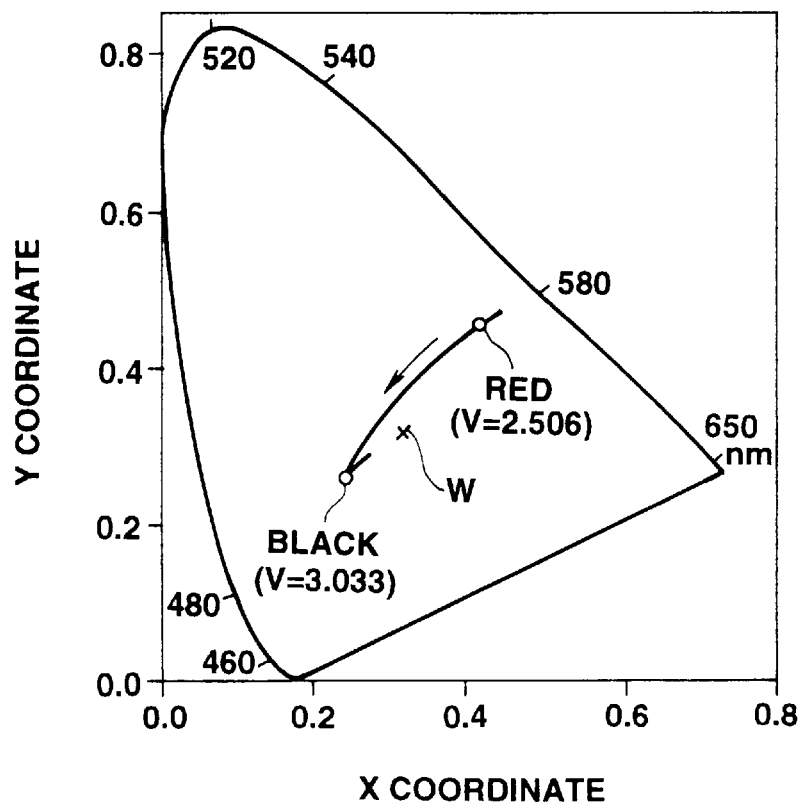
FIG. 9B is a diagram of the CIE choromaticity which each pixel of the second embodiment presents when the liquid crystal molecules assume the first metastable aligned state.
Figure 10A:
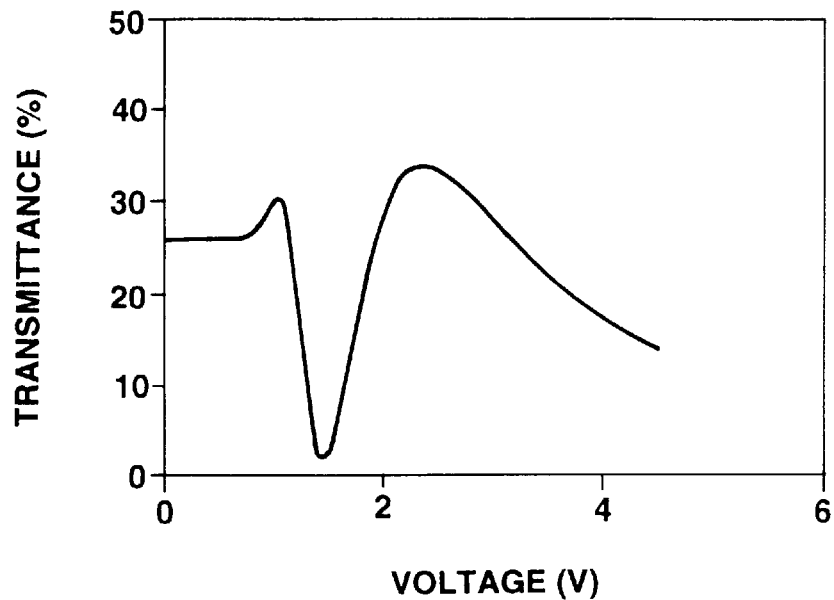
FIG. 10A is a graph illustrating the voltage-transmittance characteristic which the second embodiment presents when the liquid crystal molecules assume the second metastable aligned state.
Figure 10B:
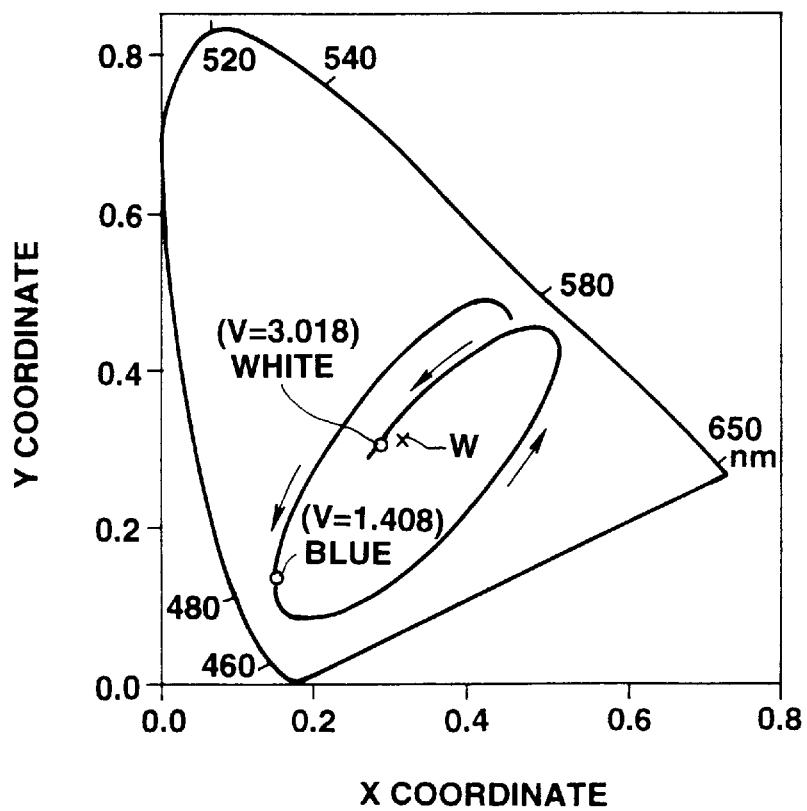
FIG. 10B is a diagram of the CIE choromaticity which each pixel of the second embodiment presents when the liquid crystal molecules assume the second metastable aligned state.

FIGS. 8A and 10B show how the transmittance of liquid crystal layer and the color of each pixel change with the voltage applied to the pixel (i.e., the effective value of the drive signal) when the value Δnd of the liquid crystal cell 10 is about 900 nm in the liquid crystal display shown in FIG. 7A. More specifically, FIG. 8A represents the voltage-transmittance characteristic the display shown in FIG. 7A exhibits when the liquid crystal molecules assume the initial aligned state. FIG. 8B is a diagram of the CIE choromaticity each pixel of the display presents when the liquid crystal molecules assume the initial aligned state. FIG. 9A shows the voltage-transmittance characteristic the display (FIG. 7A) has when the liquid crystal molecules assume the first metastable aligned state. FIG. 9B is a diagram of the CIE choromaticity each pixel presents when the liquid crystal molecules assume the first metastable aligned state. FIG. 10A shows the voltage-transmittance characteristic the second embodiment presents when the liquid crystal molecules assume the second metastable aligned state. FIG. 10B is a diagram representing the CIE choromaticity each pixel presents when the liquid crystal molecules assume the second metastable aligned state.

As seen from FIG. 8A, the transmittance of each pixel changes substantially in proportion to the voltage applied to the pixel when the liquid crystal molecules assume the initial aligned state. As FIG. 8B shows, the pixel appears almost black when no voltage (0 V) is applied to it. The pixel appears purple when applied with a resent voltage (e.g., 5 V).

As FIG. 9A shows, the transmittance of the liquid crystal layer remains high and almost unchanged when the voltage applied ranges from 0 V to about 2.5 V, and abruptly decreases when the voltage rises above 2.5 V, as long as the liquid crystal molecules assume the first metastable aligned state. As clearly seen from FIG. 9B, the pixel appears red when applied with a voltage of 2.506 V, and black when applied with a voltage of 3.033 V, while the liquid crystal molecules remain in the first metastable aligned state. X- and Y-coordinate values of the red are 0.418 and 0.460, respectively (x=0.418, y=0.460). Y value (i.e., brightness) of the red is 30.13. X- and Y-coordinate values of the blue are 0.271 and 0.291, respectively (x=0.271, y=0.291). Y value of the blue is 11.6.

As FIG. 10A shows, the transmittance of the liquid crystal layer in two ranges of voltages, from 0 V to about 1.0 V and from about 2.0 V to about 3.0 V, sharply decreases when the voltage rises above about 1.0 V and increases as the voltage rises to about 2.0 V, and gradually decreases when the voltage rises above about 3.0 V, as long as the liquid crystal molecules assume the second metastable aligned state. As can be understood from FIG. 10B, the pixel appears blue when applied with a voltage of 1.408 V, and white applied with a voltage of 3.018 V, while the liquid crystal molecules remain in the second metastable aligned state. X- and Y-coordinate values of the blue are 0.152 and 0.138, respectively (x=0.152, y=0.138). Y value of the blue is 5.7. X- and Y-coordinate values of the white are 0.290 and 0.314, respectively (x=0.290, y=0.314). Y value of the white is 26.7.

As indicated above, each pixel of the second embodiment appears either red or black while the liquid crystal molecules remain in the first metastable aligned state, and appears either blue or white while the molecules remain in the second metastable aligned state. The second embodiment can therefore display not only black-and-white images but also red-and-blue images.

Third Embodiment

The liquid crystal display according to the third embodiment will be described, with reference to FIG. 1A to FIG. 14B. FIG. 11A depicts the initial aligned state of the liquid crystal molecules. FIG. 11B represents the first metastable aligned state of liquid crystal molecules. FIG. 11C represents the second metastable aligned state of liquid crystal molecules.

The third embodiment has the same basic structure as the first embodiment shown in FIG. 1. The components identical to those of the liquid cell of the first embodiment are designated at the same reference numerals and will not be described in detail.

Namely, as seen from FIG. 1, the display according to the third embodiment comprises a liquid crystal cell 10, polarizing plates 21 and 22, a reflective plate 30, and a drive circuit 40. The liquid crystal cell 10 is sandwiched between the polarizing plates 21 and 22. The reflective plate 30 is mounted on the outer surface of the second polarizing plate 22. The drive circuit 40 is connected to the liquid crystal cell 10.

The liquid crystal cell 10 is identical in structure to its counterpart of the first embodiment, but different in the initial aligned state, first metastable aligned state and second metastable aligned which the liquid crystal molecules assume.

The molecules of the liquid crystal are not twisted at all and spray-strained in the initial aligned state. After applying a reset pulse to the layer of the liquid crystal 18, the drive circuit applies a first selection pulse to the layer of liquid crystal 18, the first selection pulse having a voltage lower than that of the reset pulse. The liquid crystal molecules are thereby twisted by a twist angle of about 180° in one direction. Thus twisted, the liquid crystal molecules assume the first metastable aligned state. Alternatively, the circuit 40 applies a second selection pulse to the layer of liquid crystal 18, the second selection pulse having a voltage lower than that of the reset pulse. In this case, the liquid crystal molecules are twisted by −180°, or by 180° in the opposite direction, and assume the second metastable aligned state.

The aligning films 15 and 16 have been rubbed in directions 11a and 12b, respectively, as shown in FIG. 11A. More precisely, both aligning films 15 and 16 have been rubbed along a line parallel to the X axis of the screen of the display, from the left edge to right edge of the screen. That is, the directions 11a and 12a are identical.

The liquid crystal is one containing chiral agent which rotates the molecules of the liquid crystal counterclockwise as viewed from the screen of the display. In the initial aligned state, however, the molecules of this liquid crystal are not twisted at all as is indicated by the broken-line arrow in FIG. 11A. They are aligned along the directions 11a and 12a in which the plates 15 and 16 have been rubbed and are spray-strained.

The liquid crystal molecules of the cell 10 are twisted by about 180° counterclockwise in the first metastable aligned state, and by 180° clockwise in the second metastable aligned state, as seen from the screen of the display. In either metastable aligned state, the molecules are no longer spray-strained.

More specifically, after applying a reset pulse to each pixel, a first metastable state selecting pulse may be applied to the pixel. The liquid crystal molecules in the initial aligned state are thereby further twisted by about 180° counterclockwise as viewed from the display screen, as is indicated by the broken-line arrow in FIG. 11B. As a result, the molecules are twisted by 180° in total (=0°+180°) from the direction 12a in which the aligning film 16 has been rubbed. Thus, the liquid crystal molecules assume the first metastable aligned state and are released from the spray-strained state.

Alternatively, a second metastable state selecting pulse may be applied to the pixel after applying a reset pulse to each pixel. In this case, the liquid crystal molecules in the initial aligned state are further twisted by about −180°, or by 180° clockwise as viewed from the display screen. The molecules are therefore twisted by −180° in total (=0°−180°) from the direction 12a, as indicated by the broken-line arrow shown in FIG. 11C. In other words, the liquid crystal molecules assume the second metastable aligned state, released from the spray-strained state.

As seen from FIG. 11A, the liquid crystal cell 10 is sandwiched between the polarizing plates 21 and 22. The first polarizing plate 21 is positioned with its light-transmitting axis 21a inclined at about 45° to the arrow indicating the direction 11a in which the aligning film 15 has been rubbed. On the other hand, the second polarizing plate 22 is positioned with its light-transmitting axis 22a inclined at about 90° to the light-transmitting axis 21a of the first polarizing plate 21.

Since the first polarizing plate 21 is positioned with its light-transmitting axis 21a inclined at about 45° to the direction 11a, the third embodiment can operate in birefringent mode as the second embodiment, no matter whether each pixel has its transmittance controlled while the liquid crystal molecules remain in the first metastable aligned state or the second metastable aligned state.

Figure 12A:
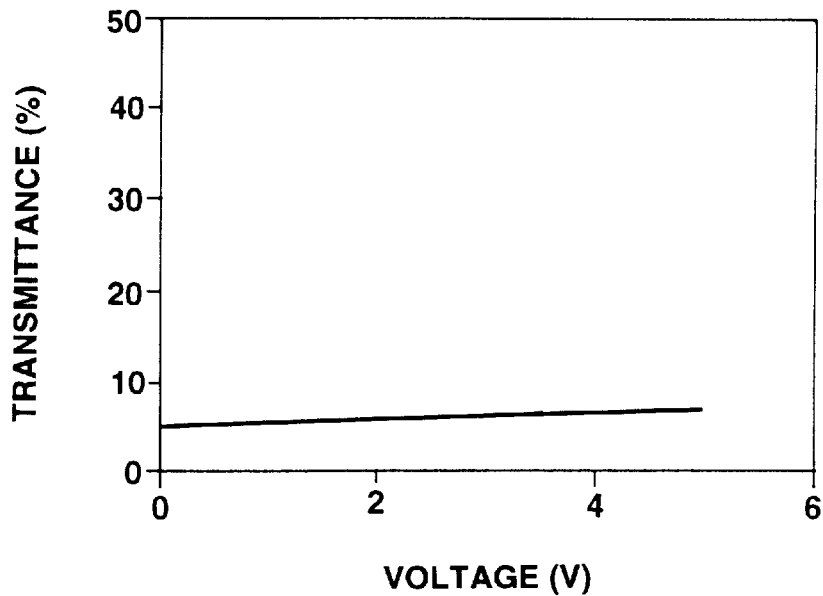
FIG. 12A is a graph illustrating the voltage-transmittance characteristic which the third embodiment exhibits when the liquid crystal molecules assume the initial aligned state.
Figure 12B:
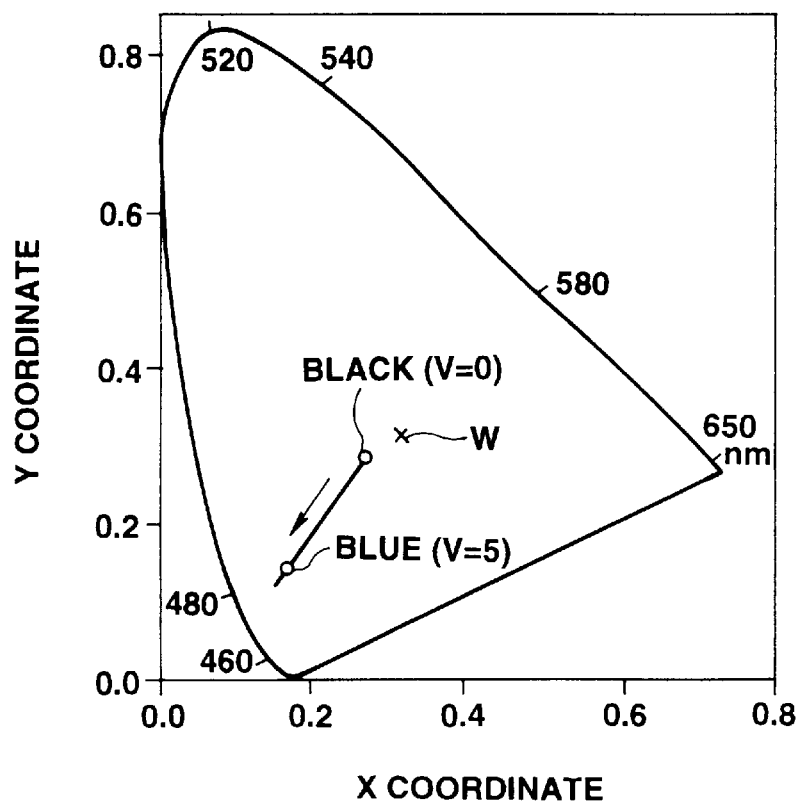
FIG. 12B is a diagram of the CIE choromaticity which each pixel of the third embodiment presents when the liquid crystal molecules assume the initial aligned state.
Figure 13A:
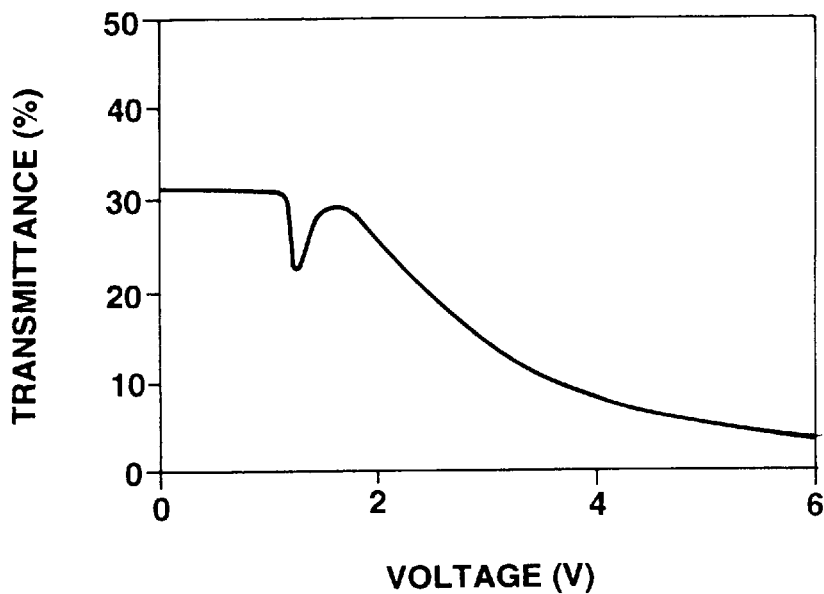
FIG. 13A is a graph representing the voltage-transmittance characteristic which the third embodiment has when the liquid crystal molecules assume the first metastable aligned state.
Figure 13B:
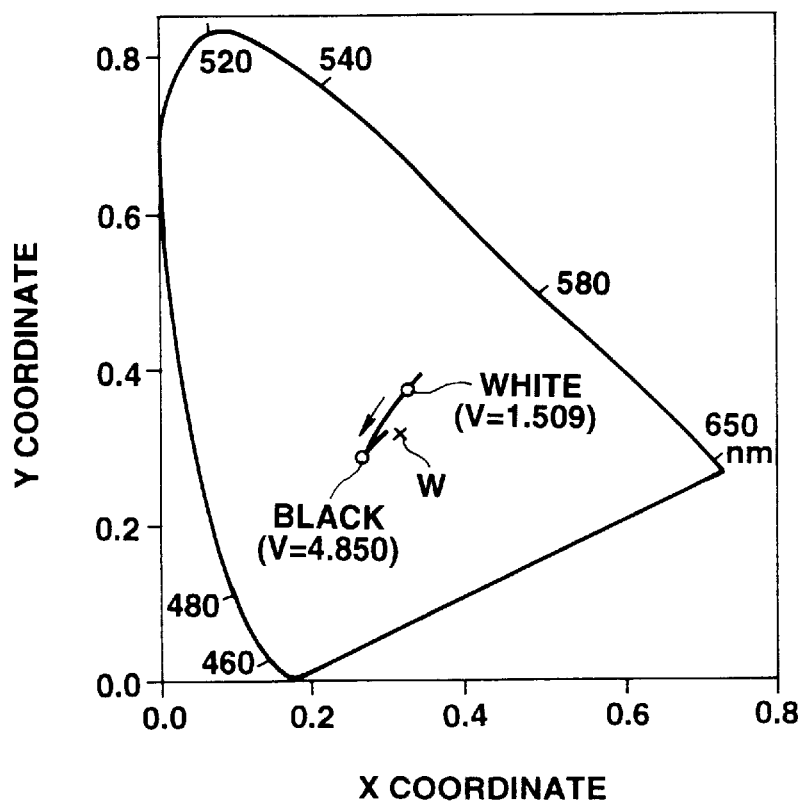
FIG. 13B is a diagram of the CIE choromaticity which each pixel of the third embodiment presents when the liquid crystal molecules assume the first metastable aligned state.
Figure 14A:
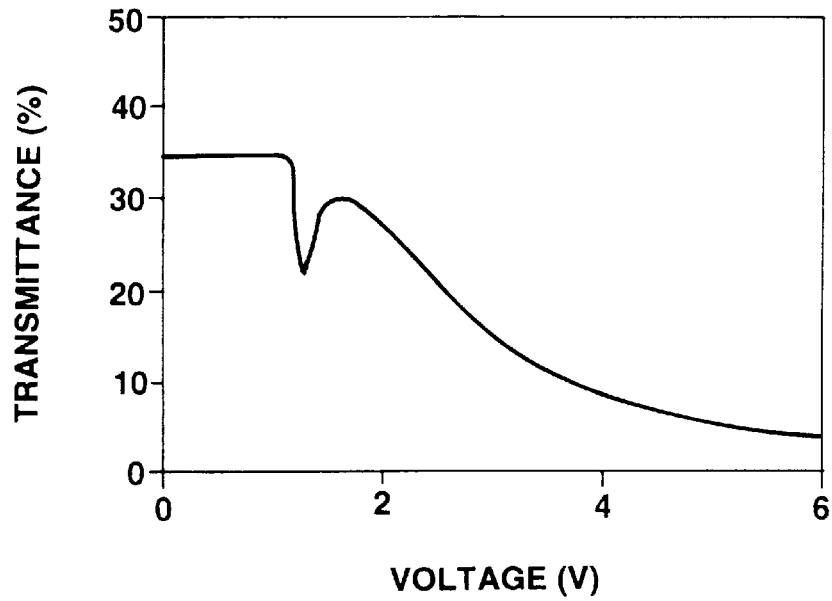
FIG. 14A is a graph illustrating the voltage-transmittance characteristic which the third embodiment presents when the liquid crystal molecules assume the second metastable aligned state.
Figure 14B:
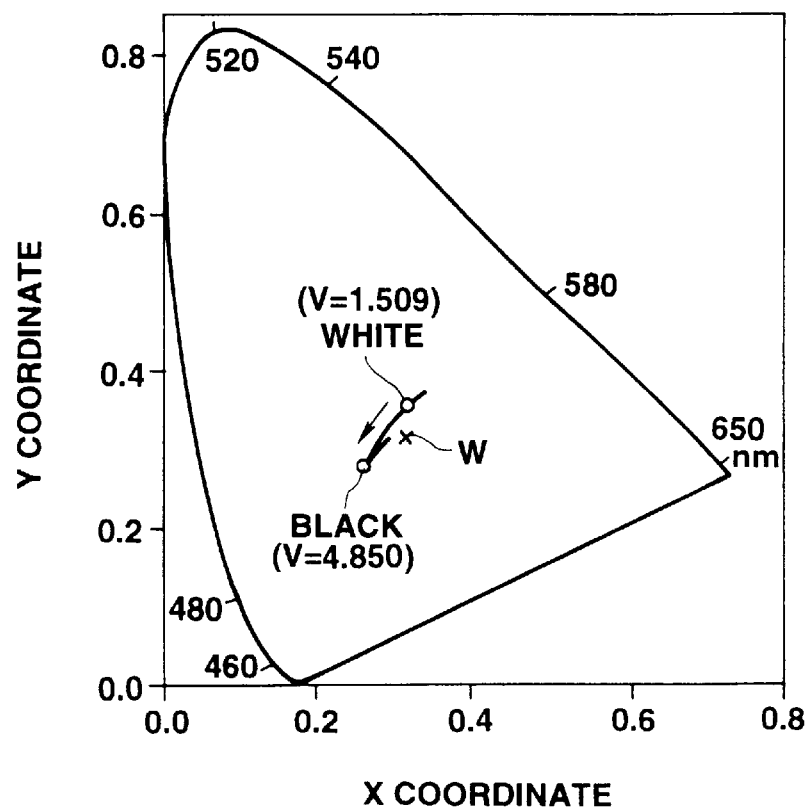
FIG. 14B is a diagram of the CIE choromaticity which each pixel of the third embodiment presents when the liquid crystal molecules assume the second metastable aligned state.

FIGS. 12A to 14B show how the transmittance of the liquid crystal layer and the color of each pixel change with the voltage applied to the pixel (i.e., the effective value of the drive signal) when the value Δnd of the liquid crystal cell 10 is about 600 nm in the liquid crystal display illustrated in FIG. 11A. More specifically, FIG. 12A represents the voltage-transmittance characteristic the display shown in FIG. 11A exhibits when the liquid crystal molecules assume the initial aligned state. FIG. 12B is a diagram of the CIE choromaticity each pixel of the display presents when the liquid crystal molecules assume the initial aligned state. FIG. 13A shows the voltage-transmittance characteristic the display (FIG. 11A) has when the liquid crystal molecules assume the first metastable aligned state. FIG. 13B is a diagram of the CIE choromaticity each pixel presents when the liquid crystal molecules assume the first metastable aligned state. FIG. 14A illustrates the voltage-transmittance characteristic the third embodiment presents when the liquid crystal molecules assume the second metastable aligned state. FIG. 14B is a diagram representing the CIE choromaticity each pixel presents when the liquid crystal molecules assume the second metastable aligned state.

As seen from FIG. 12A, the transmittance of each pixel changes substantially in proportion to the voltage applied to the pixel when the liquid crystal molecules assume the initial aligned state. As FIG. 12B shows, the pixel appears almost black when no voltage (0 V) is applied to it. The pixel appears blue when applied with a reset voltage (e.g., 5 V)

As mentioned above, the liquid crystal molecules are twisted by 180° in one direction in the first metstable aligned state and by −180°, or by the same twist angle in the opposite direction, in the second metastable aligned state. Furthermore, the light-transmitting axis 21a of the first polarizing plate 21 inclines about 45° to the direction 11a in which the aligning film 15 has been rubbed, and the light-transmitting axis 22a of the second polarizing plate 22 inclines about 90° to the light-transmitting axis 21a. Therefore, the third embodiment exhibits electrooptical characteristics which remain unchanged, whichever metastable aligned state the liquid crystal molecules assume.

More precisely, as FIG. 13A shows, the transmittance of the liquid crystal layer remains high and almost unchanged when the voltage applied ranges from 0 V to about 2 V, though it temporarily decreases at about 1 V, as long as the liquid crystal molecules assume the first metastable aligned state. When the voltage raises above about 2 V, the transmittance starts decreasing gradually. As seen from FIG. 13B, the pixel appears white when applied with a voltage of 1.509 V, and black when applied with a voltage of 4.850 V, while the liquid crystal molecules remain in the first metastable aligned state. X- and Y-coordinate values of the white are 0.291 and 0.319, respectively (x=0.291, y=0.319). Y value of the white is 29.4. X- and Y-coordinate values of the black are 0.269 and 0.287, respectively (x=0.269, y=0.287). Y value of the black is 5.5.

As described above, each pixel of the third embodiment appears either red or black while the liquid crystal molecules remain in the first metastable aligned state, and appears either blue or white while the molecules remain in the second metastable aligned state. The second embodiment can therefore display not only black-and-white images but also red-and-blue images.

In the liquid crystal display according to the third embodiment, both the transmittance and choromaticity of each pixel change in accordance with the voltage applied to the pixel, no matter whichever semi-stable aligned state the liquid crystal molecules assume. The display can therefore display gray-scale monochrome images by controlling the effective value of the drive signal stepwise, while the liquid crystal molecules remain in either the first metastable aligned state or the second metastable aligned state.

Fourth Embodiment

Figure 15A:
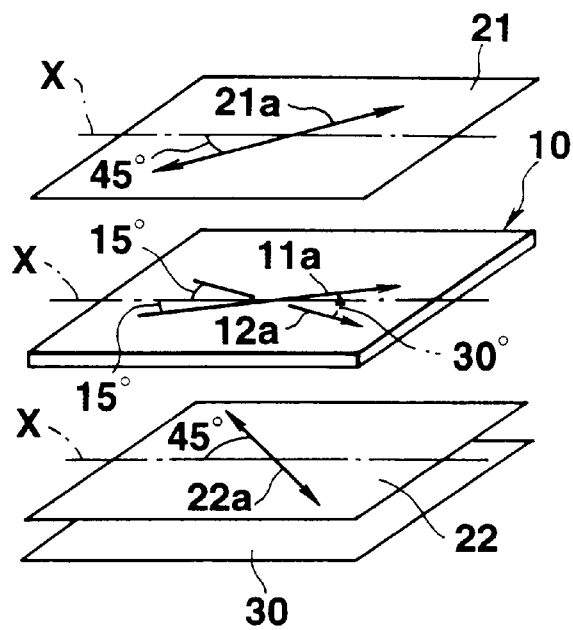
FIG. 15A is an exploded view of a liquid crystal display according to a fourth embodiment of the invention, showing the basic structure of the display and the initial aligned state of liquid crystal molecules.
Figure 15B:
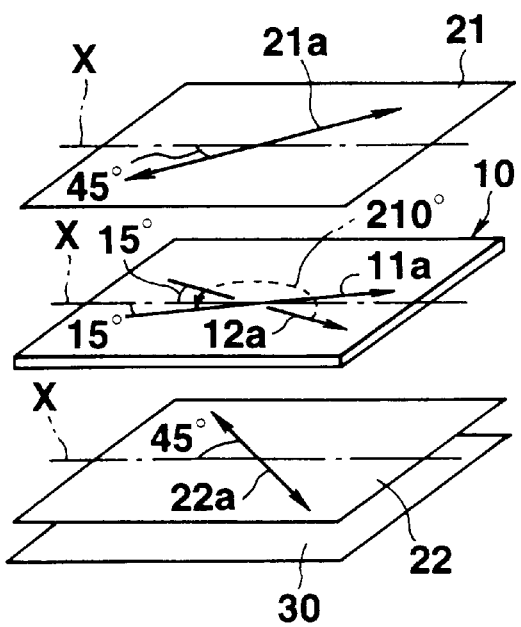
FIG. 15B is an exploded view of the fourth embodiment, representing the first metastable aligned state of liquid crystal molecules.
Figure 15C:
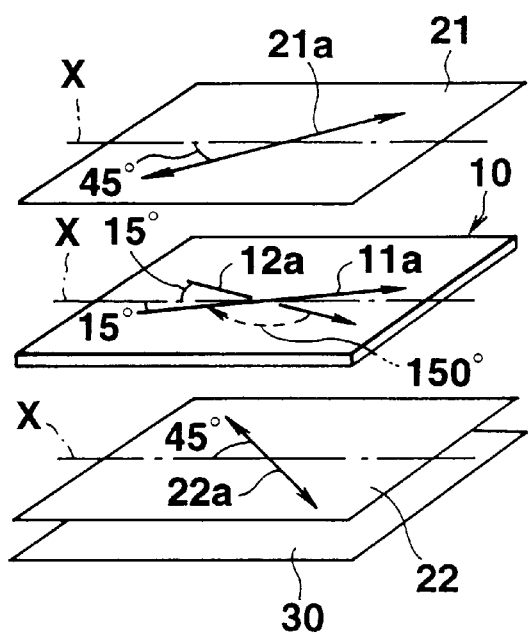
FIG. 15C is an exploded view of the fourth embodiment, showing the second metastable aligned state of liquid crystal molecules.

The liquid crystal display according to the fourth embodiment of the invention will be described, with reference to FIG. 15A to FIG. 18B. FIG. 15A illustrates the initial aligned state of the molecules of the liquid crystal sealed in the fourth embodiment. FIG. 15B represents the first metastable aligned state of liquid crystal molecules. FIG. 15C depicts the second metastable aligned state of liquid crystal molecules.

The fourth embodiment is identical in basic structure to the first embodiment shown in FIG. 1. The components identical to those of the liquid cell of the first embodiment are designated at the same reference numerals and will not be described in detail.

That is, as seen from FIG. 1, the display according to the fourth embodiment comprises a liquid crystal cell 10, polarizing plates 21 and 22, a reflective plate 30, and a drive circuit 40. The liquid crystal cell 10 is sandwiched between the polarizing plates 21 and 22. The reflective plate 30 is mounted on the outer surface of the second polarizing plate 22. The drive circuit 40 is connected to the liquid crystal cell 10.

The liquid crystal cell 10 is identical in structure to its counterpart of the first embodiment, but different in the initial aligned state, first metastable aligned state and second metastable aligned which the liquid crystal molecules assume.

The liquid crystal molecules are twisted by a twist angle from the rubbed direction of one of the aligning films by a twist angle greater than 0° and smaller than 90°, from the rubbed direction of one of the aligning films 15 and 16. In other words, the liquid crystal molecules assume spray-aligned state.

The aligning films 15 and 16 have been rubbed in directions 11a and 12a, respectively, as shown in FIG. 15A. To state more precisely, the first aligning film 15 has been rubbed along a line which is inclined counterclockwise as viewed from the screen of the display, or inclined at an angle of about 15° to the horizontal axis X of the screen, from the lower-left corner to of the screen to the upper-right corner thereof. The second aligning film 16 has been rubbed along a line inclined clockwise as viewed from the screen, or inclined at an angle of about −15° to the axis X, from the upper-left corner to of the screen to the lower-right corner thereof. Hence, the directions 11a and 12a are indicated by two lines which intersect at about 30°.

In the initial aligned state, the molecules of the liquid crystal are twisted by about 30° counterclockwise as viewed from the screen of the display as is indicated by the broken-line arrow in FIG. 15A. They are spray-strained in the initial aligned state.

The liquid crystal molecules of the cell 10 are twisted by about 180° counterclockwise in the first metastable aligned state, and by 180° clockwise in the second metastable aligned state, as seen from the screen of the display. As a result, the molecules are twisted by 210° counterclockwise o the first metastable aligned state and by −150° in the second metastable aligned state, with respect to the direction 12a in which the second aligning film 16 has been rubbed. In either metastable aligned state, the molecules are no longer spray-strained.

More specifically, after applying a reset pulse to each pixel, a first metastable state selecting pulse may be applied to the pixel. The liquid crystal molecules in the initial aligned state are thereby further twisted by about 180° counterclockwise as viewed from the display screen, as is indicated by the broken-line arrow in FIG. 15B. As a result, the molecules are twisted by 210° in total (=30°+180°) from the direction 12a in which the aligning film 16 has been rubbed. Thus, the liquid crystal molecules assume the first metastable aligned state and are released from the spray-strained state.

Alternatively, a second metastable state selecting pulse may be applied to the pixel after applying a reset pulse to each pixel. In this case, the liquid crystal molecules in the initial aligned state are further twisted by about −180°, or by 180° clockwise as viewed from the display screen. The molecules are therefore twisted by −150° in total (=30°−180°) from the direction 12a, as indicated by the broken-line arrow shown in FIG. 15C. That is, the liquid crystal molecules assume the second metastable aligned state, released from the spray-strained state.

As FIG. 15A shows, the liquid crystal cell 10 is sandwiched between the polarizing plates 21 and 22. The first polarizing plate 21 is positioned with its light-transmitting axis 21a inclined counterclockwise as seen from the display, at about 45° to the horizontal axis X of the screen. The second polarizing plate 22 is positioned with its light-transmitting axis 22a inclined clockwise as seen from the display, at about 45° to the horizontal axis X. In other words, the axis 21a inclines at about 30° to the direction 11a in which the aligning film 15 has been rubbed, or inclines counterclockwise as seen from the display screen, at about 15° to the horizontal axis X of the screen. Hence, the light-transmitting direction 22a of the second polarizing plate 22 inclines at about 90° to the light-transmitting axis 21a of the first polarizing plate 21.

As indicated above, the first polarizing plate 21 is positioned with its light-transmitting axis 21a inclined at about 30° to the direction 11a. The third embodiment can therefore operate in birefringent mode as the second embodiment, no matter whether each pixel has its transmittance controlled while the liquid crystal molecules remain in the first metastable aligned state or the second metastable aligned state.

Figure 16A:
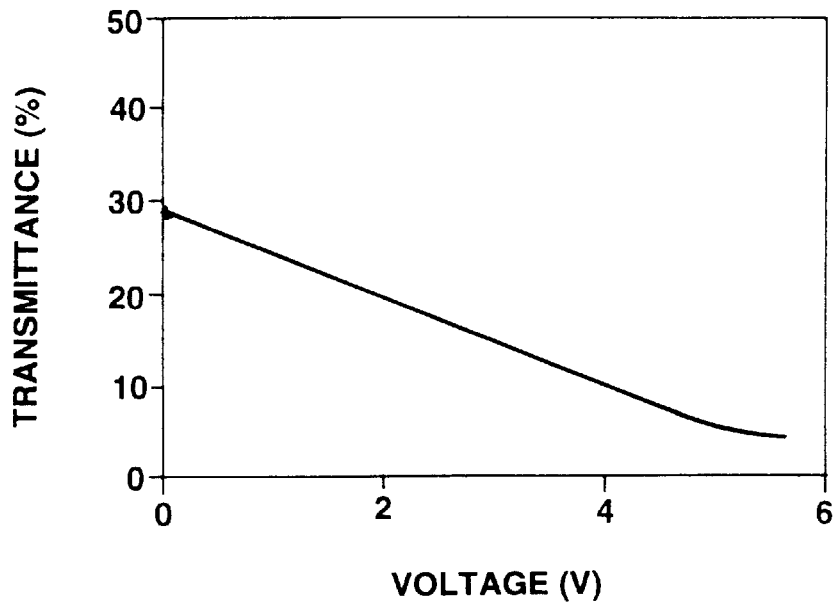
FIG. 16A is a graph illustrating the voltage-transmittance characteristic which the fourth embodiment exhibits when the liquid crystal molecules assume the initial aligned state.
Figure 16B:
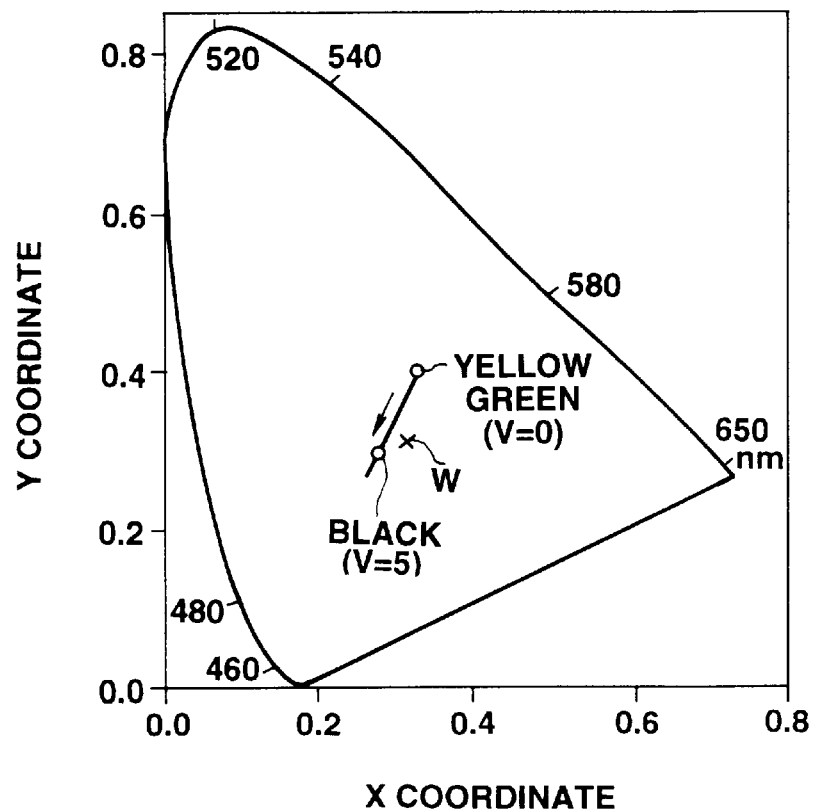
FIG. 16B is a diagram of the CIE choromaticity which each pixel of the fourth embodiment presents when the liquid crystal molecules assume the initial aligned state.
Figure 17A:
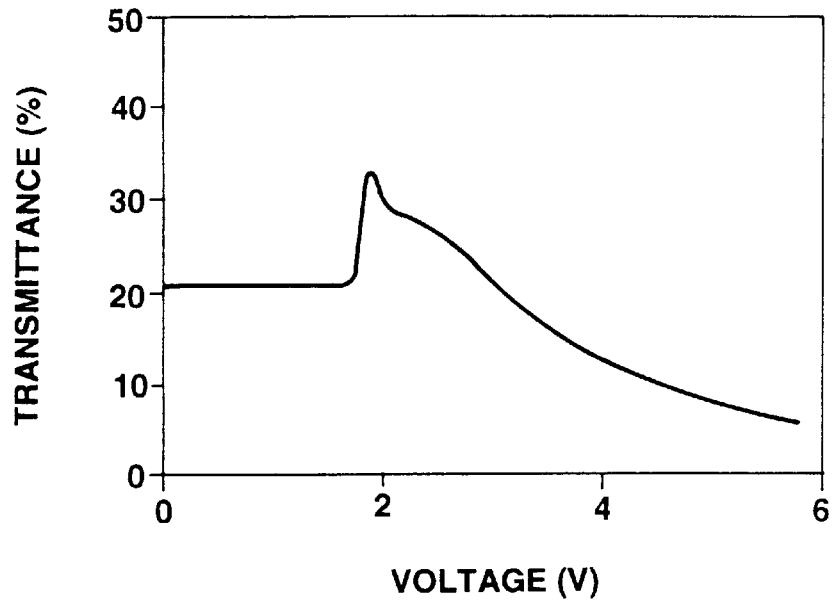
FIG. 17A is a graph representing the voltage-transmittance characteristic which the fourth embodiment has when the liquid crystal molecules assume the first metastable aligned state.
Figure 17B:
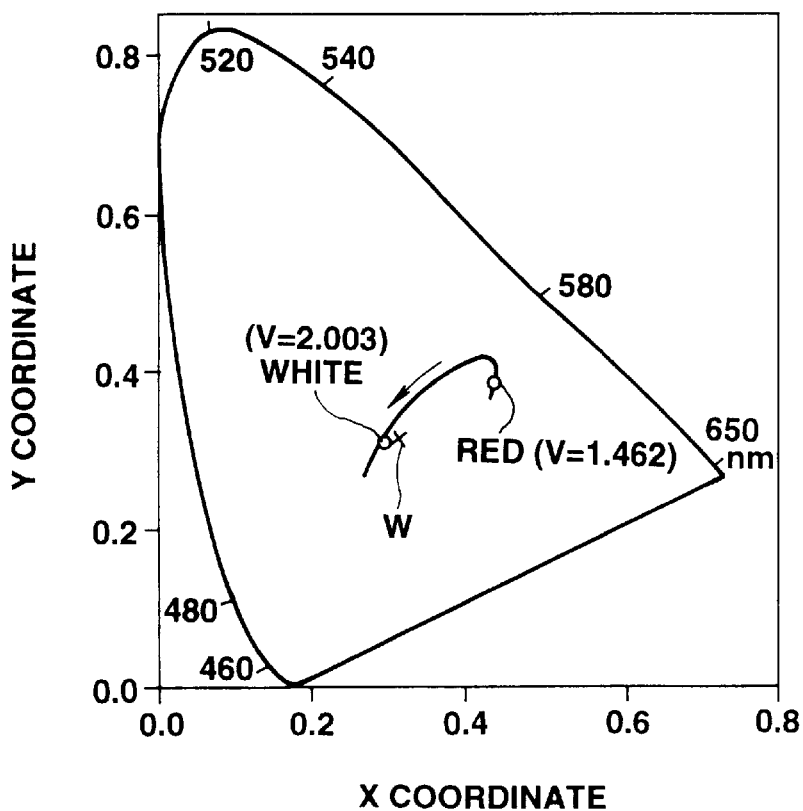
FIG. 17B is a diagram of the CIE choromaticity which each pixel of the fourth embodiment presents when the liquid crystal molecules assume the first metastable aligned state.
Figure 18A:
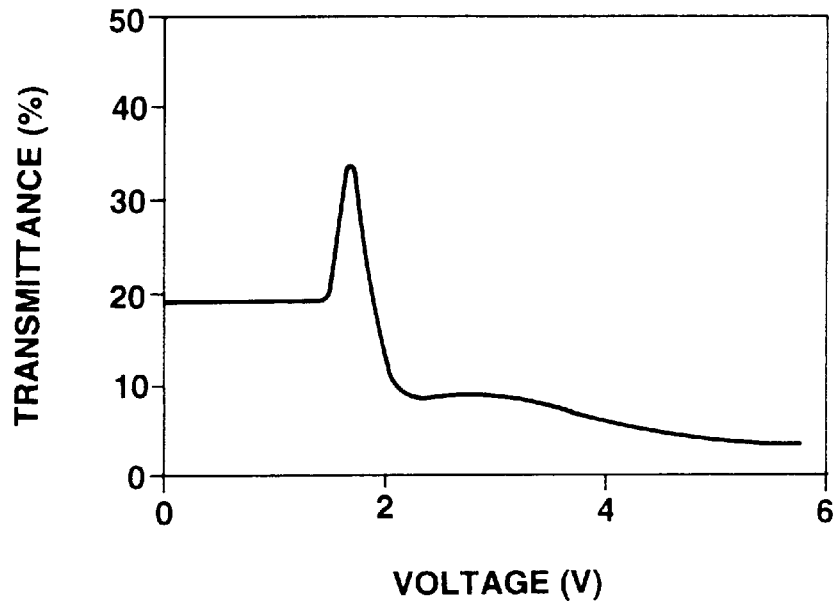
FIG. 18A is a graph illustrating the voltage-transmittance characteristic which the fourth embodiment presents when the liquid crystal molecules assume the second metastable aligned state.
Figure 18B:
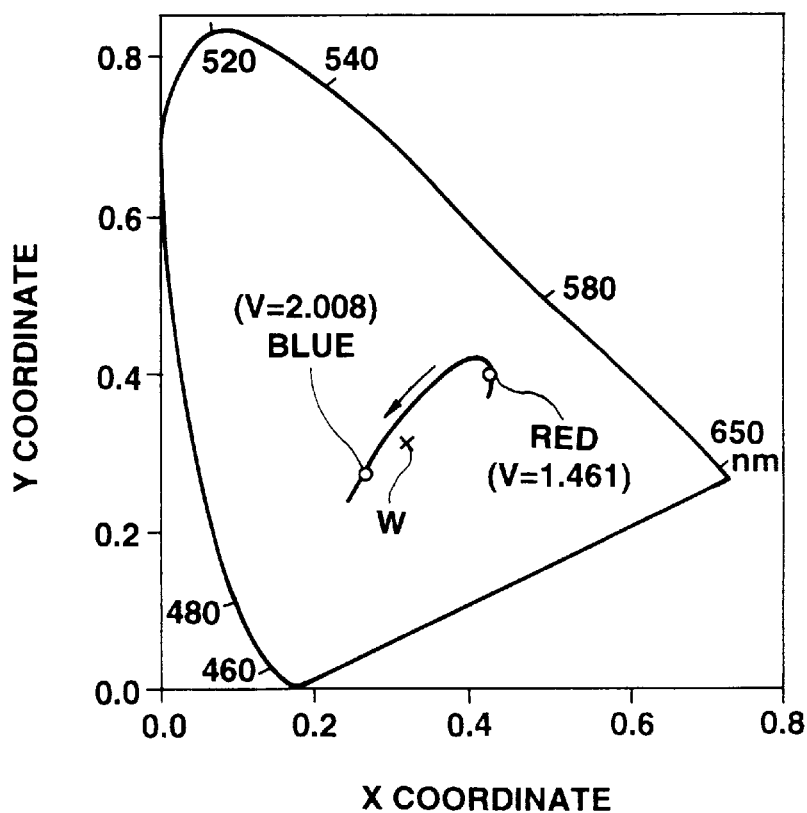
FIG. 18B is a diagram of the CIE choromaticity which each pixel of the fourth embodiment presents when the liquid crystal molecules assume the second metastable aligned state.

FIGS. 16A to 18B show how the transmittance of the liquid crystal layer and the color of each pixel change with the voltage applied to the pixel (i.e., the effective value of the drive signal) when the value Δnd of the liquid crystal cell 10 is about 800 nm in the liquid crystal display illustrated in FIG. 15A. More specifically, FIG. 16A represents the voltage-transmittance characteristic the display shown in FIG. 15A exhibits when the liquid crystal molecules assume the initial aligned state. FIG. 16B is a diagram of the CIE choromaticity each pixel of the display presents when the liquid crystal molecules assume the initial aligned state. FIG. 17A shows the voltage-transmittance characteristic the display (FIG. 15A) has when the liquid crystal molecules assume the first metastable aligned state. FIG. 17B is a diagram of the CIE choromaticity each pixel presents when the liquid crystal molecules assume the first metastable aligned state. FIG. 18A represents the voltage-transmittance characteristic the third embodiment presents when the liquid crystal molecules assume the second metastable aligned state. FIG. 18B is a diagram representing the CIE choromaticity each pixel presents when the liquid crystal molecules assume the second metastable aligned state.

As seen from FIG. 16A, the transmittance of each pixel changes substantially in proportion to the voltage applied to the pixel when the liquid crystal molecules assume the initial aligned state. As FIG. 16B shows, the pixel appears almost yellowish green when no voltage (0 V) is applied to it. The pixel appears black when applied with a reset voltage (e.g., 5 V) which causes the liquid crystal molecules to stand almost vertically.

As mentioned above, the liquid crystal molecules are twisted by 180° in one direction in the first metastable aligned state and by −180°, or by the same twist angle in the opposite direction, in the second metastable aligned state. Furthermore, the light-transmitting axis 21a of the first polarizing plate 21 inclines about 45° to the direction 11a in which the aligning film 15 has been rubbed, and the light-transmitting axis 22a of the second polarizing plate 22 inclines about 90° to the light-transmitting axis 21a. Therefore, the third embodiment exhibits electrooptical characteristics which remain unchanged, whichever metastable aligned state the liquid crystal molecules assume.

While the liquid crystal molecules remain in the first metastable aligned state, the display exhibits the voltage-transmittance characteristic illustrated in FIG. 17A. As seen from FIG. 17B, the pixel appears red when applied with a voltage of 1.462 V, and white when applied with a voltage of 2.003 V, while the liquid crystal molecules remain in the first metastable aligned state. X- and Y-coordinate values of the red are 0.432 and 0.391, respectively (x=0.432, y=0.391). Y value of the red is 20.29. X- and Y-coordinate values of the white are 0.290 and 0.319, respectively (x=0.290, y=0.319). Y value of the white is 29.7.

While the liquid crystal molecules remain in the second metastable aligned state, the display exhibits the voltage-transmittance characteristic illustrated in FIG. 18A. As can be understood from FIG. 18B, the pixel appears red when applied with a voltage of 1.461 V, and blue when applied with a voltage of 2.008 V, while the liquid crystal molecules remain in the first metastable aligned state. X- and Y-coordinate values of the red are 0.424 and 0.399, respectively (x=0.424, y=0.399). Y value of the red is 21.31. X- and Y-coordinate values of the blue are 0.249 and 0.267, respectively (x=0.249, y=0.267). Y value of the blue is 11.32.

As indicated above, each pixel of the fourth embodiment presents either red or white while the liquid crystal molecules remain in the first metastable aligned state, and either red or blue while the molecules remain in the second metastable aligned state. The fourth embodiment can therefore display, for example, a color image with a red-and-blue object on the white background.

In the fourth embodiment, the color each pixel presents can be changed by varying the value Δnd of the liquid crystal cell 10. When the value Δnd is set at, for example, about 700 nm, the fourth embodiment can exhibit various voltage-transmittance characteristics shown in FIGS. 19A, 20A and 21A and various CIE chromaticities illustrated in FIGS. 19B, 20B and 21B.

Figure 19A:
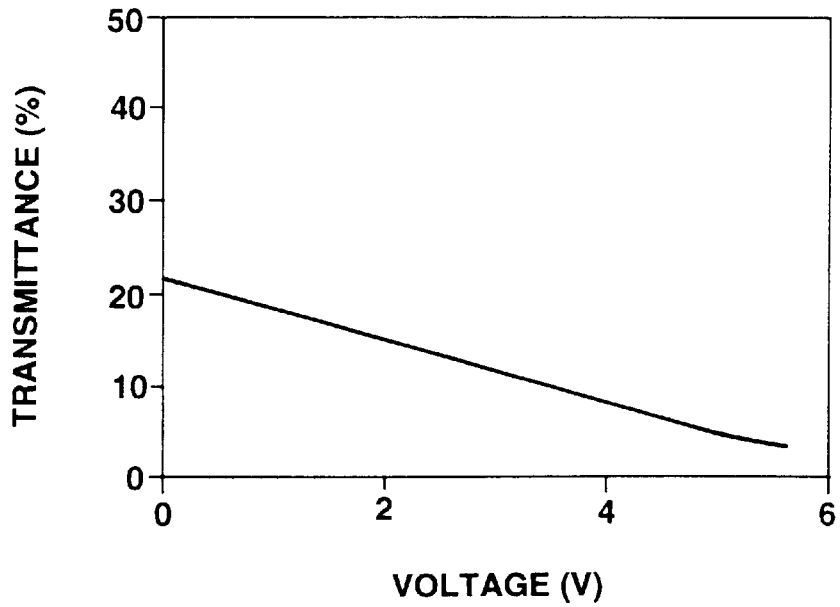
FIG. 19A is a graph illustrating the voltage-transmittance characteristic which a modification of the fourth embodiment exhibits when the liquid crystal molecules assume the initial aligned state.
Figure 19B:
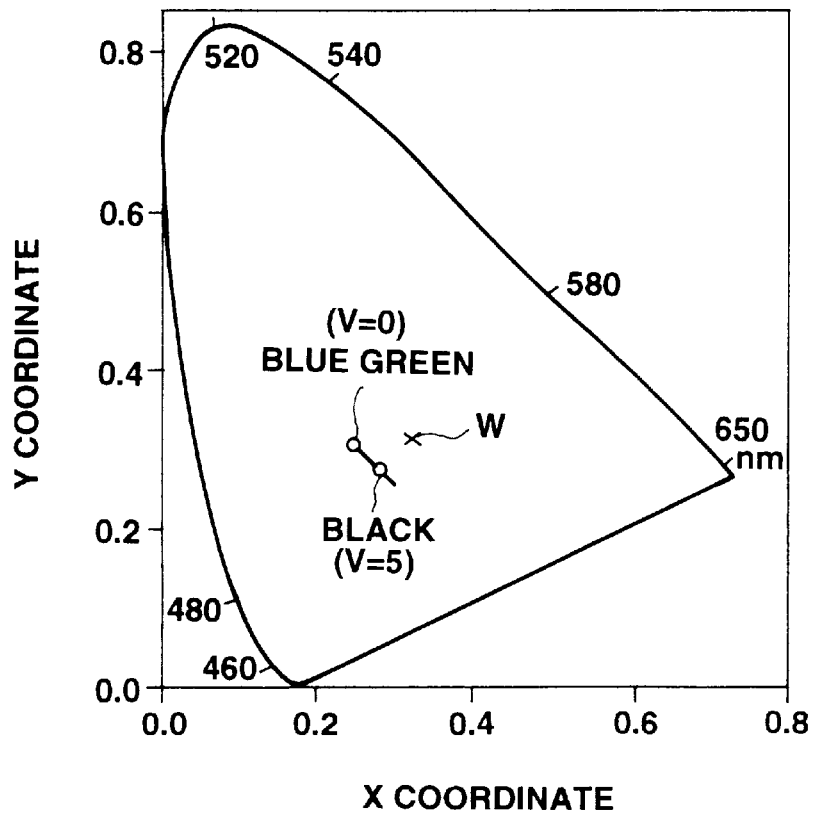
FIG. 19B is a diagram of the CIE choromaticity which each pixel of the modification of the fourth embodiment presents when the liquid crystal molecules assume the initial aligned state.

More specifically, the liquid crystal display according to the fourth embodiment exhibits the voltage-transmittance characteristic of FIG. 19A and the CIE choromaticity of FIG. 19B while liquid crystal molecules remain in the initial aligned state. As shown in FIG. 19B, each pixel appears bluely green when applied with a voltage of 0 V and black when applied with a voltage of 5 V.

Figure 20A:
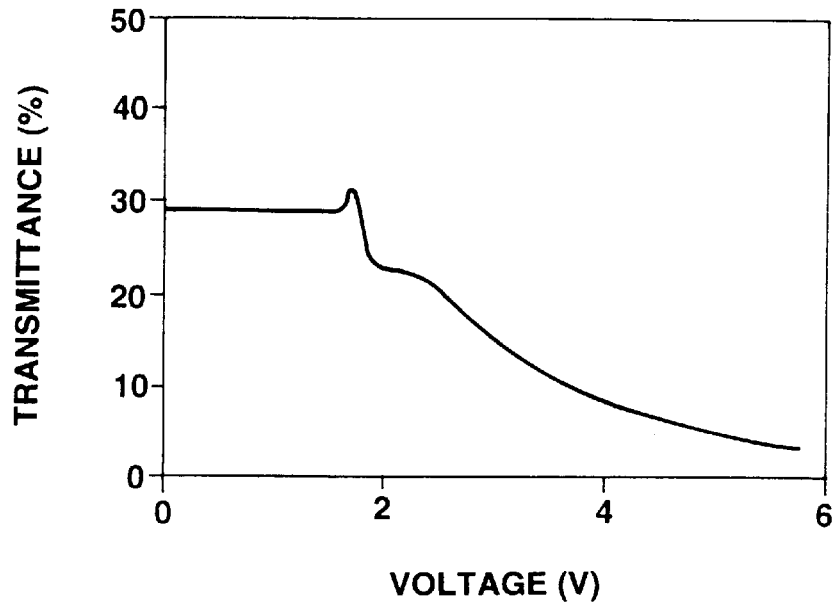
FIG. 20A is a graph illustrating the voltage-transmittance characteristic which the modification of the fourth embodiment has when the liquid crystal molecules assume the first metastable aligned state.
Figure 20B:
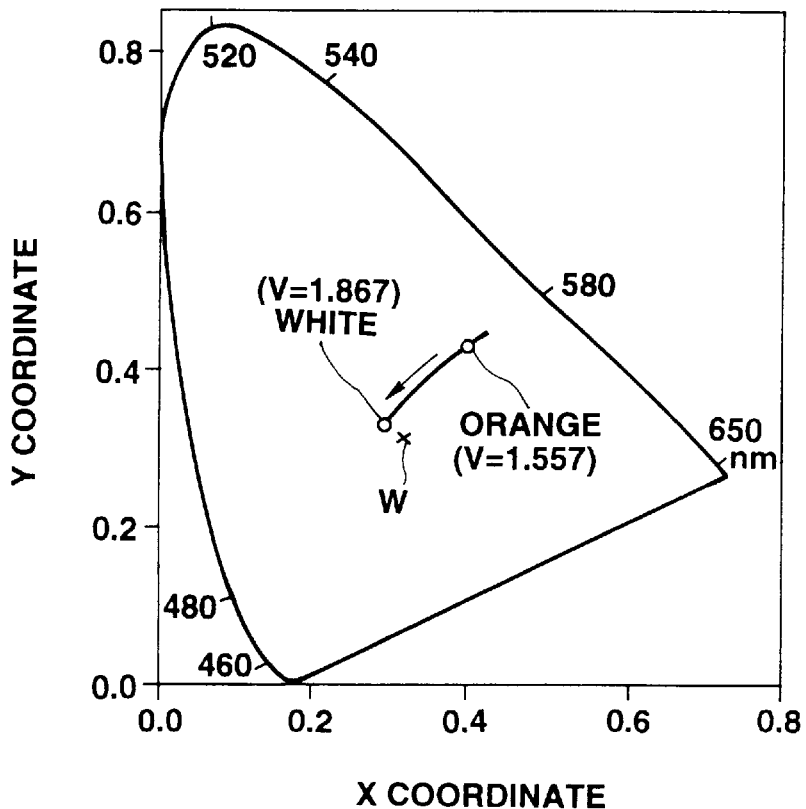
FIG. 20B is a diagram of the CIE choromaticity which each pixel of the modification of the fourth embodiment presents when the liquid crystal molecules assume the first metastable aligned state.

While liquid crystal molecules remain in the first metastable aligned state, the liquid crystal display exhibits the voltage-transmittance characteristic of FIG. 20A and the CIE choromaticity of FIG. 20B. As seen from FIG. 20B, each pixel appears orange when applied with a voltage of 1.557 V, and white when applied with a voltage of 1.867 V. X- and Y-coordinate values of the orange are 0.398 and 0.429, respectively (x=0.398, y=0.429), and Y value is 29.97. X- and Y-coordinate values of the white are 0.291 and 0.330, respectively (x=0.291, y=0.330). Y value of the white is 29.89.

Figure 21A:
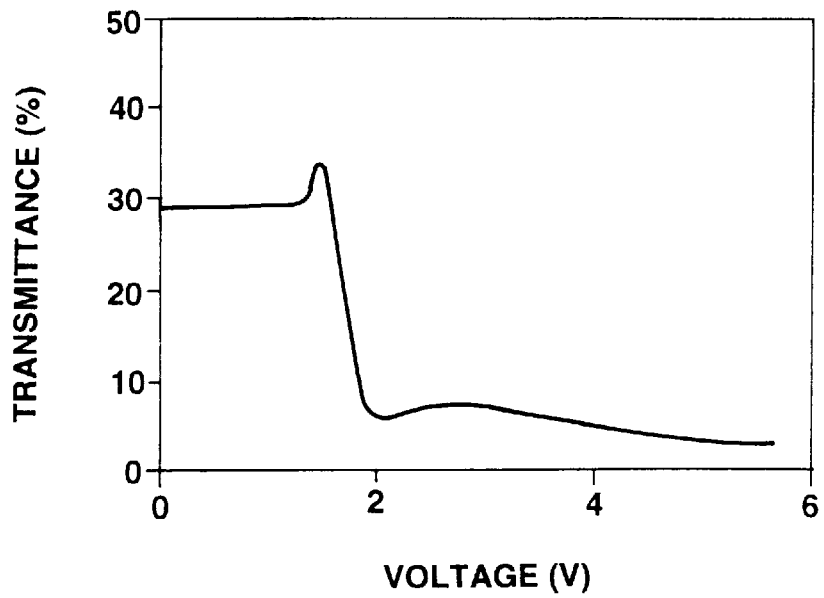
FIG. 21A is a graph representing the voltage-transmittance characteristic which the modification of the fourth embodiment presents when the liquid crystal molecules assume the second metastable aligned state.
Figure 21B:
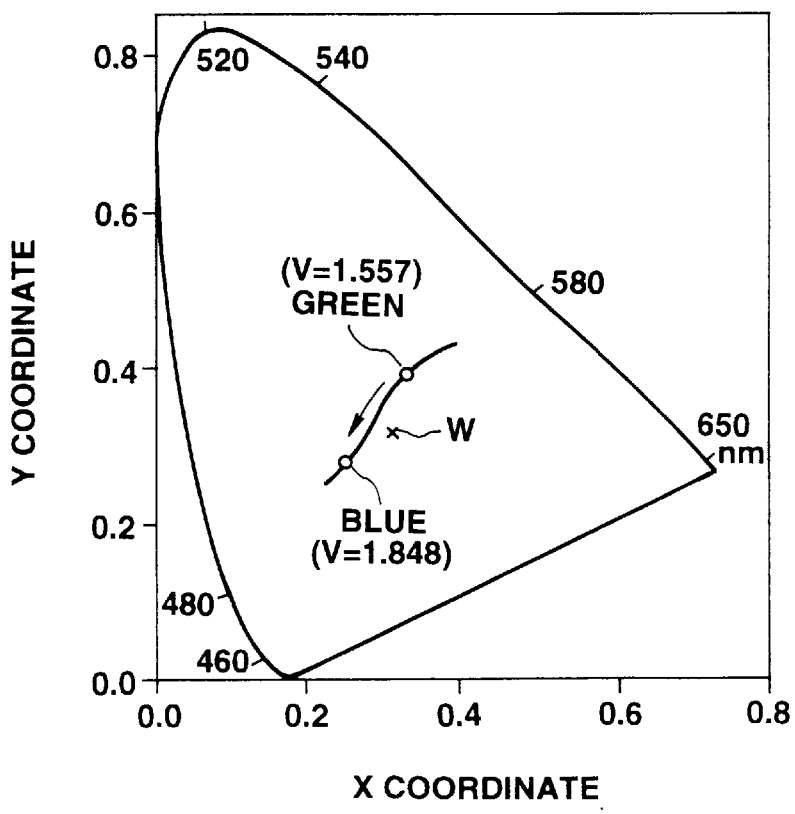
FIG. 21B is a diagram of the CIE choromaticity which each pixel of the modification of the fourth embodiment presents when the liquid crystal molecules assume the second metastable aligned state.

While liquid crystal molecules remain in the second metastable aligned state, the liquid crystal display exhibits the voltage-transmittance characteristic of FIG. 21A and the CIE choromaticity of FIG. 21B. As seen from FIG. 21B, each pixel appears green when applied with a voltage of 1.557 V, and blue when applied with a voltage of 1.848 V. X- and Y-coordinate values of the green are 0.325 and 0.376, respectively (x=0.352, y=0.376). Y value of the green is 33.62. X- and Y-coordinate values of the blue are 0.242 and 0.261, respectively (x=0.242, y=0.261). Y value of the blue is 12.65.

Thus, the color each pixel presents can be changed when the value Δnd of the liquid crystal cell 10 is varied in the fourth embodiment.

Moreover, the color each pixel presents can be selected by changing the directions of the light-transmitting axes 21a and 22a of the polarizing plates 21 and 22, for two reasons. First, the angle between the axis 21a of the first polarizing plate 21 and the rubbed direction 11a of the first aligning film 15 determines how much a ray of any wavelength is polarized by the birefringent action of the liquid crystal cell 10. Second, the transmittance each pixel exhibits to a ray of any wavelength depends upon the direction of the light-transmitting axis 22a of the second polarizing plate 22.

Fifth Embodiment

The liquid crystal display which is the fifth embodiment of this invention will be described, with reference to FIG. 22A to FIG. 25B. This embodiment is identical to the first embodiment, except that the liquid crystal molecules are twisted by about 50° in the initial aligned state. The components identical to those of the liquid cell of the first embodiment are designated at the same reference numerals and will not be described in detail.

The aligning films 15 and 16 have been rubbed in directions 11a and 12b, respectively, as seen from FIG. 22A. To be more precise, the first aligning film 15 has been rubbed along a line which is inclined counterclockwise as viewed from the screen of the display, or inclined at an angle of about 25° to the horizontal axis X of the screen, from the lower-left corner to of the screen to the upper-right corner thereof. The second aligning film 16 has been rubbed along a line inclined clockwise as viewed from the screen, or inclined at an angle of about −25° to the axis X, from the upper-left corner to of the screen to the lower-right corner thereof. Hence, the directions 11a and 12a are indicated by two lines which intersect at about 50°.

In the initial aligned state, the molecules of the liquid crystal are twisted by about 50° counterclockwise as viewed from the screen of the display as is indicated by the broken-line arrow in FIG. 22A. They are spray-strained in the initial aligned state.

The liquid crystal molecules of the cell 10 are further twisted by about 180° counterclockwise in the first metastable aligned state and by about 180° clockwise in the second metastable aligned state. As a result, they are twisted by 230° in the first metastable aligned state, and by −130° in the second metastable aligned state. In either metastable aligned state, the liquid crystal molecules are no longer spray-strained.

To state more specifically, after applying a reset pulse to each pixel, a first metastable state selecting pulse may be applied to the pixel. The liquid crystal molecules in the initial aligned state are thereby further twisted by about 180° counterclockwise as viewed from the display screen, as is indicated by the broken-line arrow in FIG. 22B. As a result, the molecules are twisted by 230° in total (=50°+180°) from the direction 12a in which the aligning film 16 has been rubbed. Thus, the liquid crystal molecules assume the first metastable aligned state and are released from the spray-strained state.

Alternatively, a second metastable state selecting pulse may be applied to the pixel after applying a reset pulse to each pixel. In this case, the liquid crystal molecules in the initial aligned state are further twisted by about −180°, or by 180° clockwise as viewed from the display screen. The molecules are therefore twisted by −130° in total (=50°−180°) from the direction 12a, as indicated by the broken-line arrow shown in FIG. 22C. That is, the liquid crystal molecules assume the second metastable aligned state, released from the spray-strained state.

As FIG. 22A shows, the liquid crystal cell 10 is sandwiched between the polarizing plates 21 and 22. The first polarizing plate 21 is positioned with its light-transmitting axis 21a inclined counterclockwise as seen from the display, at about 45° to the horizontal axis X of the screen. The second polarizing plate 22 is positioned with its light-transmitting axis 22a inclined clockwise as seen from the display, at about 45° to the horizontal axis X. In other words, the axis 21a inclines at about 20° to the direction 11a in which the aligning film 15 has been rubbed, or inclines counterclockwise as seen from the display screen, at about 25° to the horizontal axis X of the screen. Hence, the light-transmitting direction 22a of the second polarizing plate 22 inclines at about 90° to the light-transmitting axis 21a of the first polarizing plate 21.

As mentioned above, the first polarizing plate 21 is positioned with its light-transmitting axis 21a inclined at about 20° to the direction 11a. The fifth embodiment can therefore operate in birefringent mode as the second embodiment, no matter whether each pixel has its transmittance controlled while the liquid crystal molecules remain in the first metastable aligned state or the second metastable aligned state.

FIGS. 23A to 25B show how the transmittance of the liquid crystal layer and the color of each pixel change with the voltage applied to the pixel (i.e., the effective value of the drive signal) when the value Δnd of the liquid crystal cell 10 is about 900 nm in the liquid crystal display shown in FIG. 22A.

Figure 23A:
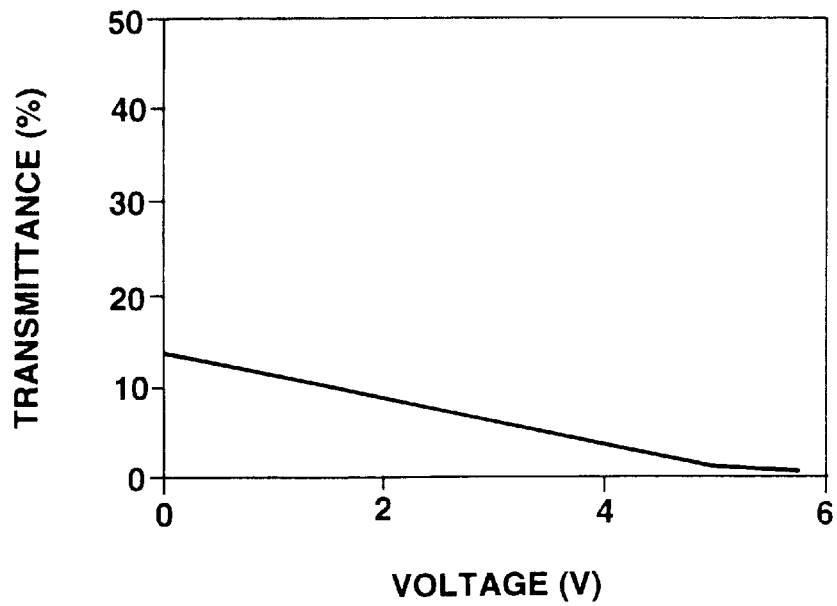
FIG. 23A is a graph representing the voltage-transmittance characteristic which the fifth embodiment exhibits when the liquid crystal molecules assume the initial aligned state.
Figure 23B:
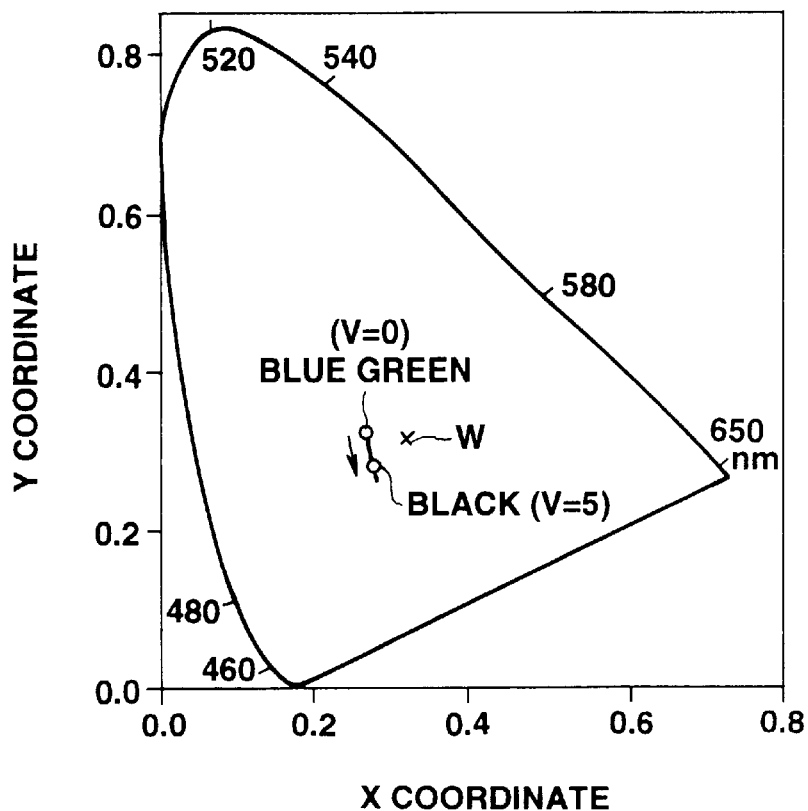
FIG. 23B is a diagram of the CIE choromaticity which each pixel of the fifth embodiment presents when the liquid crystal molecules assume the initial aligned state.

The display shown in FIG. 22A exhibits the voltage-transmittance characteristic shown in FIG. 23A while the liquid crystal molecules remain in the initial aligned state. In the initial aligned state, each pixel appears bluely green when applied with a voltage of 0 V and black when applied with a voltage of about 5 V, as seen from FIG. 23B.

Figure 24A:
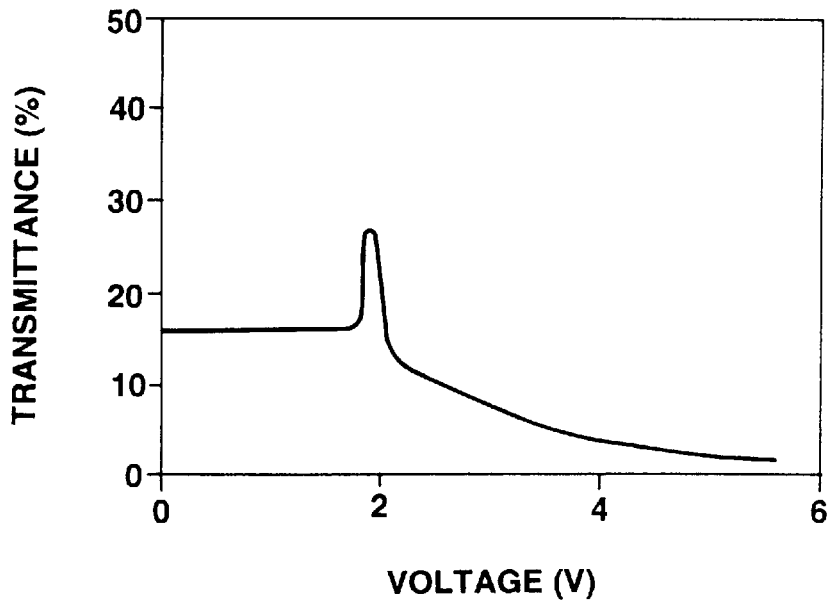
FIG. 24A is a graph representing the voltage-transmittance characteristic which the fifth embodiment has when the liquid crystal molecules assume the first metastable aligned state.
Figure 24B:
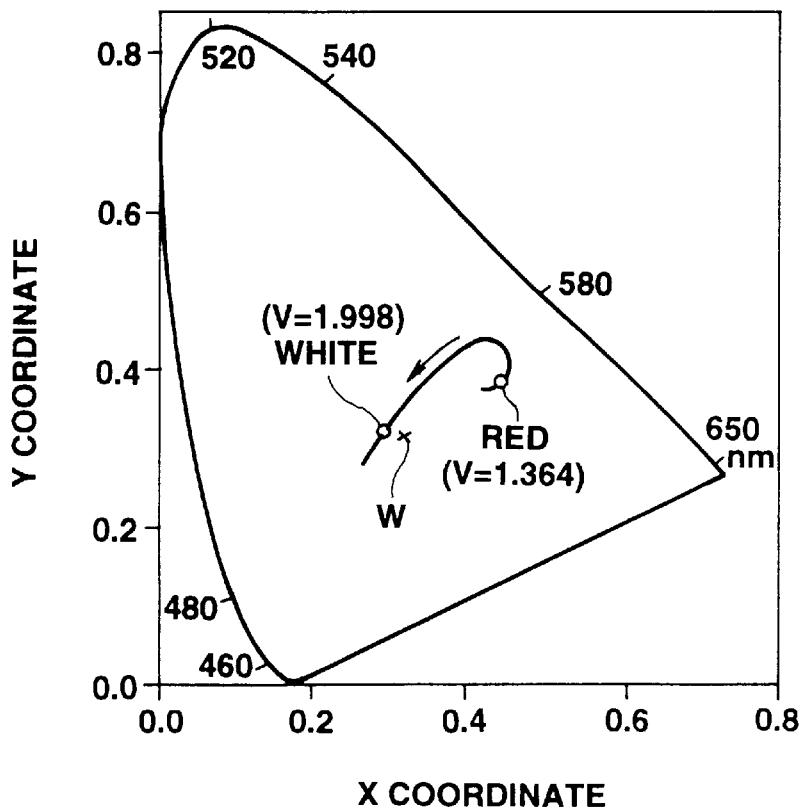
FIG. 24B is a diagram of the CIE choromaticity which each pixel of the fifth embodiment presents when the liquid crystal molecules assume the first metastable aligned state.

While the liquid crystal molecules remain in the first metastable aligned state, the display exhibits the voltage-transmittance characteristic illustrated in FIG. 24A. As seen from FIG. 24B, each pixel appears red when applied with a voltage of 1.364 V, and white when applied with a voltage of 1.998 V, while the liquid crystal molecules remain in the first metastable aligned state. X- and Y-coordinate values of the red are 0.446 and 0.390, respectively (x=0.446, y=0.390). Y value of the red is 15.39. X- and Y-coordinate values of the white are 0.291 and 0.325, respectively (x=0.291, y=0.325). Y value of the white is 20.61.

Figure 25A:
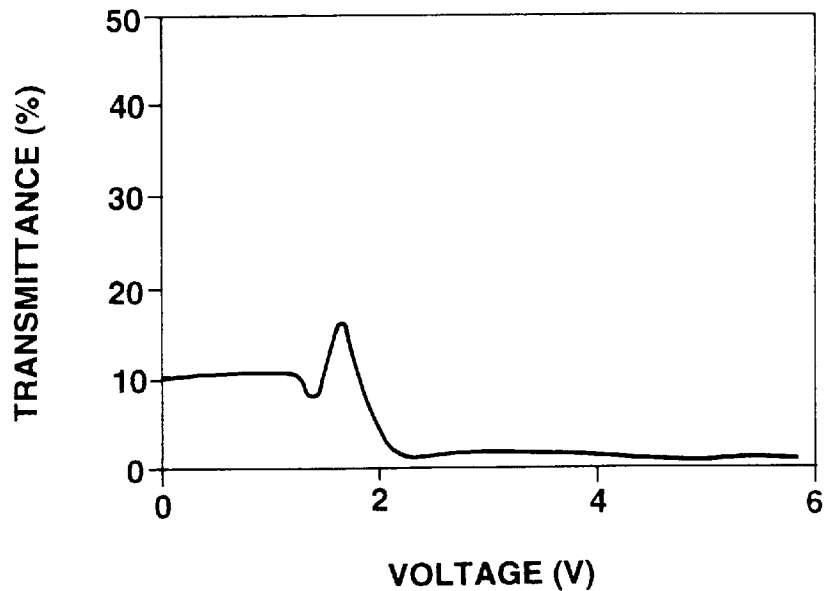
FIG. 25A is a graph illustrating the voltage-transmittance characteristic which the fifth embodiment presents when the liquid crystal molecules assume the second metastable aligned state.
Figure 25B:
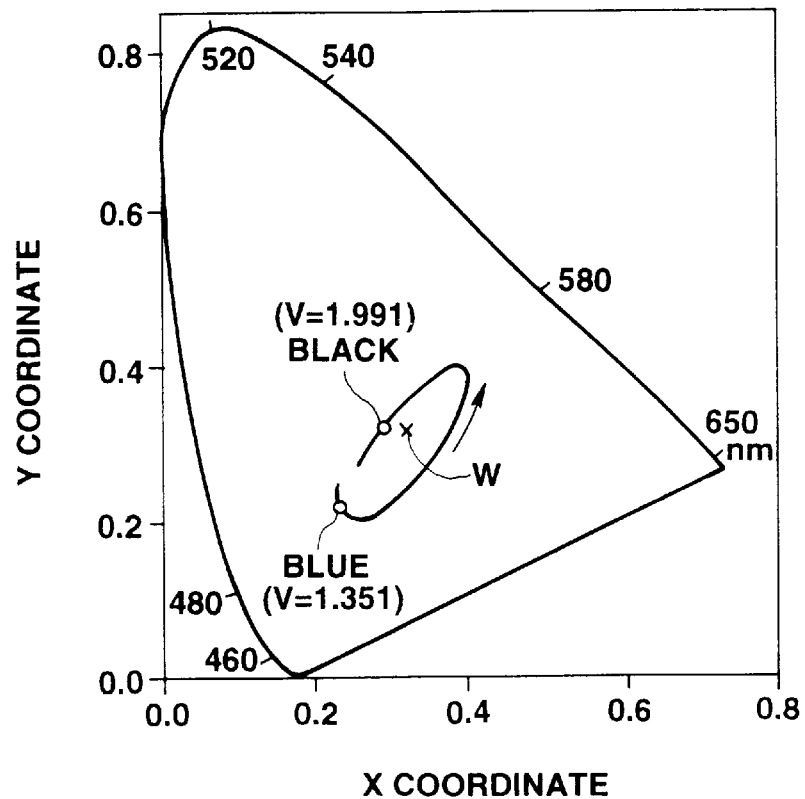
FIG. 25B is a diagram of the CIE choromaticity which each pixel of the fifth embodiment presents when the liquid crystal molecules assume the second metastable aligned state.

While the liquid crystal molecules remain in the second metastable aligned state, the display exhibits the voltage-transmittance characteristic illustrated in FIG. 25A. As can be understood from FIG. 25B, the pixel appears blue when applied with a voltage of 1.351 V, and black when applied with a voltage of 1.991 V, while the liquid crystal molecules remain in the second metastable aligned state. X- and Y-coordinate values of the blue are 0.228 and 0.220, respectively (x=0.228, y=0.220). Y value of the blue is 8.60. X- and Y-coordinate values of the black are 0.278 and 0.307, respectively (x=0.278, y=0.307). Y value of the black is 4.56.

As indicated above, each pixel of the fifth embodiment presents either red or white while the liquid crystal molecules remain in the first metastable aligned state, and either blue or black the molecules remain in the second metastable aligned state. The fifth embodiment can therefore display not only a black-and-white image, but also a red-and-blue image.

Sixth Embodiment

The liquid crystal display according to the sixth embodiment of the present invention will be described, with reference to FIG. 26A to FIG. 29B. The sixth embodiment is identical to the first embodiment, except that the liquid crystal molecules are twisted by about 70° in the initial aligned state. The components identical to those of the liquid cell of the first embodiment are designated at the same reference numerals and will not be described in detail.

The aligning films 15 and 16 have been rubbed in directions 11a and 12b, respectively, as seen from FIG. 26A. More specifically, the first aligning film 15 has been rubbed along a line which is inclined counterclockwise as viewed from the screen of the display, or inclined at an angle of about 35° to the horizontal axis X of the screen, from the lower-left corner to of the screen to the upper-right corner thereof. The second aligning film 16 has been rubbed along a line inclined clockwise as viewed from the screen, or inclined at an angle of about −35° to the axis X, from the upper-left corner to of the screen to the lower-right corner thereof. Hence, the directions 11a and 12a are indicated by two lines which intersect at about 70°.

In the initial aligned state, the molecules of the liquid crystal are twisted by about 70° counterclockwise as viewed from the screen of the display as is indicated by the broken-line arrow in FIG. 26A. They are spray-strained in the initial aligned state.

The liquid crystal molecules of the cell 10 are further twisted by about 180° counterclockwise in the first metastable aligned state and by about 180° clockwise in the second metastable aligned state. As a result, they are twisted by 250° in the first metastable aligned state, and by −110° in the second metastable aligned state. In either metastable aligned state, the liquid crystal molecules are no loner spray-strained.

To be more specific, after applying a reset pulse to each pixel, a first metastable state selecting pulse may be applied to the pixel. The liquid crystal molecules in the initial aligned state are thereby further twisted by about 180° counterclockwise as viewed from the display screen, as is indicated by the broken-line arrow in FIG. 26B. As a result, the molecules are twisted by 250° in total (=70°+180°) from the direction 12a in which the aligning film 16 has been rubbed. Thus, the liquid crystal molecules assume the first metastable aligned state and are released from the spray-strained state.

Alternatively, a second metastable state selecting pulse may be applied to the pixel after applying a reset pulse to each pixel. In this case, the liquid crystal molecules in the initial aligned state are further twisted by about −180°, or by 180° clockwise as viewed from the display screen. The molecules are therefore twisted by −110° in total (=70°−180°) from the direction 12a, as indicated by the broken-line arrow shown in FIG. 26C. That is, the liquid crystal molecules assumes the second metastable aligned state and are released from the spray-strained state.

As FIG. 26A shows, the liquid crystal cell 10 is sandwiched between the polarizing plates 21 and 22. The first polarizing plate 21 is positioned with its light-transmitting axis 21a inclined counterclockwise as seen from the display, at about 45° to the horizontal axis X of the screen. The second polarizing plate 22 is positioned with its light-transmitting axis 22a inclined clockwise as seen from the display, at about 45° to the horizontal axis X. Thus, the axis 21a inclines at about 10° to the direction 11a in which the aligning film 15 has been rubbed, or inclines counterclockwise as seen from the display screen, at about 35° to the horizontal axis X of the screen. Hence, the light-transmitting direction 22a of the second polarizing plate 22 inclines at about 90° to the light-transmitting axis 21a of the first polarizing plate 21.

As described above, the first polarizing plate 21 is positioned with its light-transmitting axis 21a inclined at about 10° to the direction 11a. The sixth embodiment can therefore operate in birefringent mode as the second embodiment, no matter whether each pixel has its transmittance controlled while the liquid crystal molecules remain in the first metastable aligned state or the second metastable aligned state.

FIGS. 27A to 29B illustrate how the transmittance the liquid crystal layer has and the color each pixel presents changes with the voltage applied to the pixel when the value And of the liquid crystal cell 10 is about 900 nm in the liquid crystal display illustrated in FIG. 26A.

Figure 27A:
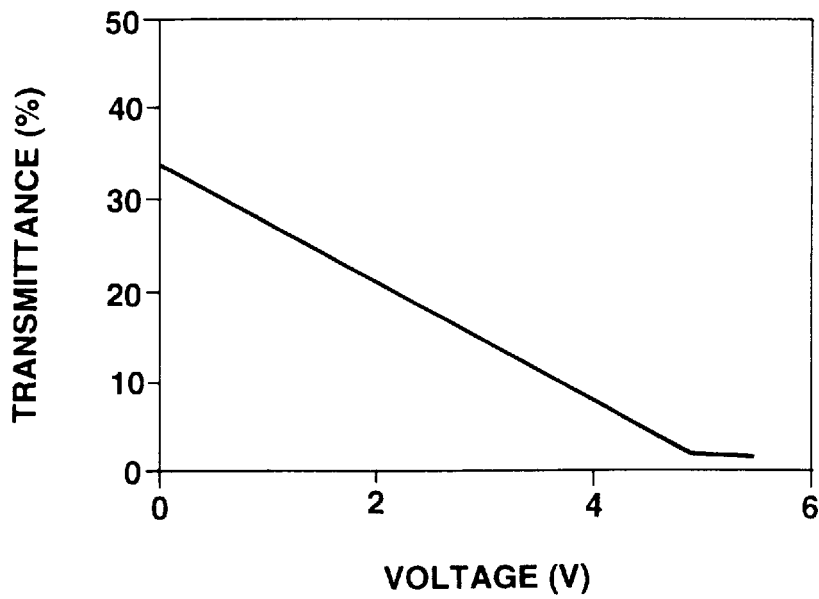
FIG. 27A is a graph representing the voltage-transmittance characteristic which the sixth embodiment exhibits when the liquid crystal molecules assume the initial aligned state.
Figure 27B:
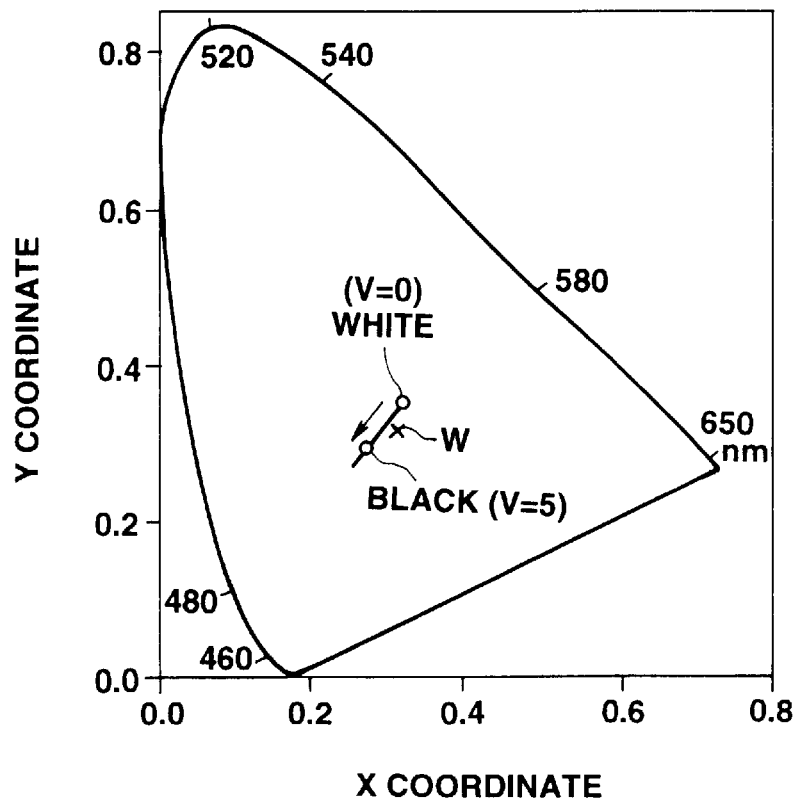
FIG. 27B is a diagram of the CIE choromaticity which each pixel of the sixth embodiment presents when the liquid crystal molecules assume the initial aligned state.

The display illustrated in FIG. 26A exhibits the voltage-transmittance characteristic shown in FIG. 27A while the liquid crystal molecules remain in the initial aligned state. In the initial aligned state, each pixel appears white when applied with a voltage of 0 V and black when applied with a voltage of about 5 V, as illustrated in FIG. 27B.

Figure 28A:
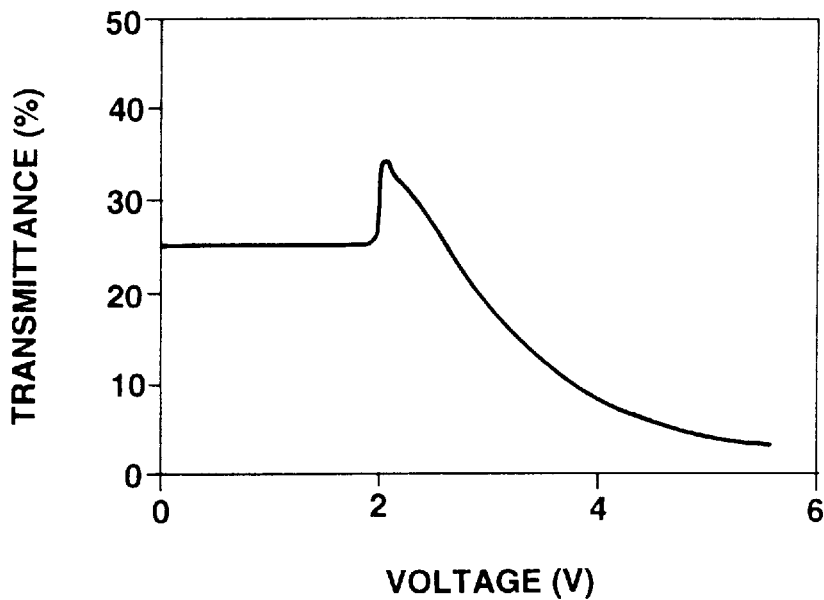
FIG. 28A is a graph illustrating the voltage-transmittance characteristic which the sixth embodiment has when the liquid crystal molecules assume the first metastable aligned state.
Figure 28B:
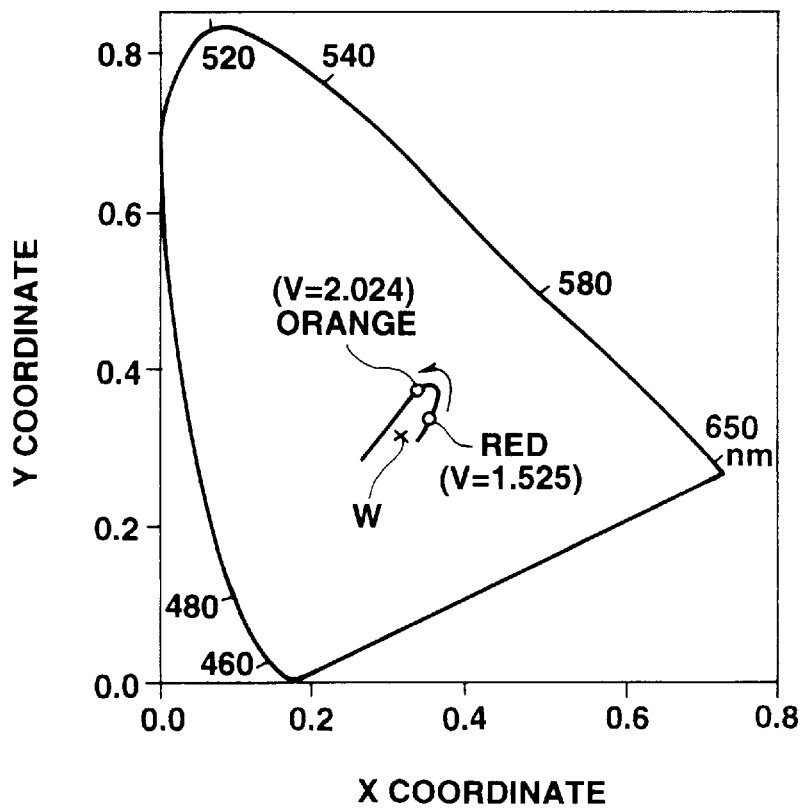
FIG. 28B is a diagram of the CIE choromaticity which each pixel of the sixth embodiment presents when the liquid crystal molecules assume the first metastable aligned state.

While the liquid crystal molecules remain in the first metastable aligned state, the display exhibits the voltage-transmittance characteristic illustrated in FIG. 28A. As seen from FIG. 28B, each pixel appears red when applied with a voltage of 1.525 V, and orange when applied with a voltage of 2.024 V, while the liquid crystal molecules remain in the first metastable aligned state. X- and Y-coordinate values of the red are 0.343 and 0.322, respectively (x=0.343, y=0.322). Y value of the red is 24.31. X- and Y-coordinate values of the orange are 0.322 and 0.378, respectively (x=0.322, y=0.378). Y value of the orange is 31.98.

Figure 29A:
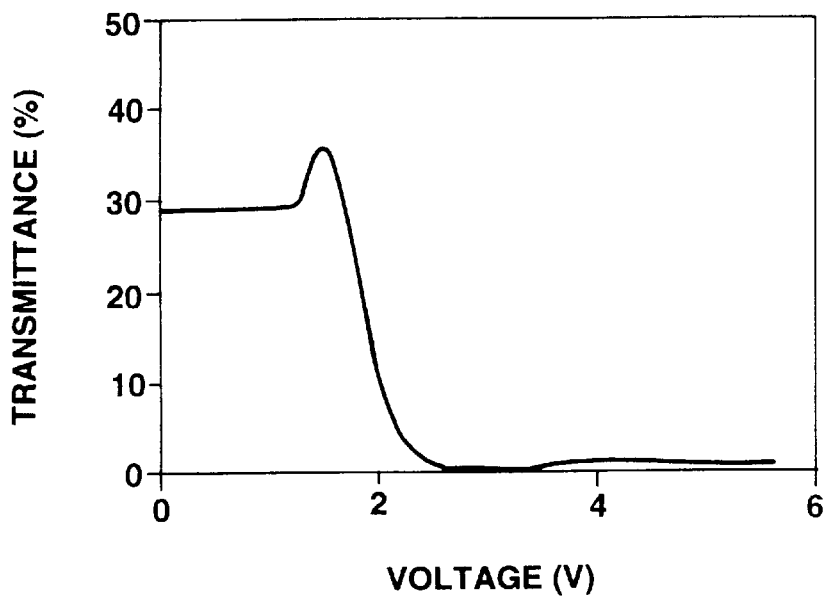
FIG. 29A is a graph illustrating the voltage-transmittance characteristic which the sixth embodiment presents when the liquid crystal molecules assume the second metastable aligned state.
Figure 29B:
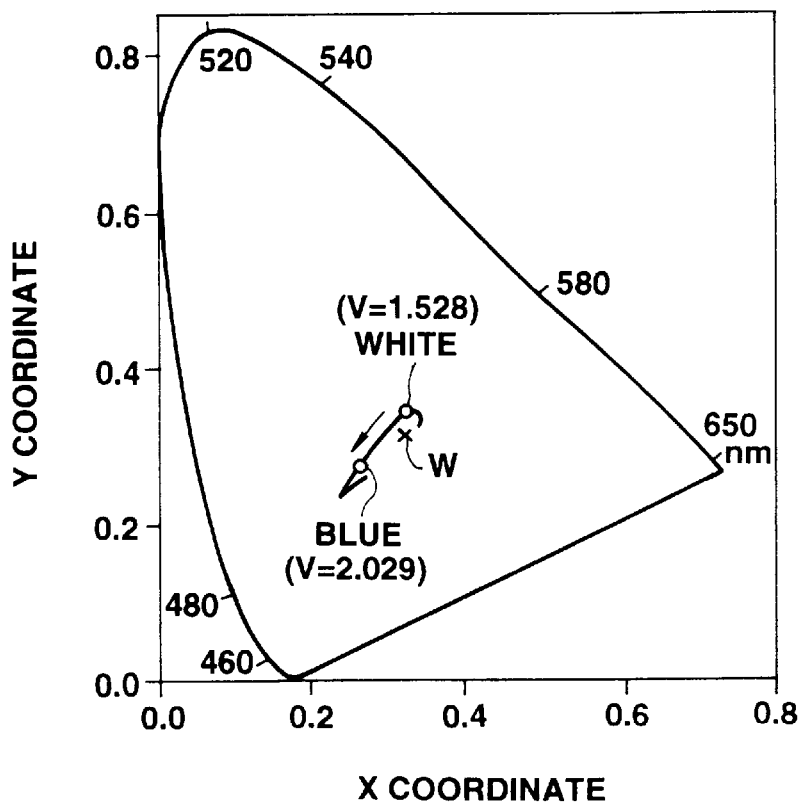
FIG. 29B is a diagram of the CIE choromaticity which each pixel of the sixth embodiment presents when the liquid crystal molecules assume the second metastable aligned state.

While the liquid crystal molecules remain in the second metastable aligned state, the display exhibits the voltage-transmittance characteristic illustrated in FIG. 29A. As can be understood from FIG. 29B, the pixel appears white when applied with a voltage of 1.528 V, and blue when applied with a voltage of 2.029 V, while the liquid crystal molecules remain in the second metastable aligned state. X- and Y-coordinate values of the white are 0.320 and 0.349, respectively (x=0.320, y=0.349). Y value of the white is 34.36. X- and Y-coordinate values of the blue are 0.260 and 0.278, respectively (x=0.260, y=0.278). Y value of the blue is 9.05.

As described above, each pixel of the sixth embodiment presents either red or orange white while the liquid crystal molecules remain in the first metastable aligned state, and either white or blue while the molecules remain in the second metastable aligned state. The sixth embodiment can therefore display, for example, a color image with a red-and-orange-and-blue object on the white background.

Seventh Embodiment

The liquid crystal display which is the seventh embodiment of this invention will be described, with reference to FIGS. 30A to 33B. This embodiment is identical to the first embodiment, except that the liquid crystal molecules are twisted by about 10° in the initial aligned state. The components identical to those of the liquid cell of the first embodiment are designated at the same reference numerals and will not be described in detail.

The aligning films 15 and 16 have been rubbed in directions 11a and 12b, respectively, as seen from FIG. 30A. More precisely, the first aligning film 15 has been rubbed along a line which is inclined counterclockwise as viewed from the screen of the display, or inclined at an angle of about 5° to the horizontal axis X of the screen, from the lower-left corner to of the screen to the upper-right corner thereof. The second aligning film 16 has been rubbed along a line inclined clockwise as viewed from the screen, or inclined at an angle of about −5° to the axis X, from the upper-left corner to of the screen to the lower-right corner thereof. Therefore, the directions 11a and 12a are indicated by two lines which intersect at about 10°.

In the initial aligned state, the molecules of the liquid crystal are twisted by about 10° counterclockwise as viewed from the screen of the display as is indicated by the broken-line arrow in FIG. 30A. They are spray-strained in the initial aligned state.

The liquid crystal molecules of the cell 10 are further twisted by about 180° counterclockwise in the first metastable aligned state and by about 180° clockwise in the second metastable aligned state. As a result, they are twisted by 190° in the first metastable aligned state, and by −170° in the second metastable aligned state. In either metastable aligned state, the liquid crystal molecules are no loner spray-strained.

More specifically, after applying a reset pulse to each pixel, a first metastable state selecting pulse may be applied to the pixel. The liquid crystal molecules in the initial aligned state are thereby further twisted by about 180° counterclockwise as viewed from the display screen, as is indicated by the brokenline arrow in FIG. 30B. As a result, the molecules are twisted by 190° in total (=10°+180°) from the direction 12a in which the aligning film 16 has been rubbed. Thus, the liquid crystal molecules assume the first metastable aligned state and are released from the spray-strained state.

Alternatively, a second metastable state selecting pulse may be applied to the pixel after applying a reset pulse to each pixel. In this case, the liquid crystal molecules in the initial aligned state are further twisted by about −180°, or by 180° clockwise as viewed from the display screen. The molecules are therefore twisted by −170° in total (=10°−180°) from the direction 12a, as indicated by the broken-line arrow shown in FIG. 30C. That is, the liquid crystal molecules assumes the second metastable aligned state and are released from the spray-strained state.

As FIG. 30A shows, the liquid crystal cell 10 is sandwiched between the polarizing plates 21 and 22. The first polarizing plate 21 is positioned with its light-transmitting axis 21a inclined counterclockwise as seen from the display, at about 45° to the horizontal axis X of the screen. The second polarizing plate 22 is positioned with its light-transmitting axis 22a inclined clockwise as seen from the display, at about 45° to the horizontal axis X. Thus, the axis 21a inclines at about 40° to the direction 11a in which the aligning film 15 has been rubbed, or inclines counterclockwise as seen from the display screen, at about 5° to the horizontal axis X of the screen. Hence, the light-transmitting direction 22a of the second polarizing plate 22 inclines at about 90° to the light-transmitting axis 21a of the first polarizing plate 21.

As described above, the first polarizing plate 21 is positioned with its light-transmitting axis 21a inclined at about 40° to the direction 11a. The seventh embodiment can therefore operate in birefringent mode as the second embodiment, no matter whether each pixel has its transmittance controlled while the liquid crystal molecules remain in the first metastable aligned state or the second metastable aligned state.

FIGS. 31A to 33B illustrate how the transmittance the liquid crystal layer has and the color each pixel presents changes with the voltage applied to the pixel when the value Δnd of the liquid crystal cell 10 is about 900 nm in the liquid crystal display shown in FIG. 30A.

Figure 31A:
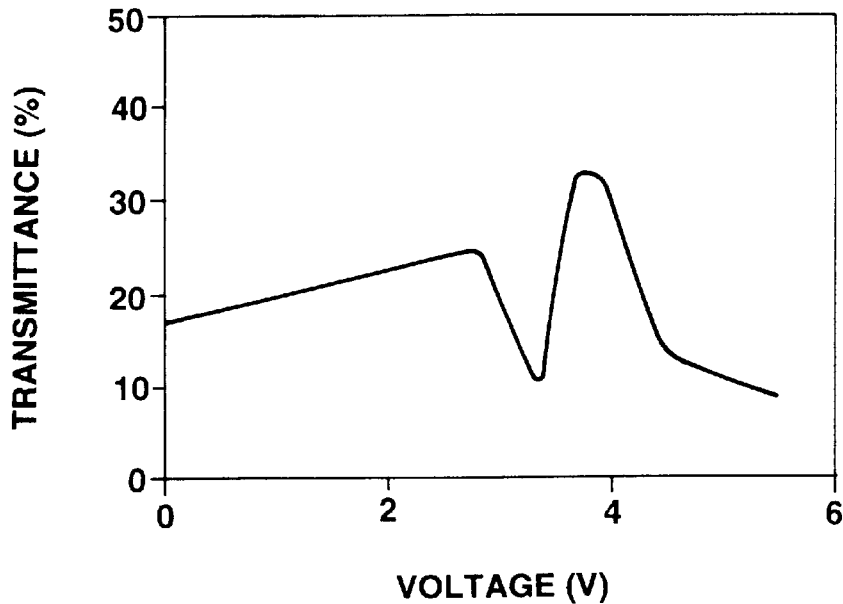
FIG. 31A is a graph representing the voltage-transmittance characteristic which the seventh embodiment exhibits when the liquid crystal molecules assume the initial aligned state.
Figure 31B:
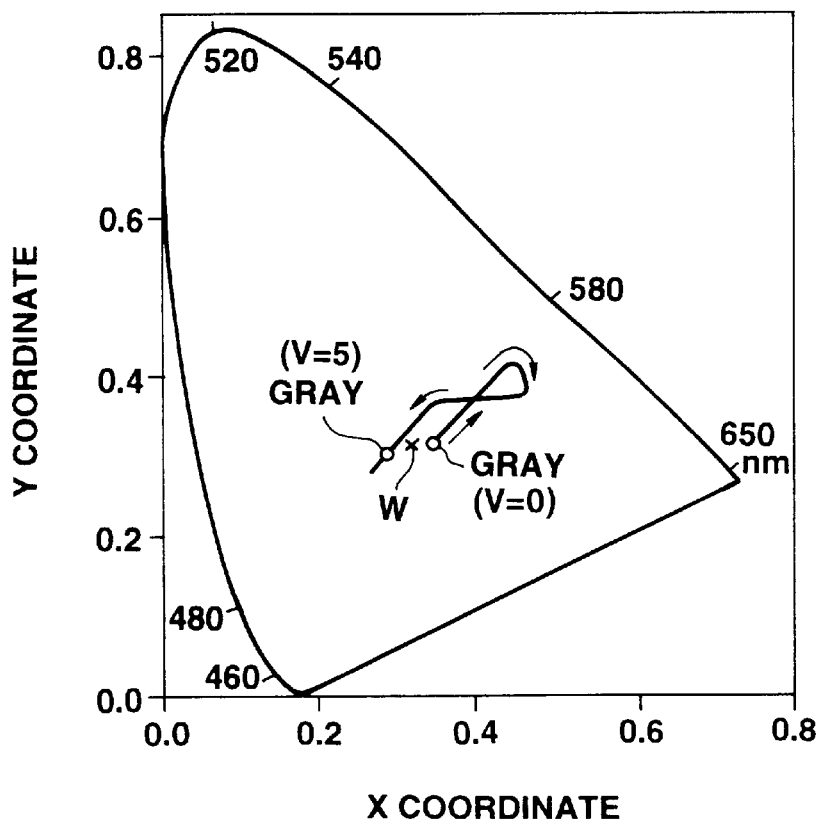
FIG. 31B is a diagram of the CIE choromaticity which each pixel of the seventh embodiment presents when the liquid crystal molecules assume the initial aligned state.

The display illustrated in FIG. 30A exhibits the voltage-transmittance characteristic shown in FIG. 31A while the liquid crystal molecules remain in the initial aligned state. In the initial aligned state, each pixel appears pinkly gray when applied with a voltage of 0 V and blue-greenish gray when applied with a voltage of about 5 V, as illustrated in FIG. 31B.

Figure 32A:
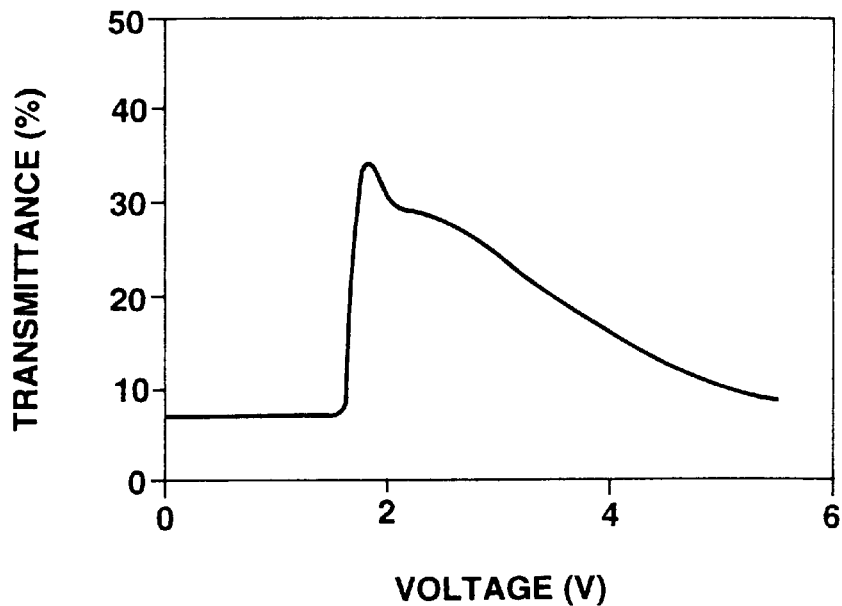
FIG. 32A is a graph illustrating the voltage-transmittance characteristic which the seventh embodiment has when the liquid crystal molecules assume the first metastable aligned state.
Figure 32B:
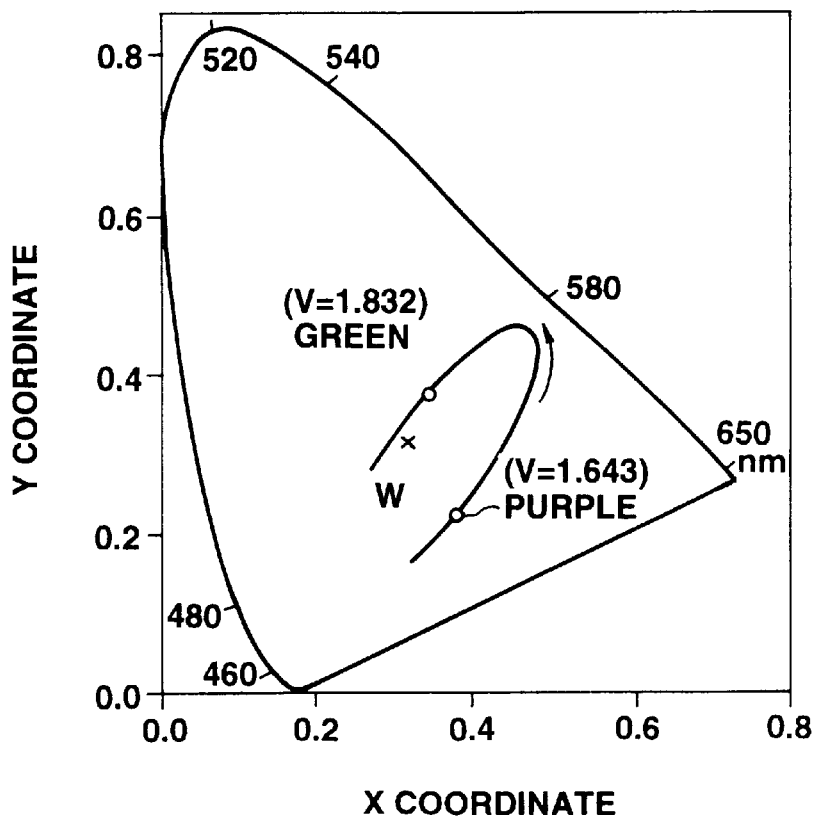
FIG. 32B is a diagram of the CIE choromaticity which each pixel of the seventh embodiment presents when the liquid crystal molecules assume the first metastable aligned state.

While the liquid crystal molecules remain in the first metastable aligned state, the display exhibits the voltage-transmittance characteristic illustrated in FIG. 32A. As seen from FIG. 32B, each pixel appears purple when applied with a voltage of 1.643 V, and green when applied with a voltage of 1.832 V, while the liquid crystal molecules remain in the first metastable aligned state. X- and Y-coordinate values of the purple are 0.357 and 0.224, respectively (x=0.357, y=0.224). Y value of the red is 8.55. X- and Y-coordinate values of the green are 0.339 and 0.381, respectively (x=0.339, y=0.381). Y value of the green is 33.39.

Figure 33A:
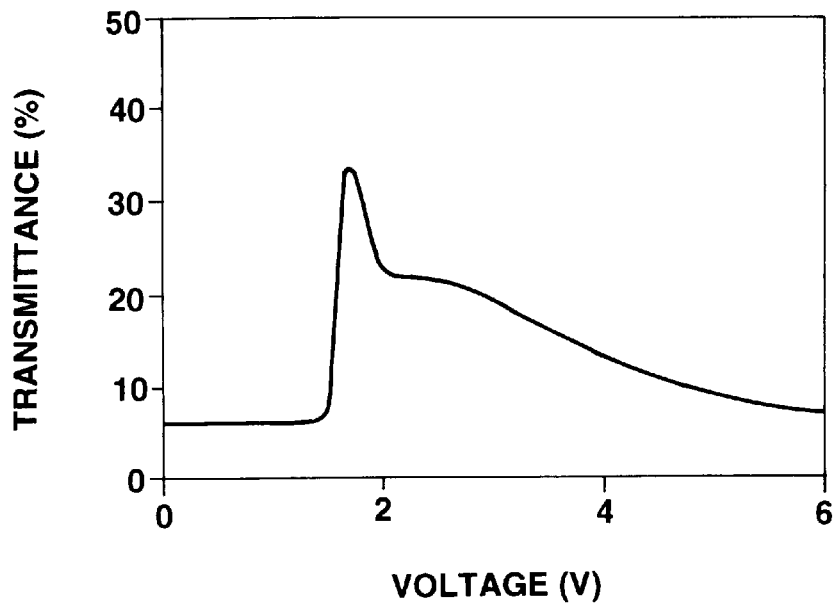
FIG. 33A is a graph illustrating the voltage-transmittance characteristic which the seventh embodiment presents when the liquid crystal molecules assume the second metastable aligned state.
Figure 33B:
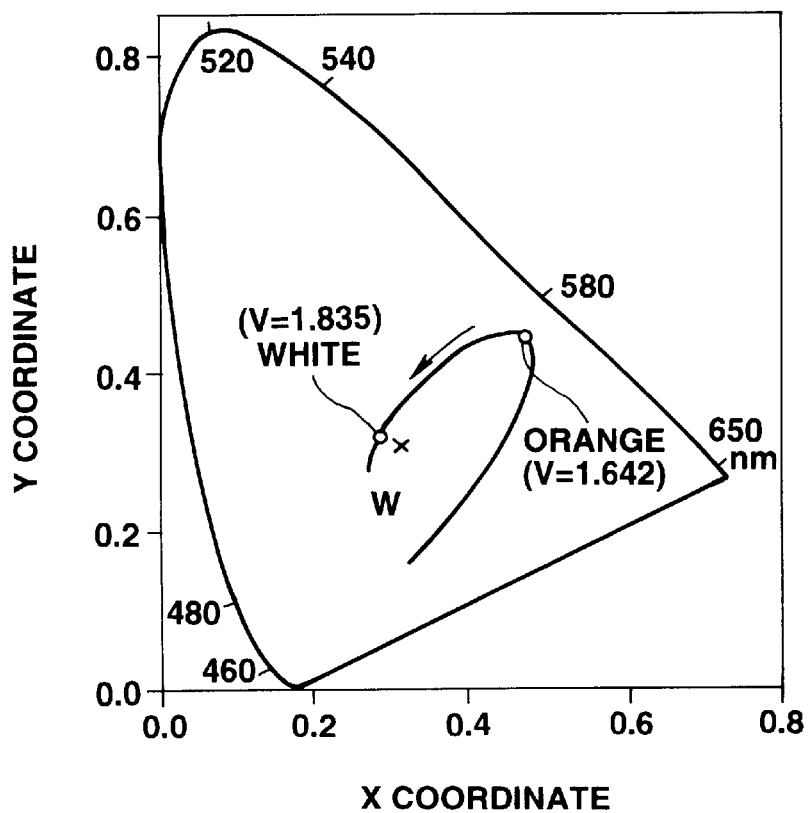
FIG. 33B is a diagram of the CIE choromaticity which each pixel of the seventh embodiment presents when the liquid crystal molecules assume the second metastable aligned state.

While the liquid crystal molecules remain in the second metastable aligned state, the display exhibits the voltage-transmittance characteristic illustrated in FIG. 33A. As can be understood from FIG. 33B, the pixel appears orange when applied with a voltage of 1.642 V, and white when applied with a voltage of 1.835 V, while the liquid crystal molecules remain in the second metastable aligned state. X- and Y-coordinate values of the orange are 0.456 and 0.464, respectively (x=0.456, y=0.464). Y value of the orange is 25.93. X- and Y-coordinate values of the white are 0.289 and 0.330, respectively (x=0.289, y=0.330). Y value of the white is 30.01.

As indicated above, each pixel of the seventh embodiment presents either purple or green white while the liquid crystal molecules remain in the first metastable aligned state, and either orange or white while the molecules remain in the second metastable aligned state. The seventh embodiment can thus display, for example, a color image with an orange-and-purple-and-green object on the white background.

The liquid crystal used in the seventh embodiment contains chiral agent which rotates the liquid crystal molecules clockwise, hence twisting the molecules counterclockwise as viewed from the screen of the display from the second substrate toward the first substrate. Nonetheless, the liquid crystal may be replaced by one which contains chiral agent which rotates the liquid crystal molecules counterclockwise, so that the molecules may be twisted clockwise as viewed from the screen of the display from the second substrate toward the first substrate. Whichever chiral agent the liquid crystal contains, the liquid crystal cell exhibits the same optical characteristic.

In the seventh embodiment, too, the color of each pixel and the black-to-white contrast can be selected by changing the value Δnd of the liquid crystal cell 10 and the directions of the light-transmitting axes 21a and 22a of the polarizing plates 21 and 22. The black-to-white contrast can be increased in Examples 1 to 5, each having the specific value Δnd and the specific directions 21a and 22a shown in Table 3.

TABLE 3

| Angles and Value | Comparative Example 1 | Comparative Example 2 | Example 1 | Example 2 | Example 3 | Example 4 | Example 5 |
| --- | --- | --- | --- | --- | --- | --- | --- |
| Angle between the light-absorbing axis of plate 21 and the horizontal axis X | 50° | 45° | −30° | −30° | −45° | −45° | 45° |
| Value Δ nd | 500 nm | 500 nm | 320 nm | 410 nm | 360 nm | 410 nm | 360 nm |
| Twist angle in initial aligned state | 10° | 20° | 10° | 10° | 10° | 10° | 10° |
| Angle between the light-absorbing axis of plate 22 and the horizontal axis X | −50° | −45° | −75° | −75° | −90° | −90° | −90° |

The liquid crystal used in Comparative Examples 1 and 2 and Examples 1 to 5 is one containing chiral agent which rotates the liquid crystal molecules counterclockwise. The first aligning film 15 has been rubbed along a line inclined clockwise as viewed from the screen, at an angle of about 5° to the axis X, from the upper-left corner to of the screen to the lower-right corner thereof. On the other hand, the second aligning film 16 has been rubbed along a line inclined counterclockwise as viewed from the screen, or inclined at an angle of about 5° to the axis X, from the lower-left corner to of the screen to the upper-right corner thereof. The liquid crystal molecules are therefore twisted clockwise as viewed from the screen by about 10°, while they remain in the initial aligned state.

Figure 35:
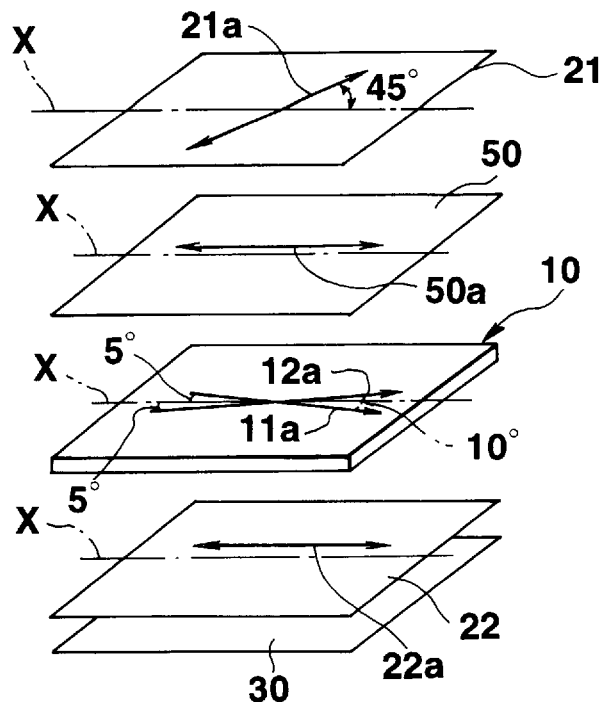
FIG. 35 is an exploded view of the eighth embodiment, illustrating the initial aligned state of liquid crystal molecules.

In Comparative Examples 1 and 2 and Examples 1 to 5, the layer of the liquid crystal exhibits various reflectances shown in the following Table 4, as it is applied with no voltage (Voff) or a voltage (Von) while the liquid crystal molecules remain in the initial aligned state, the first metastable aligned state or the second metastable aligned state.

molecules counterclockwise. The first aligning film 15 has been rubbed along a line inclined clockwise as viewed from the screen, at an angle greater than 0° and less than 10° to the axis X, from the upper-left corner to of the screen to the lower-right corner thereof, as is illustrated in FIG. 35. On the other hand, the second aligning film 16 has been rubbed along a line inclined counterclockwise as viewed from the screen, at an angle greater than 0° and less than 10° to the axis X, from the lower-left corner to of the screen to the upper-right corner thereof. The liquid crystal molecules are therefore twisted clockwise as viewed from the screen by an angle greater than 0° and less than 20°, while they remain in the initial aligned state.

TABLE 4

| Characteristics | | Comparative Example 1 | Comparative Example 2 | Example 1 | Example 2 | Example 3 | Example 4 | Example 5 |
| --- | --- | --- | --- | --- | --- | --- | --- | --- |
| Reflectance in initial aligned state (0V) | | 2.8 | 2.9 | 0.8 | 1.1 | 6.0 | 5.2 | 10.3 |
| Reflectance in first metastable aligned state (%) | OFF | 13.9 | 17.0 | 20.8 | 17.1 | 20.4 | 21.6 | 1.4 |
| | ON | 10.8 | 11.4 | 14.7 | 12.9 | 14.5 | 16.9 | 3.0 |
| Reflectance in second metastable aligned state (%) | OFF | 12.1 | 6.1 | 2.3 | 0.7 | 1.9 | 1.2 | 19.2 |
| | ON | 20.2 | 13.5 | 5.0 | 3.1 | 5.3 | 5.2 | 11.8 |
| Voltage applied (V) | Voff | 0.90 | 1.00 | 1.20 | 1.00 | 1.16 | 1.00 | 1.14 |
| | Von | 1.10 | 1.20 | 1.40 | 1.20 | 1.36 | 1.30 | 1.34 |
| Contrast | | 1.9 | 2.8 | 9.0 | 12.0 | 10.7 | 18.0 | 13.7 |

As clear from Table 4, Comparative Examples 1 and 2 exhibit insufficient contrast and cannot be used in practice. Examples 1 to 5 exhibit contrast of 9 or more and can display images of high quality. The colors Examples 1 to 5 present are those whose X-coordinate value ranges from 0.22 to 0.42 and whose Y-coordinate value ranges from 0.18 to 0.40. Of these colors, those whose X- and Y-coordinate values are less than 0.31 (i.e., the smallest coordinate value for any color) are essentially black and form black-and-white images.

In view of Tables 3 and 4, the seventh embodiment can display high-contrast monochrome images if the liquid crystal cell 10 has value Δnd of 200 nm to 500 nm, if the liquid molecules are twisted by 0° to 20° in the initial aligned state, and if the light-absorbing axes of the polarizing plates 21 and 22 intersect at 30° to 60°.

Eighth Embodiment

Figure 34:
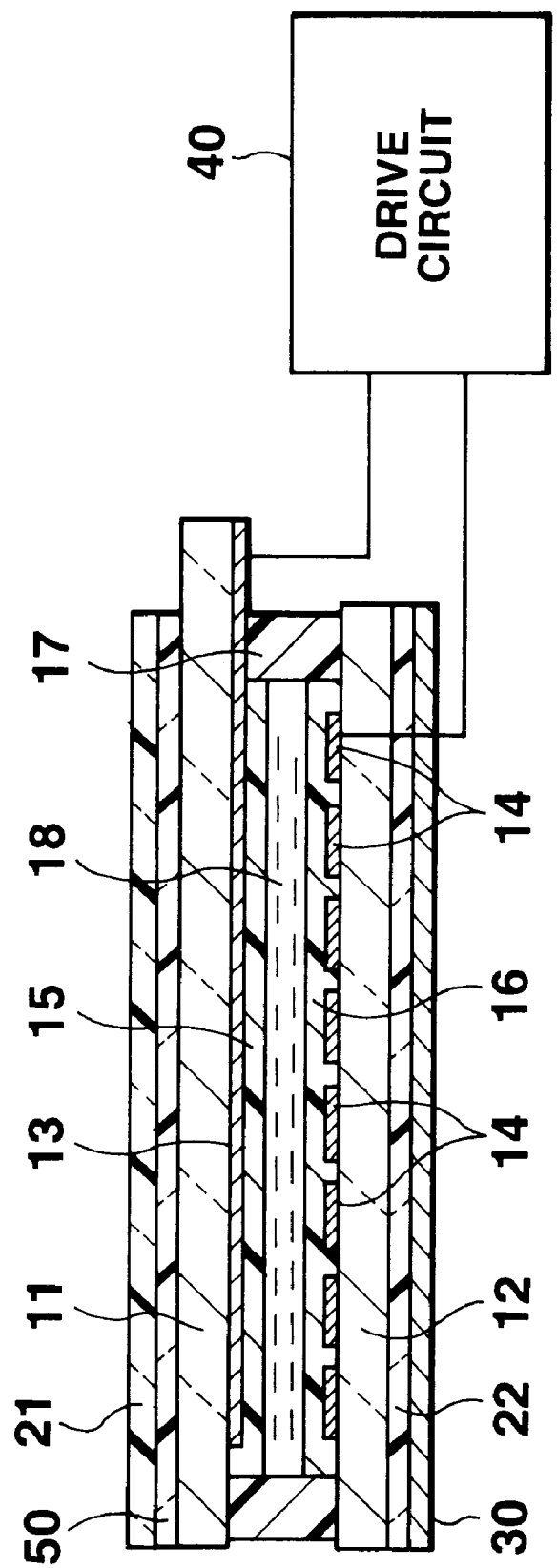
FIG. 34 is a sectional view of a liquid crystal display according to an eighth embodiment of the present invention.

The liquid crystal display which is the eighth embodiment of the present invention will be described, with reference to FIG. 34 and 35. This embodiment-differs from the first to seventh embodiments, in that a retardation plate 50 is interposed between the liquid crystal cell 10 and the first polarizing plate 21. (It should be recalled that the first to seventh embodiments display images by virtue of the birefringent action the liquid crystal layer of the liquid crystal cell 10 performs and the polarization the polarizing plates 21 and 22 accomplish.) The retardation plate 50 is and the liquid crystal molecules are twisted by about 10° in the initial aligned state. The components identical to those of the liquid cell of the first embodiment are designated at the same reference numerals and will not be described in detail.

The liquid crystal used in the eighth embodiment is one containing chiral agent which rotates the liquid crystal In the eighth embodiment, the linearly polarized light beam emitted from the polarizing plate 21 is applied to the retardation plate 50. The plate 50 polarizes the rays of different wavelengths in different ways, due to its birefringent action. The rays thus polarized are rotated as they pass through the liquid crystal cell 10, by virtue of the birefringent action of the liquid crystal layer. The rays thus rotated are applied to the second polarizing plate 22. The second polarizing plate 22 controls the passage of these rays. Therefore, the eighth embodiment can display not only clear color images because each pixel can present many colors, but also high monochrome images because each pixel can be prevented from presenting any color.

In the eighth embodiment, the phase-contrast plate 50 and the liquid crystal layer of the cell 10 greatly polarize the rays of different wavelengths before the rays are applied to the second polarizing plate 22. The transmittance at which one ray passes through the plate 22 is therefore greatly different from the transmittance at which another ray passes through the plate 22. Consisting of such rays, the light emitted from the second polarizing plate 22 presents a pure and clear color. In addition, the transmittance at which each ray passes through the plate 22 greatly depends on how much the liquid crystal molecules are tilted in accordance with the effective value of the drive signal applied to the liquid crystal layer. Hence, the transmittances at which the rays of different wavelengths pass through the liquid crystal layer much differ. As a result, the color of the light changes, and each pixel can present more colors than otherwise.

The colors the eighth embodiment can display and the number of these colors can be selected by setting the factors which determine the birefringence of the phase-contrast plate 50 and that of the liquid crystal layer of the cell 10. The factors are: the value Δnd of the liquid crystal cell 10, the retardation of the phase-contrast plate 50, and the direction of the optical axis 50a thereof.

The black-to-white contrast can be increased in Examples 6 to 11, each having the value Δnd, the retardation of the plate 50, the direction of the axis 50a and the like, all shown in the following Table 5.

400 nm to 700 nm, if the liquid molecules are twisted by 0° to 20°, preferably 5° to 10°, in the initial aligned state, and if the light-absorbing axes of the polarizing plates 21 and 22 intersect at 30° to 60°.

Figure 36:
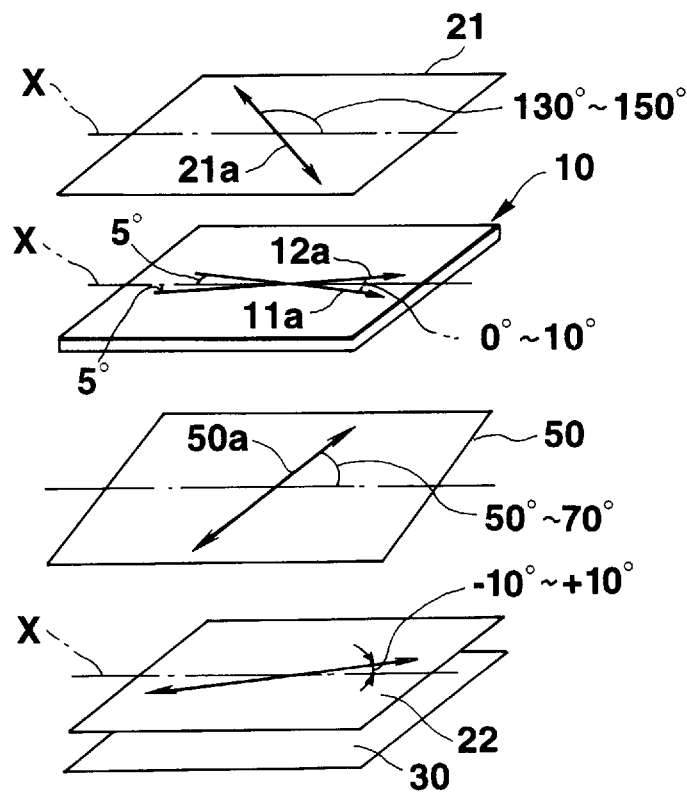
FIG. 36 is an exploded view of a modification of the eighth embodiment, illustrating the initial aligned state of liquid crystal molecules.

FIG. 36 shows a modification of the eighth embodiment. The modified liquid crystal display differs from the display

TABLE 5

| Angles and Values | | Comparative Example 3 | Example 6 | Example 7 | Example 8 | Example 9 | Example 10 | Example 11 |
|---|---|---|---|---|---|---|---|---|
| Angle between the light-absorbing axis of plate 21 and the horizontal axis X | | 45° | 45° | 45° | 45° | 45° | 45° | 45° |
| Phase-contrast plate | Retardation | | 60 nm | 60 nm | 60 nm | 60 nm | 60 nm | 60 nm |
| | Angle between the axis 50a and the axis X | | 0° | 0° | 0° | 0° | −5 | −5 |
| Value Δ nd | | 500 nm | 500 nm | 600 nm | 500 nm | 600 nm | 500 nm | 600 nm |
| Twist angle in initial aligned state | | 10° | 10° | 10° | 5° | 5° | 5° | 5° |
| Angle between the light-absorbing axis of plate 22 and the horizontal axis X | | 0° | 0° | 0° | 0° | 0° | 0° | 0° |

In Comparative Example 3 and Examples 6 to 11, the layer of the liquid crystal exhibits various reflectances shown in the following Table 6, as it is applied with no voltage (Voff) or a voltage (Von) while the liquid crystal molecules remain in the initial aligned state, the first metastable aligned state or the second metastable aligned state.

of FIG. 35, only in that the retardation plate 50 is interposed between the liquid crystal cell 10 and the second polarizing plate 22, not between the cell 10 and the first polarizing plate 21 as shown in FIG. 35. It should be noted that the second polarizing plate 22 contacts the reflective plate 30.

TABLE 6

| Characteristics | | Comparative Example 3 | Example 6 | Example 7 | Example 8 | Example 9 | Example 10 | Example 11 |
|---|---|---|---|---|---|---|---|---|
| Reflectance in initial aligned state (0V) | | 4.7 | 5.7 | 5.8 | 7.2 | 7.3 | 6.6 | 5.7 |
| Reflectance in first metastable aligned state (%) | OFF | 17.8 | 24.8 | 20.8 | 23.4 | 21.6 | 22.3 | 22.2 |
| | ON | 13.3 | 18.1 | 16.5 | 15.5 | 13.4 | 13.6 | 12.4 |
| Reflectance in second metastable aligned state (%) | OFF | 6.7 | 6.9 | 6.9 | 5.6 | 6.2 | 4.5 | 5.6 |
| | ON | 3.0 | 2.2 | 2.0 | 1.7 | 1.5 | 1.3 | 1.4 |
| Voltage applied (V) | Voff | 1.14 | 1.12 | 1.12 | 1.10 | 1.10 | 1.10 | 1.10 |
| | Von | 1.24 | 1.22 | 1.22 | 1.20 | 1.22 | 1.22 | 1.22 |
| Contrast | | 5.9 | 11.3 | 10.4 | 13.8 | 14.4 | 17.2 | 15.9 |

As clearly seen from Table 6, Comparative Example 3 exhibits insufficient contrast and cannot be put to practical use. Examples 6 to 11 exhibit contrast of 10 or more and can display images of high quality. The colors Examples 6 to 11 present are those whose X-coordinate value ranges from 0.28 to 0.39 and whose Y-coordinate value ranges from 0.27 to 0.40. Of these colors, those whose X- and Y-coordinate values are less than 0.31 (i.e., the smallest coordinate value for any color) are essentially black and form black-and-white images.

In view of Tables 5 and 6, the eighth embodiment which has a retardation plate can display high-contrast monochrome images if the liquid crystal cell 10 has value Δnd of The retardation plate 50 is so positioned that its optical axis 50a (e.g., phase delay axis) inclines to the light-transmitting axis 21a of the first polarizing plate 21. Since the modified display is identical to the first embodiment, except that it comprises the retardation plate 50 as an additional component, the components identical to those of the first embodiment are designated at the same reference numerals and will not be described in detail.

The liquid crystal used in the display of FIG. 36 is one containing chiral agent which rotates the liquid crystal molecules counterclockwise. The first aligning film 15 has been rubbed along a line inclined clockwise as viewed from the screen, at an angle greater than 0° and less than 5° to the axis X, from the upper-left corner to of the screen to the lower-right corner thereof, as is illustrated in FIG. 36. On the other hand, the second aligning film 16 has been rubbed along a line inclined counterclockwise as viewed from the screen, at an angle greater than 0° and less than 5° to the axis X, from the lower-left corner to of the screen to the upper-right corner thereof. The liquid crystal molecules are therefore twisted clockwise as viewed from the screen by an angle greater than 0° and less than 10°, while they remain in the initial aligned state.

The modified display shown in FIG. 36 can display images of many colors which are clear. The colors the modified display can display and the number of these colors can be selected by setting the factors which determine the birefringence of the phase-contrast plate 50 and that of the liquid crystal layer of the cell 10, i.e., the value Δnd of the liquid crystal cell 10, the retardation of the retardation plate 50, and the direction of the optical axis 50a thereof.

Many clear colors can be displayed by Examples 12, 13 and 14, each having the value Δnd, the retardation of the plate 50, the direction of the axis 50a and the like, all shown in the following Table 7.

TABLE 7

| Angles and Values | | Example 12 | Example 13 | Example 14 |
|---|---|---|---|---|
| Angle between the light-absorbing axis of plate 21 and the horizontal axis X | | 145° | 145° | 140° |
| Value Δnd | | 960 nm | 1010 nm | 1060 nm |
| Twist angle in initial aligned state | | 5° | 5° | 5° |
| Phase-contrast plate | Retardation | 645 nm | 630 nm | 610 nm |
| | Angle between the axis 50a and the axis X | 65° | 60° | 55° |
| Angle between the light-absorbing axis of plate 22 and the horizontal axis X | | 5° | 5° | 0° |

Examples 12, 13 and 14 displays the colors specified in the following Table 8 while the liquid crystal molecules remain the first metastable aligned state, and the colors shown in Table 8 while the molecules remain in the second metastable aligned state.

TABLE 8

| Characteristics | | Example 12 | Example 13 | Example 14 |
|---|---|---|---|---|
| Color in first metastable aligned state | OFF ON | White Red | White Red | White Red |
| Reflectance in second metastable aligned state (%) | OFF ON | Green Black | Green Black | Green Black |

As clearly seen from Table 8, Examples 12, 13 and 14 can display images of clear colors.

To enable Examples 12, 13 and 14 to display clear color images, it is desired that the phase-contrast plate be interposed between images of high quality. Examples 12, 13 and 14 can such color images if the liquid crystal cell 10 has value Δnd of 900 nm to 1100 nm, if the liquid molecules are twisted by 0° to 10°, preferably 5° in the initial aligned state, if the retardation of the retardation plate 50 is 600 nm to 650 nm, if the optical axis 50a of the plate 50 is inclined at 50° to 70° to the horizontal axis X of the cell 10, if the light-absorbing axis of the first polarizing plate 21 intersects with the axis X at 130° to 150°, and if the light-absorbing axis of the second polarizing plate 22 intersects with the axis X at −10° to 10°.

Two or more phase-contrast plates, not only one, may be interposed between the polarizing plates 21 and 22. If this is the case, the phase-contrast plates may be arranged to sandwich the liquid crystal cell 10 or may be located at one side of the cell 10.

The first to eighth embodiments described above are reflective displays in which the reflective plate is provided at the back of the liquid crystal cell. Nevertheless, the present invention can be applied to a transmissive display which uses the light emanating from a back light and which has no reflective plates.

Moreover, the present invention can be applied to a reflective display which has only one polarizing plate provided in front of the liquid crystal cell and in which the reflective plate is provided at the back of the liquid crystal cell. The reflective plate may be arranged on the outer surface of the rear substrate or may be replaced by a metal film formed on the inner surface of the rear substrate and functioning as an electrode.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A liquid crystal display device comprising:
   a pair of substrates opposing each other, each having an electrode and an aligning film on its opposing surface, said aligning film having been rubbed in a predetermined direction;
   a layer of bistable nematic liquid crystal sealed in a space between said substrate, the molecules of said liquid crystal assuming a first metastable aligned state when a reset pulse voltage high enough to align the molecules almost vertically to the substrates and then a first state-selecting pulse voltage lower than the reset pulse voltage are applied between the opposing electrodes, or assuming a second metastable aligned state when the reset pulse voltage and then a second state-selecting pulse voltage lower than the reset pulse voltage are applied between the opposing electrodes, being tilted at an angle to said substrates in accordance with an effective value of the voltage applied between the opposing electrodes while remaining in the first and second metastable aligned states; and
   at least one polarizing plate arranged on the outside of at least one of said substrates.

2. A liquid crystal display device according to claim 1, wherein said at least one polarizing plate is positioned, having an optical axis intersecting, at an angle other than an right angle, with a direction in which the liquid crystal molecules near said one of the substrates are aligned.

3. A liquid crystal display device according to claim 2, which displays different colors in accordance with the effective value of a voltage applied between the opposing electrodes while the liquid crystal molecules remain in the first and second metastable aligned states, respectively.

4. A liquid crystal display device according to claim 2, which displays different gradations in accordance with the effective value of a voltage applied between the opposing electrodes while the liquid crystal molecules remain in at least one the first and second metastable aligned states.

5. A liquid crystal display device according to claim 1, further comprising drive means connected to said opposing electrodes, for applying the reset pulse voltage and the first and second state-selecting pulse voltages to said layer of liquid crystal and for applying a voltage for controlling the effective values of the voltages in accordance with data which is externally supplied and which is to be displayed.

6. A liquid crystal display device according to claim 1, wherein the molecules of said liquid crystal are twisted in a first direction by 0° to 180° with respect to the rubbed direction of one of said aligning films and assume a spray-strained state while remaining in an initial aligned state, and the molecules of said liquid crystal are further twisted by 180° in the first direction and released from the spray-strained state while remaining in the first metastable aligned state, or further twisted by 180° in a second direction opposite to the first direction and released from the spray-strained state while remaining in the second metastable aligned state.

7. A liquid crystal display device according to claim 1, further comprising at least one retardation plate interposed between said at least one polarizing plate and said one of the substrates.

8. A liquid crystal display device according to claim 1, wherein the molecules of said liquid crystal are twisted in a first direction by an angle greater than 0° and less than 90° with respect to the rubbed direction of one of said aligning films and assume a spray-strained state while remaining an initial aligned state, and the molecules of said liquid crystal are further twisted by 180° in the first direction and released from the spray-strained state while remaining in the first metastable aligned state or further twisted by 180° in a second direction opposite to the first direction and released from the spray-strained state while remaining in the second metastable aligned state.

9. A liquid crystal display device according to claim 1, wherein the molecules of said liquid crystal are twisted in a first direction by substantially 180° with respect to the rubbed direction of one of said aligning films and assume a spray-strained state while remaining in an initial aligned state, and the molecules of said liquid crystal are further twisted in the first direction, finally twisted by substantially 360°, and released from the spray-strained state while remaining in the first metastable aligned state, or further twisted in a second direction opposite to the first direction, finally scarcely twisted, and released from the spray-strained state while remaining in the second metastable aligned state.

10. A liquid crystal display device according to claim 1, wherein the molecules of said liquid crystal are twisted in a first direction by substantially 90° with respect to the rubbed direction of one of said aligning films and assume a spray-strained state while remaining in an initial aligned state, and the molecules of said liquid crystal are further twisted in the first direction, finally twisted by substantially 270°, and released from the spray-strained state while remaining in the first metastable aligned state, or further twisted in a second direction opposite to the first direction, finally twisted substantially by 90° in the second direction and released from the spray-strained state while remaining in the second metastable aligned state.

11. A liquid crystal display device according to claim 1, wherein the molecules of said liquid crystal are twisted in a first direction by substantially 70° with respect to the rubbed direction of one of said aligning films and assume a spray-strained state while remaining in an initial aligned state, and the molecules of said liquid crystal are further twisted in the first direction, finally twisted by substantially 250°, and released from the spray-strained state while remaining in the first metastable aligned state, or further twisted in a second direction opposite to the first direction, finally twisted substantially by 110° in the second direction and released from the spray-strained state while remaining in the second metastable aligned state.

12. A liquid crystal display device according to claim 1, wherein the molecules of said liquid crystal are twisted in a first direction by substantially 50° with respect to the rubbed direction of one of said aligning films and assume a spray-strained state while remaining in an initial aligned state, and the molecules of said liquid crystal are further twisted in the first direction, finally twisted by substantially 230°, and released from the spray-strained state while remaining in the first metastable aligned state, or further twisted in a second direction opposite to the first direction, finally twisted substantially by 130° in the second direction and released from the spray-strained state while remaining in the second metastable aligned state.

13. A liquid crystal display device according to claim 1, wherein the molecules of said liquid crystal are twisted in a first direction by substantially 30° with respect to the rubbed direction of one of said aligning films and assume a spray-strained state while remaining in an initial aligned state, and the molecules of said liquid crystal are further twisted in the first direction, finally twisted by substantially 210°, and released from the spray-strained state while remaining in the first metastable aligned state, or further twisted in a second direction opposite to the first direction, finally twisted substantially by 150° in the second direction and released from the spray-strained state while remaining in the second metastable aligned state.

14. A liquid crystal display device according to claim 1, wherein the molecules of said liquid crystal are twisted in a first direction by substantially 10° with respect to the rubbed direction of one of said aligning films and assume a spray-strained state while remaining in an initial aligned state, and the molecules of said liquid crystal are further twisted in the first direction, finally twisted by substantially 190°, and released from the spray-strained state while remaining in the first metastable aligned state, or further twisted in a second direction opposite to the first direction, finally twisted substantially by 170° in the second direction and released from the spray-strained state while remaining in the second metastable aligned state.

15. A liquid crystal display device according to claim 1, wherein the molecules of said liquid crystal are twisted in a first direction by substantially 5° with respect to the rubbed direction of one of said aligning films and assume a spray-strained state while remaining in an initial aligned state, and the molecules of said liquid crystal are further twisted in the first direction, finally twisted by substantially 185°, and released from the spray-strained state while remaining in the first metastable aligned state, or further twisted in a second direction opposite to the first direction, finally twisted substantially by 175° in the second direction and released from the spray-strained state while remaining in the second metastable aligned state.

16. A liquid crystal display device according to claim 1, wherein the molecules of said liquid crystal are untwisted and assume a spray-strained state while remaining in an initial aligned state, and the molecules of said liquid crystal are twisted by 180° in a first direction and released from the spray-strained state while remaining in the first metastable aligned state, or twisted by 180° in a second direction opposite to the first direction and released from the spray-strained state while remaining in the second metastable aligned state.

17. A liquid crystal display device according to claim 1, wherein said liquid crystal has viscosity of 30 cp (centimeter-poise) and an elastic constant ratio $K_{33}/K_{11}$ of at least 1.5.

18. A liquid crystal display device according to claim 1, wherein said liquid crystal has a dielectric anisotropy value $\Delta\epsilon$ of at least 10.

19. A liquid crystal display device according to claim 1, further comprising a reflective member arranged at least on one side of the layer of liquid crystal, for reflecting light passing through said layer of liquid crystal.

20. A liquid crystal display device according to claim 19, wherein said reflective member is arranged at an outer surface of said one of said substrate.

21. A liquid crystal display device according to claim 19, wherein two polarizing plates are provided on the outside of said substrates, respectively, and said reflective member is provided on the outer surface of one of said polarizing plates.

22. A liquid crystal display device according to claim 21, wherein said polarizing plates are arranged, each having a light-absorption axis intersecting with a light-absorption axis of the other at an angle greater than 0° and less than 20°.

23. A liquid crystal display device according to claim 19, wherein the molecules of said liquid crystal are twisted in a first direction by an angle greater than 0° and less than 20° with respect to the rubbed direction of one of said aligning films and assume a spray-strained state while remaining in an initial aligned state, said liquid crystal has an optical anisotropy value $\Delta n$, said layer of liquid crystal has a thickness d, and the product $\Delta nd$ of the value $\Delta n$ and the thickness d ranges from 200 nm to 500 nm.

24. A liquid crystal display device according to claim 20, wherein the molecules of said liquid crystal are twisted by 10° in a first direction and assumes a spray-strained state while remaining in an initial aligned state.

25. A liquid crystal display device according to claim 19, wherein the molecules of said liquid crystal are twisted in a first direction by an angle greater than 0° and less than 10° with respect to the rubbed direction of one of said aligning films and assume a spray-strained state while remaining in an initial aligned state, said liquid crystal has an optical anisotropy value $\Delta n$, said layer of liquid crystal has a thickness d, and the product $\Delta nd$ of the value $\Delta n$ and the thickness d ranges from 900 nm to 1100 nm, and which further comprises a phase-contrast plate having a phase contrast of 600 nm to 650 nm and interposed between one of said substrates and the polarizing plate on which said reflective member is provided.

26. A liquid crystal display device according to claim 25, wherein said retardation plate is arranged, having a phase delay axis intersecting at 50° to 70° with a bisector of the rubbed directions of said aligning films.

27. A liquid crystal display device according to claim 25, wherein the polarizing plate arranged at said reflective member has a light-absorption axis intersecting with the bisector of the rubbed direction of said aligning films, at 0° to 10° in one direction and another direction, and the other polarizing plate has a light-absorption axis intersecting with said bisector at 130° to 150°.

28. A liquid crystal display device according to claim 21, wherein the molecules of said liquid crystal are twisted in a first direction by an angle greater than 0° and less than 20° with respect to the rubbed direction of one of said aligning films and assume a spray-strained state while remaining in an initial aligned state, said liquid crystal has an optical anisotropy value $\Delta n$, said layer of liquid crystal has a thickness d, and the product $\Delta nd$ of the value $\Delta n$ and the thickness d ranges from 400 nm to 700 nm, and which further comprises a retardation plate having a value of retardation of 100 nm or less and interposed between one of said substrates and the polarizing plate other than the polarizing plate on which said reflective member is provided.

29. A liquid crystal display device according to claim 28, wherein said retardation plate is arranged, having a phase delay axis substantially aligned with a bisector of the rubbed directions of said aligning films.

30. A liquid crystal display device according to claim 28, wherein the molecules of said liquid crystal are twisted substantially by 10° in a first direction with respect to the rubbed direction of one of said aligning films and assumes a spray-strained state while remaining in an initial aligned state.

31. A liquid crystal display device according to claim 28, wherein the molecules of said liquid crystal are twisted substantially by 5° in a first direction with respect to the rubbed direction of one of said aligning films and assumes a spray-strained state while remaining in an initial aligned state.

32. A liquid crystal display device comprising:
   a pair of substrates opposing each other, each having an electrode and an aligning film on an inner surface, said aligning film having been rubbed in a predetermined direction;
   a layer of bistable nematic liquid crystal sealed in a space between said substrate and spray-strained, the molecules of said liquid crystal assuming a first metastable aligned state or a second metastable aligned state in accordance with a voltage applied between the opposing electrodes;
   at least one polarizing plate arranged at one of said substrates; and
   drive means connected to said opposing electrodes, for applying the reset pulse voltage high enough to align the molecules almost vertically to the substrates, then a plurality of state-selecting pulse voltages lower than the reset pulse voltage, for setting the molecules of said liquid crystal in the first and second metastable aligned states, a voltage for controlling the effective values of voltages applied between the opposing electrodes to change tilt angle of the molecules with respect to said substrates, in accordance with data which is externally supplied and which is to be displayed.

33. A liquid crystal display device according to claim 32, wherein the molecules of said liquid crystal are twisted in a first direction by 0° to 180° with respect to the rubbed direction of one of said aligning films and assume a spray-strained state while remaining in an initial aligned state, and the molecules of said liquid crystal are further twisted by 180° in the first direction and released from the spray-strained state while remaining in the first metastable aligned state, or further twisted by 180° in a second direction opposite to the first direction and released from the spray-strained state while remaining in the second metastable aligned state.

34. A liquid crystal display device according to claim 33, wherein said at least one polarizing plate is positioned, having an optical axis intersecting, at an angle other than an right angle, with a direction in which the liquid crystal molecules near said one of the substrates are aligned, and said layer of liquid crystal and said at least one polarizing plate constitute a liquid crystal optical element whose birefringent effect is controlled.

35. A method of driving a liquid crystal display device comprising a pair of substrates opposing each other, each having an electrode and an aligning plate on an inner surface, said aligning plate having been rubbed in a predetermined direction; a layer of bistable nematic liquid crystal sealed in a space between said substrate and spray-strained, the molecules of said liquid crystal assuming a first metastable aligned state or a second metastable aligned state in accordance with a voltage applied between the opposing electrodes; and at least one polarizing plate arranged at one of said substrates, said method comprising the steps of:

applying a reset pulse voltage high enough to align the molecules almost vertically to the substrates, to said opposing electrodes;

applying a plurality of state-selecting pulse voltages lower than the reset pulse voltage, for setting the molecules of said liquid crystal in the first and second metastable aligned states; and applying a control voltage between said opposing electrodes, for controlling the effective values of the voltages applied between said opposing electrodes to tilt the molecules to said substrates, in accordance with data which is externally supplied and which is to be displayed.

36. A method according to claim 35, wherein the molecules of said liquid crystal are twisted in a first direction by 0° to 180° with respect to the rubbed direction of one of said aligning films and assume a spray-strained state while remaining in an initial aligned state, and the molecules of said liquid crystal are further twisted by 180° in the first direction and released from the spray-strained state while remaining in the first metastable aligned state, or further twisted by 180° in a second direction opposite to the first direction and released from the spray-strained state while remaining in the second metastable aligned state.

37. A method according to claim 36, wherein said liquid crystal display device is a birefringence-controlled liquid crystal display device which has at least one polarizing plate having an optical axis intersecting, at an angle other than an right angle, with a direction in which the liquid crystal molecules near said one of the substrates are aligned, and said control voltage controls the effective values of total voltages applied between said opposing electrodes, so that the display displays different gradations while the liquid crystal molecules remain in the first metastable aligned state and also while the liquid crystal molecules remain in the second metastable aligned state.

* * * * *